US012103791B2

(12) United States Patent
Thomas

(10) Patent No.: US 12,103,791 B2
(45) Date of Patent: Oct. 1, 2024

(54) ASSEMBLIES AND METHODS FOR MATERIAL EXTRACTION FROM RETENTION COLLECTIONS

(71) Applicant: Industrial Vacuum Transfer Services USA, LLC, Houston, TX (US)

(72) Inventor: Randall Earl Thomas, Harwood, TX (US)

(73) Assignee: Industrial Vacuum Transfer Services USA, LLC, Houston, TX (US)

(*) Notice: Subject to any disclaimer, the term of this patent is extended or adjusted under 35 U.S.C. 154(b) by 270 days.

(21) Appl. No.: 17/811,280

(22) Filed: Jul. 7, 2022

(65) Prior Publication Data
US 2023/0011157 A1    Jan. 12, 2023

Related U.S. Application Data

(60) Provisional application No. 63/367,570, filed on Jul. 1, 2022, provisional application No. 63/367,218, filed
(Continued)

(51) Int. Cl.
*B65G 53/24* (2006.01)
*B01D 29/01* (2006.01)
(Continued)

(52) U.S. Cl.
CPC ............ *B65G 53/24* (2013.01); *B01D 29/01* (2013.01); *B01D 46/4236* (2013.01);
(Continued)

(58) Field of Classification Search
None
See application file for complete search history.

(56) References Cited

U.S. PATENT DOCUMENTS 2,193,784 A * 3/1940 Smith ................. A47L 5/32
15/301
2,458,258 A * 1/1949 Furr .................. E01H 1/0836
414/508
(Continued)

FOREIGN PATENT DOCUMENTS

CN    110817176        2/2020
CN    113123397 A *   7/2021    .............. E02F 3/88
(Continued)

OTHER PUBLICATIONS

Invitation to Pay Additional Fees with Partial International Search for PCT/US2022/073532, Nov. 4, 2022.
(Continued)

*Primary Examiner* — Joseph A Dillon, Jr.
(74) *Attorney, Agent, or Firm* — Womble Bond Dickinson (US) LLP

(57) ABSTRACT

Assemblies and methods to extract materials from a retention collection may include a vacuum source including a series of vacuum generators configured to generate a vacuum flow to create a suction between the retention collection and a material collector for extraction of the material from the retention collection and transfer to the material collector. The suction generated by the vacuum flow will be sufficient to draw-in and convey the material in liquid, semi-solid and substantially solid states from the retention collection along a collection conduit and into the material collector for disposal. The vacuum generation assembly may include a filter and sound attenuation chamber connected to the vacuum source configured to receive and filter a vacuum exhaust fluid/air flow portion of the vacuum flow and to attenuate sound generated by the vacuum source.

13 Claims, 30 Drawing Sheets

Related U.S. Application Data on Jun. 29, 2022, provisional application No. 63/367,219, filed on Jun. 29, 2022, provisional application No. 63/364,630, filed on May 13, 2022, provisional application No. 63/264,101, filed on Nov. 16, 2021, provisional application No. 63/264,015, filed on Nov. 12, 2021, provisional application No. 63/203,147, filed on Jul. 9, 2021, provisional application No. 63/203,108, filed on Jul. 8, 2021.

(51) Int. Cl.
  *B01D 46/42* (2006.01)
  *B01D 46/44* (2006.01)
  *B01D 46/69* (2022.01)
  *B65G 53/60* (2006.01)
  *B65G 53/66* (2006.01)
  *C02F 11/125* (2019.01)

(52) U.S. Cl.
  CPC .......... *B01D 46/444* (2013.01); *B01D 46/69* (2022.01); *B65G 53/60* (2013.01); *B65G 53/66* (2013.01); *C02F 11/125* (2013.01); *B01D 2279/55* (2013.01); *B65G 2207/32* (2013.01)

(56) References Cited

U.S. PATENT DOCUMENTS

| | | | |
|---|---|---|---|
| 2,483,485 A * | 10/1949 | Barr | C07C 1/0485 |
| | | | 209/474 |
| 3,776,601 A | 12/1973 | Capes et al. | |
| 4,212,653 A | 7/1980 | Giles | |
| 4,278,454 A | 7/1981 | Nemesi | |
| 4,303,417 A | 12/1981 | Koch | |
| 4,372,713 A | 2/1983 | Kean, Jr. | |
| 4,379,663 A | 4/1983 | Allison | |
| 4,415,297 A | 11/1983 | Boring | |
| 4,422,810 A | 12/1983 | Boring | |
| 4,423,987 A | 1/1984 | Powers | |
| 4,519,810 A | 5/1985 | Haas | |
| 4,578,840 A | 4/1986 | Pausch | |
| 4,759,691 A | 7/1988 | Kroupa | |
| 4,913,597 A * | 4/1990 | Christianson | B65G 53/24 |
| | | | 406/173 |
| 4,923,597 A | 5/1990 | Anderson et al. | |
| 4,925,467 A | 5/1990 | Jordan et al. | |
| 4,933,017 A | 6/1990 | Brzoska | |
| 4,935,984 A | 6/1990 | Bryant | |
| 4,947,510 A | 8/1990 | English | |
| 4,988,240 A * | 1/1991 | Thompson | B65G 53/52 |
| | | | 406/173 |
| 5,030,259 A | 7/1991 | Bryant et al. | |
| 5,163,786 A * | 11/1992 | Christianson | B65G 53/60 |
| | | | 55/467 |
| 5,425,188 A | 6/1995 | Rinker | |
| 5,562,746 A | 10/1996 | Raether | |
| 5,791,073 A | 8/1998 | Palmer | |
| 5,940,926 A | 8/1999 | Inzinna | |
| 6,093,226 A | 7/2000 | Schoenberger | |
| 6,206,621 B1 | 3/2001 | Sebring | |
| 6,322,327 B1 * | 11/2001 | Dawson | F04F 5/463 |
| | | | 417/189 |
| 6,325,572 B1 * | 12/2001 | Dietrich | B65G 53/60 |
| | | | 406/146 |
| 6,385,867 B1 | 5/2002 | Slabach | |
| RE38,872 E | 11/2005 | Hayes | |
| 7,045,068 B2 * | 5/2006 | Hutchinson | B01D 36/001 |
| | | | 210/406 |
| 7,074,261 B2 | 7/2006 | Murphy | |
| 7,909,910 B2 | 3/2011 | Benner | |
| 7,959,870 B2 | 6/2011 | Yanokuchi et al. | |
| 7,967,901 B2 | 6/2011 | Sakatani et al. | |
| 8,153,001 B2 * | 4/2012 | Peters | B01D 29/27 |
| | | | 210/406 |
| 8,277,201 B2 | 10/2012 | Krohn | |
| 8,596,990 B2 | 12/2013 | Schaaf | |
| 8,702,399 B2 | 4/2014 | Krohn | |
| 8,881,341 B2 | 11/2014 | Schmidt, Jr. | |
| 8,967,919 B2 | 3/2015 | Yaluris et al. | |
| 9,045,072 B2 | 6/2015 | Hetcher | |
| 9,212,669 B2 | 12/2015 | Krohn | |
| 9,227,780 B2 | 1/2016 | Krohn | |
| 9,687,890 B2 | 6/2017 | Tacke | |
| 9,713,827 B2 | 7/2017 | Bonneau et al. | |
| 9,719,230 B2 | 8/2017 | Showley | |
| 9,988,788 B2 | 6/2018 | Holt | |
| 10,065,150 B2 | 9/2018 | Archuleta et al. | |
| 10,421,624 B2 | 9/2019 | Maguire | |
| 10,457,501 B2 | 10/2019 | Wilkinson et al. | |
| 10,502,237 B2 | 12/2019 | Johnson | |
| 10,527,064 B2 | 1/2020 | Krohn | |
| 10,739,070 B2 | 8/2020 | Bishop | |
| 10,875,060 B2 | 12/2020 | Wu et al. | |
| 10,906,225 B2 | 2/2021 | Zinski | |
| 10,926,008 B2 | 2/2021 | Minskoff et al. | |
| 11,091,327 B2 | 8/2021 | Kelly | |
| 11,179,754 B2 | 11/2021 | Doucette, Jr. | |
| 11,584,598 B2 | 2/2023 | Conradt | |
| 11,629,486 B2 | 4/2023 | Forster | |
| 11,643,790 B2 | 5/2023 | Renger | |
| 2003/0190200 A1 * | 10/2003 | Hajima | B05B 7/1472 |
| | | | 406/191 |
| 2005/0005968 A1 | 1/2005 | Berry | |
| 2005/0183574 A1 * | 8/2005 | Burnett | B65G 53/60 |
| | | | 95/271 |
| 2007/0234906 A1 * | 10/2007 | DeMarco | B01D 45/12 |
| | | | 96/384 |
| 2007/0251198 A1 | 11/2007 | Witter | |
| 2008/0244986 A1 | 10/2008 | Adelmann et al. | |
| 2009/0127352 A1 | 5/2009 | Hinther | |
| 2009/0159003 A1 | 6/2009 | Noguchi et al. | |
| 2010/0218467 A1 * | 9/2010 | Witter | B01D 45/16 |
| | | | 55/337 |
| 2010/0243575 A1 | 9/2010 | Nowling | |
| 2011/0047743 A1 | 3/2011 | Shepherd | |
| 2012/0117754 A1 | 5/2012 | Mendenhall | |
| 2012/0125441 A1 | 5/2012 | Krohn | |
| 2012/0233758 A1 | 9/2012 | Tolles | |
| 2012/0318583 A1 | 12/2012 | Krohn | |
| 2013/0108482 A1 | 5/2013 | Johnson | |
| 2013/0232723 A1 | 9/2013 | Catalfamo | |
| 2013/0315761 A1 | 11/2013 | Milhau et al. | |
| 2013/0327706 A1 * | 12/2013 | Ursoi | B01D 21/245 |
| | | | 210/527 |
| 2013/0336875 A1 * | 12/2013 | Chang | C01B 32/16 |
| | | | 422/139 |
| 2014/0374331 A1 | 12/2014 | Anderson | |
| 2015/0335217 A1 | 11/2015 | Fritsche | |
| 2016/0280473 A1 * | 9/2016 | Veselov | B65G 53/66 |
| 2017/0058484 A1 | 3/2017 | Buchleiter | |
| 2017/0128957 A1 | 5/2017 | Kosawa et al. | |
| 2017/0267466 A1 | 9/2017 | Wilkinson et al. | |
| 2018/0148277 A1 | 5/2018 | Maguire | |
| 2019/0183737 A1 * | 6/2019 | Valerino, Sr. | B65G 51/26 |
| 2019/0193960 A1 | 6/2019 | Sewell | |
| 2019/0226474 A1 | 7/2019 | Krohn | |
| 2020/0078837 A1 | 3/2020 | Ducette et al. | |
| 2020/0378200 A1 | 12/2020 | Krohn | |
| 2022/0031929 A1 | 2/2022 | Davie | |
| 2022/0126225 A1 | 4/2022 | Nowling | |
| 2023/0009143 A1 | 1/2023 | Thomas | |
| 2023/0009644 A1 | 1/2023 | Thomas | |
| 2023/0010206 A1 | 1/2023 | Thomas | |
| 2023/0010395 A1 | 1/2023 | Thomas | |
| 2023/0010635 A1 | 1/2023 | Thomas | |
| 2023/0127887 A1 | 4/2023 | Khankal et al. | |
| 2023/0340957 A1 | 10/2023 | Thomas | |
| 2023/0340966 A1 | 10/2023 | Krohn | |
| 2023/0356273 A1 | 11/2023 | Speece | |

(56) References Cited

U.S. PATENT DOCUMENTS

| | | |
|---|---|---|
| 2023/0373757 A1 | 11/2023 | Sato |
| 2023/0405644 A1 | 12/2023 | Thomas et al. |
| 2024/0150136 A1 | 5/2024 | Sundholm |

FOREIGN PATENT DOCUMENTS

| | | | | |
|---|---|---|---|---|
| DE | 1528900 | | 12/1969 | |
| DE | 2625701 | | 12/1977 | |
| DE | 202011052400 | | 1/2012 | |
| EP | 1226865 | | 7/2002 | |
| EP | 1251087 | | 10/2002 | |
| EP | 1537773 | | 8/2005 | |
| EP | 1967260 | | 9/2008 | |
| EP | 2045199 | | 4/2009 | |
| EP | 2805902 | | 11/2014 | |
| EP | 3064457 | | 9/2016 | |
| EP | 3799969 | | 4/2021 | |
| GB | 1385706 | | 2/1975 | |
| IN | 298340 | | 6/2018 | |
| IN | 326989 | | 12/2019 | |
| IN | 329066 | | 1/2020 | |
| IN | 396075 | | 5/2022 | |
| JP | 5043983 | | 5/1974 | |
| JP | 52115089 | | 9/1977 | |
| JP | 60190707 | | 12/1985 | |
| JP | 04103849 | | 9/1992 | |
| JP | 0738044 | | 7/1995 | |
| JP | 09221225 | | 8/1997 | |
| JP | 2003095436 | | 4/2003 | |
| JP | 2005112373 | | 4/2005 | |
| JP | 2006102657 | | 4/2006 | |
| JP | 2006130479 | | 5/2006 | |
| JP | 2007063934 A | * | 3/2007 | ............. E02F 7/065 |
| KR | 100776693 | | 11/2007 | |
| KR | 20120006864 | | 1/2012 | |
| KR | 20160077775 | | 7/2016 | |
| KR | 101864666 | | 6/2018 | |
| KR | 102063424 | | 1/2020 | |
| WO | 2004010006 | | 1/2004 | |
| WO | 2008009024 | | 1/2008 | |
| WO | 2009156685 | | 12/2009 | |
| WO | 2010090574 | | 8/2010 | |
| WO | 2012059625 | | 5/2012 | |
| WO | 2013025522 | | 2/2013 | |
| WO | 2017041769 | | 3/2017 | |
| WO | 2021089977 | | 5/2021 | |

OTHER PUBLICATIONS

International Search Report and Written Opinion for PCT/US2022/073537, Nov. 4, 2022.
International Search Report and Written Opinion for PCT/US2022/073542, Nov. 4, 2022.
International Search Report and Written Opinion for PCT/US2022/073545, Nov. 4, 2022.
International Search Report and Written Opinion for PCT/US2022/073551, Nov. 4, 2022.
International Search Report and Written Opinion for PCT/US2022/073554, Nov. 4, 2022.
Filter Concept Pvt. Ltd., Screenshots from youtube video located at https://www.youtube.com/watch?v=bbXZCzgZh4w, Mar. 14, 2013.
International Search Report and Written Opinion for PCT/US2022/073532, Jan. 2, 2023.
Vac-U-Max, Air Operated Industrial Vacuum Cleaners, Belleville, NJ, 2021, https://www.vac-u-max.com/.
Declaration of Randall Earl Thomas, Nov. 28, 2022.
Wayback Machine printouts of www.supavac.com, Apr. 4, 2004.
Transvac, Ejector Performance Testing, Alfreton, Derbyshire, UK, 2021, https://www.transvac.co.uk/ejector-performance-testing/.
Transvac, How an Ejector Works, Alfreton, Derbyshire, UK, 2021, https://www.transvac.co.uk/how-an-ejector-works/.

* cited by examiner

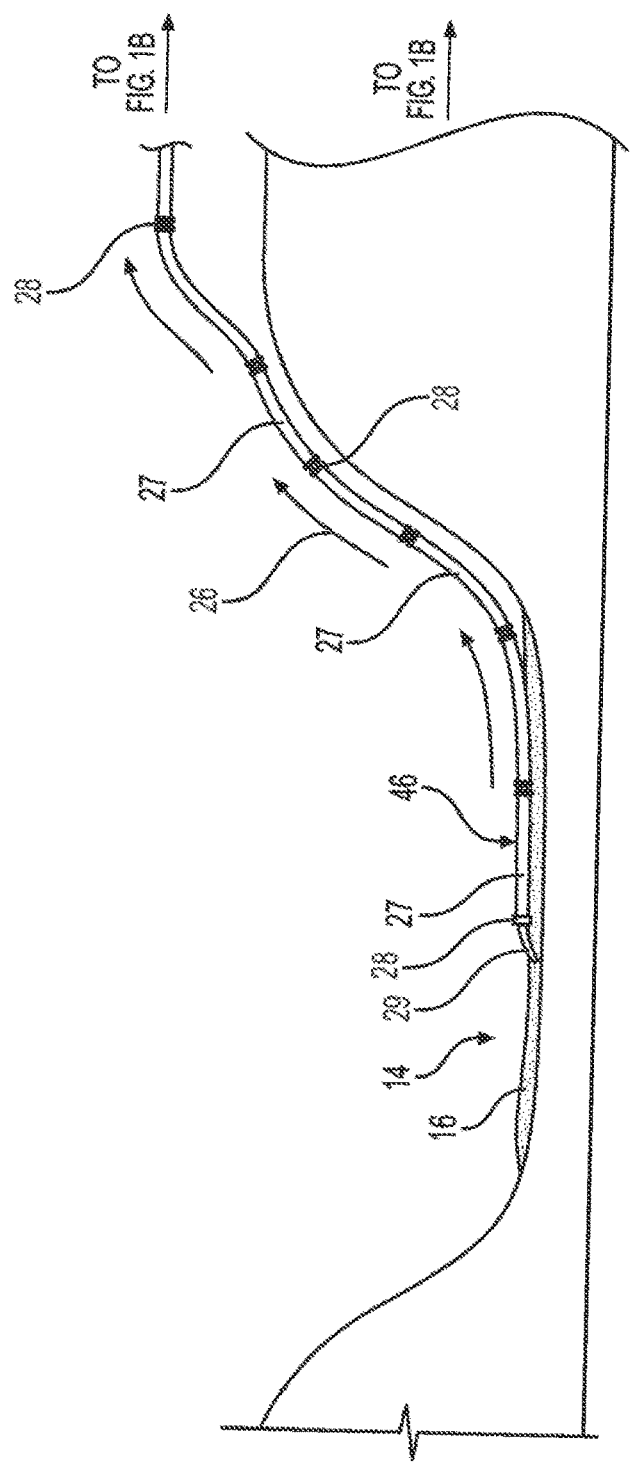

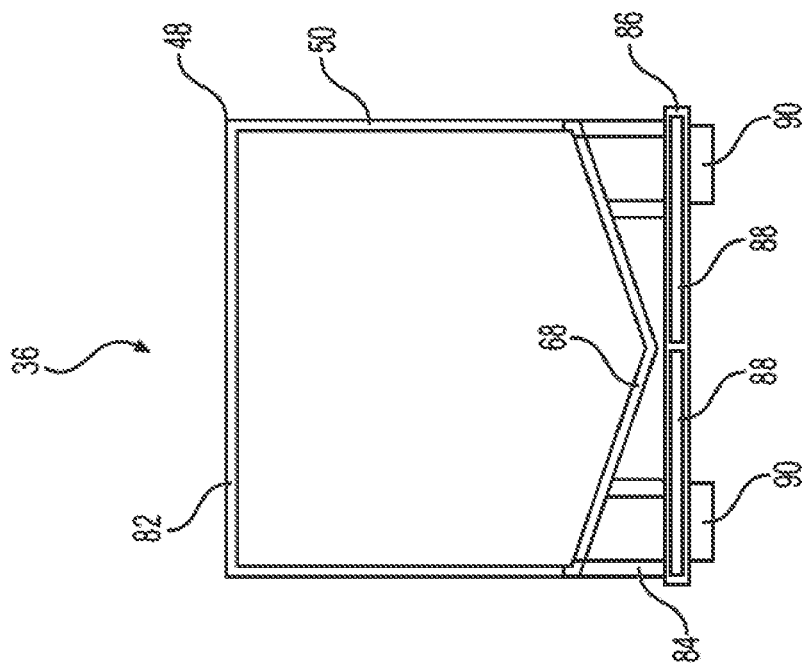
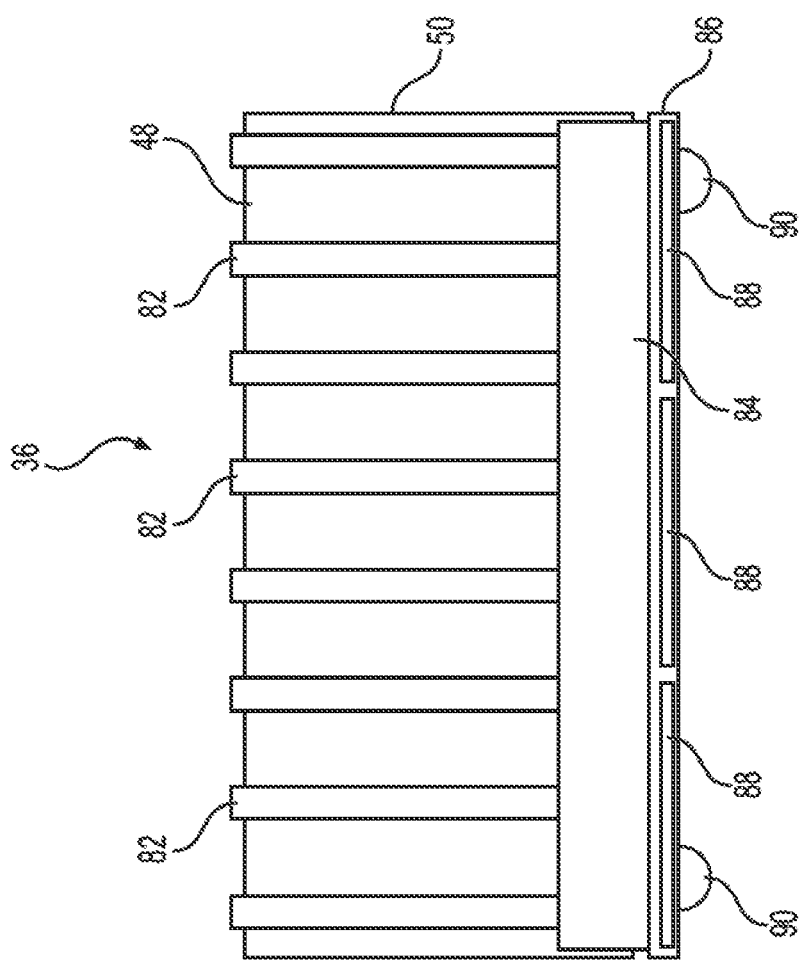

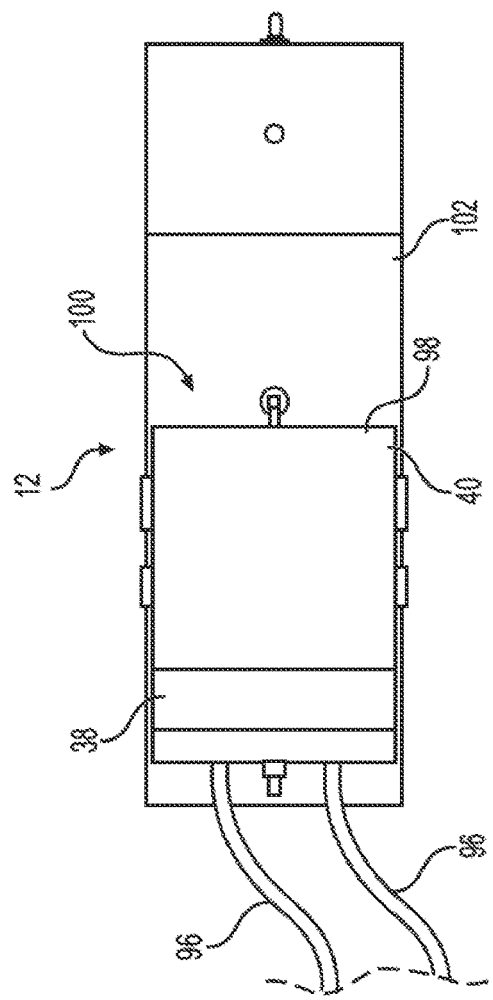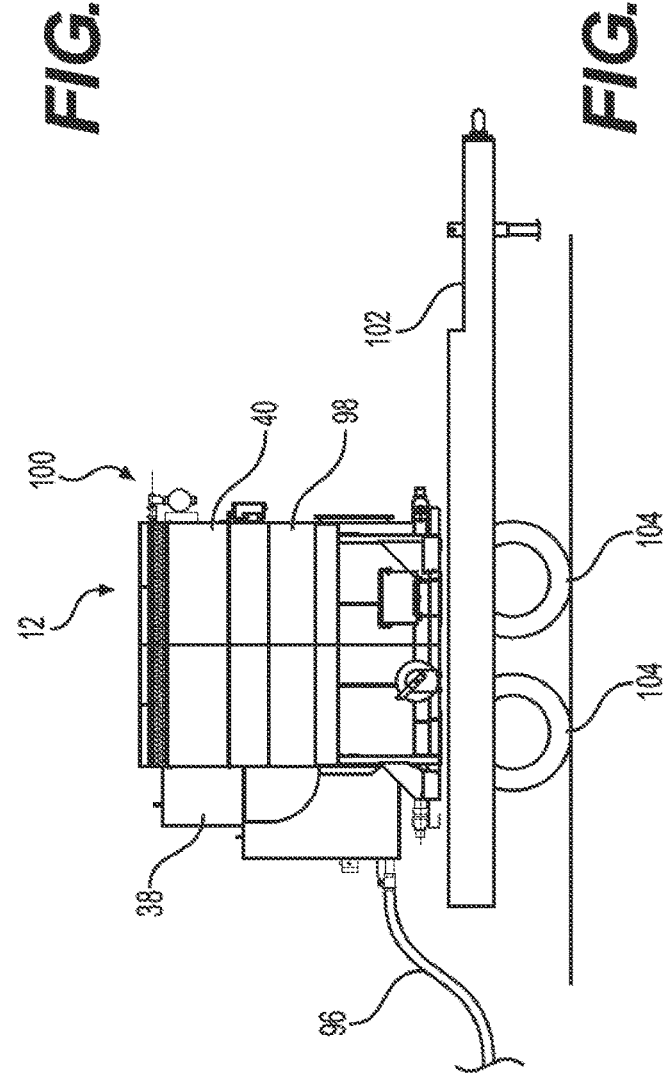

SECTION B-B

ASSEMBLIES AND METHODS FOR MATERIAL EXTRACTION FROM RETENTION COLLECTIONS

PRIORITY CLAIMS

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

TECHNICAL FIELD

The present disclosure relates to assemblies and methods for extracting material from retention collections, and, more particularly, to assemblies and methods for extracting liquid, solid and semi-solid materials from retention ponds and other retention collections for disposal.

BACKGROUND

Certain environments, such as, for example, work sites, industrial sites, commercial sites, residential sites, or natural sites, may often be sources of undesirable and/or potentially hazardous materials that are created as a result of operations at the site, and are deposited or accumulated such as in retention ponds or other retention collection areas. The deposit or accumulation of such materials may be undesirable for a number of reasons, and thus, removal of the material from the site often is desirable or necessary. For example, hydrocarbon and other waste materials can be collected in retention collections, such as retention ponds, mixing with run-off water and forming a semi-liquid or sludge material, often including more solid pieces, that presents an undesirable environmental condition, and/or may present recycling or remediation opportunities. Traditional approaches to removing such undesirable materials from retention collections, such as retention ponds or other collection areas, at various sites may be unsatisfactory and/or can suffer from various drawbacks.

For example, the material to be extracted and removed may include a variety of material types (e.g., dirt, sediment, rocks, and other materials) or material forms (e.g., liquids, solids, emulsions, particulates, etc.), and/or may be located in areas where it is difficult to efficiently extract the material from the site. In addition, for removal of semi-solid and/or solid materials mixed with run-off water, sediment and other debris from retention ponds and other retention collections, it has been common to apply substantial amounts of water, in addition to any water already present/collected in the retention collection, to help break-up and reduce the amount of solids, and thus form a substantially liquid volume of material to assist in removal thereof. Such an operation, however, can create added expense and the addition of such volumes of water increases the amount of waste/undesirable material to be removed and consequently the time required to remove the collected materials, still further, the added water generally must be reclaimed through additional, downstream processes and at additional expense.

Accordingly, Applicant has recognized a need to provide improved assemblies and methods for extracting material from retention collections, including a variety of different materials from a variety of different environments, that may be more practicable, more efficient, less time consuming, and/or less labor intensive. The present disclosure is directed to such assemblies and methods, which disclosure may address one or more of the above-referenced needs and/or drawbacks, as well as other possible needs and/or drawbacks in the art.

SUMMARY

As referenced above, it is desirable to provide improved material extraction assemblies and methods for extracting various materials from a source of such materials at a site, such as a retention collection, and transferring the extracted materials to another location, such as one or more collection chambers, for transport from the site for disposal. The extracted material can include liquids, solids and semi-solid including a variety of different materials from a variety of different environments, and can be extracted and removed using the material extraction assemblies and methods of the present disclosure in a more practicable, more efficient, less time consuming, and/or less labor intensive operation. In some embodiments, the material extraction assemblies and methods may provide enhanced extraction of materials to be removed from various environments, such as, for example, work sites, industrial sites, commercial sites, residential sites, natural sites, etc., which materials can be extracted in a substantially solid or semi-solid state, as well as in a substantially liquid state, without requiring the addition of water to reduce such materials to a substantially fluid state for extraction. In embodiments, the material may be extracted in a substantially continuous manner and/or may be extracted without significant contamination of the ambient environment with the material or portions thereof. In some embodiments, the material extraction assemblies and methods further may provide enhanced extraction and delivery of such materials over extended distances and to elevated positions to a material collector for removal from various environments and/or sites.

In some embodiments, a method to enhance extraction of a material from a material source to a material collector is provided, wherein the material collector can be located at an elevated position relative to the material source; and may include supplying a pressurized fluid to a vacuum source, which can include one or more vacuum generators, and generating, using the pressurized fluid, a vacuum flow for drawing semi-solid and substantially solid material from the material source, which, in embodiments, can comprise a retention collection. The method also may include conveying the material from the material source via the vacuum flow through a collection conduit and depositing at least a portion of the material from the material source in the material collector, which can include a collection box, such as a vacuum box or other container, defining a sealable chamber through which the vacuum flow is passed to create a suction force by which the material is extracted from the retention collection and drawn through the collection conduit and into the material collector and collected for disposal. The method further may include passing a vacuum exhaust or contaminated fluid/air flow or exhaust portion of the vacuum flow from the collection chamber back into the vacuum source, and out of the vacuum source and into a filter and sound attenuation chamber connected therewith, and which includes a filter media for filtering particulates and other contaminants from the vacuum exhaust fluid flow.

In embodiments, the filter and sound attenuation chamber can include, a sound attenuation assembly configured to reduce a sound level generated by one or more of the vacuum flow or generating the vacuum flow from the vacuum source. The filter and sound attenuation chamber may include an attenuation housing at least partially defining an interior chamber or interior volume being positioned to receive at least a portion of the vacuum flow from the vacuum source and attenuate sound generated by the vacuum source.

In some embodiments, the filter and sound attenuation chamber will be connected to the vacuum source by vacuum conduits, which can include, flexible hoses. For example, such flexible hoses can include 4" single braid or double braid steel hoses or other, similar conduits that are configured to bend or adjust. The vacuum conduits further can be configured to withstand higher temperature heated vacuum exhaust fluid flows, generated by use of multiple vacuum generators (e.g. 2-4 or more single or double venturi mechanisms) for creation and maintaining higher power/higher pressure vacuum flows of about 27 in-Hg to about 29 in-Hg sufficient to extract the materials over extended distances. In embodiments temperatures generated by such higher power/higher vacuum pressure vacuum flows can, for example range from at least about 125° F. to about 180° F. or greater. In embodiments, the vacuum conduits can have a diameter ranging from about 2" to about 10", through other diameter vacuum conduits also can be used.

In embodiments, the vacuum source will be configured with at least two or more, and in some embodiments, four or more vacuum generators, and in some example embodiments, the vacuum generators can further include venturi mechanisms. Other types of vacuum generating systems or devices also can be used. In addition, the use of higher temperature rated or capable vacuum conduits enables use of additional vacuum generators by the vacuum source; and thus the enables generation of increased power or higher pressure vacuum flows sufficient to maintain high vacuum pressures of about 27 in.-Hg to about 29 in.-Hg through the material collector and the collection conduit, sufficient to maintain a suction force from drawing liquid, semi-solid and solid materials through the collection conduit over extended distances of about 200 ft. or more, and in some example embodiments, between about 400 ft. to 600 ft. and in other embodiments, between about 200 ft. up to about 900 ft. (and possibly further distances); and to elevated positions and along a slope of up to about 90°.

The vacuum generators will receive a pressurized fluid flow from a fluid supply, such as one or more compressors, and will generate a high pressure vacuum flow. The vacuum flow will be supplied through the material collector and through the collection conduit for pick-up and extraction of the material from the retention collection. In embodiments, the vacuum flow will have a pressure of at least 27 in.-Hg, and in some embodiments, a pressure of upwards of about 29 in.-Hg, which vacuum pressure generally will be maintained through the collection conduit or hose over a distance of at least 200 feet about 400-600 feet or more from the vacuum box.

The vacuum flow generally will be maintained at a sufficiently high pressure to enable the removal of the material from the retention collection in semi-solid and substantially solid forms. Thus, addition of water to increase the liquid content of the material for extraction generally is not required, leading to savings in terms of less added material that must further be removed and later reclaimed, and in the time and labor required to extract and remove the material for the retention collection.

In some aspects, a method for extraction of material from a retention collection is provided, the method comprising supplying a pressurized fluid to one or more vacuum generators; generating, via the one or more vacuum generators, a vacuum flow; wherein the vacuum flow is directed through at least one material collector configured to receive and contain the material therein; extracting the material in an at least semi-solid state from the retention collection via the vacuum flow through a collection conduit to the at least one material collector as the vacuum flow passes therethrough, and, depositing at least a portion of the undesired material within the at least one material collector.

In embodiments of the method, generating the vacuum flow comprises receiving the pressurized fluid at the one or more vacuum generators, supplying the pressurized fluid to a manifold, and distributing the pressurized fluid from the manifold to a plurality of venturi mechanisms and using a venturi effect to generate the vacuum flow.

In embodiments, the method can further comprise passing a vacuum exhaust fluid/air flow portion of the vacuum flow into a filter and sound attenuation chamber for filtering the vacuum exhaust fluid/air flow of the vacuum flow.

In embodiments, the method further comprises passing a vacuum exhaust fluid/air flow portion of the vacuum flow through a filter and sound attenuation chamber including a sound attenuation assembly configured to reduce a sound level generated by one or more of the vacuum generators generating the vacuum flow.

In embodiments, the method further comprises removing water from the undesired material. In some embodiments, the at least one material collector comprises a vacuum box having a chamber with first and second portions and a screen located between the first and second portions; wherein at least a portion of the water within the material is filtered through the screen and passes from the first portion to the second portion to separate the water from substantially solid matter of the undesired material. In other embodiments, the at least one material collector comprises a vacuum box having a chamber with a screw mechanism therealong; wherein the screw mechanism urges the material toward an end of the chamber so as to cause a release of water from the material for collection.

In another aspect, an extraction assembly for extraction of material from a retention collection comprises a vacuum source including one or more vacuum generators configured to generate a vacuum flow between the retention collection and the vacuum source sufficient to extract and convey the material from the retention collection to an elevated position; at least one compressor coupled to the one or more vacuum generators for supplying a pressurized air flow to the one or more vacuum generators and configured to supply; a material collector including a chamber defining an interior collection volume configured to receive and retain at least a portion of the material extracted from the retention collection; and a vacuum shut-down assembly coupled to the vacuum source and comprising a series of actuator valves located adjacent one or more fluid supply ports through which the pressurized air flow is supplied from the at least one compressor to the one or more vacuum generators, and at least one control; wherein actuation of the at least one control causes the actuator valves to close and substantially stop inflow of the pressurized fluid (e.g. compressed air) flow to the one or more vacuum generators so as to halt generation of the vacuum flow by the one or more vacuum generators.

In an embodiment, the extraction assembly further comprises a filter and sound attenuation chamber connected to the vacuum source, the filter and sound attenuation chamber including a housing at least partially defining an interior chamber or interior volume configured to receive a vacuum exhaust fluid flow of the vacuum flow from the vacuum source and filter contaminants the vacuum exhaust fluid flow.

In some embodiments of the extraction assembly, each of the one or more of the vacuum generators comprises a venturi mechanism configured to receive pressurized fluid from the at least one compressor and use a venturi effect to generate the vacuum flow between the retention collection and the vacuum source.

In some embodiments of the extraction assembly, each of the one or more vacuum generators comprises a venturi mechanism configured to receive pressurized fluid from the at least one compressor and use a venturi effect to generate the vacuum flow through and to the retention collection the material collector the vacuum flow having a vacuum pressure of approximately 29 in.-Hg at a distance of at least 200 feet from the material collector.

In embodiments, the extraction assembly further comprises a battery configured to store electric energy to supply to the extraction assembly for operation. In some embodiments, the extraction assembly further comprises a solar panel configured to supply electrical energy to one or more of the battery or the extraction assembly for operation.

In some embodiments, the extraction assembly further comprises a plurality of conduits extending between the vacuum source and a filter and sound attenuation chamber, wherein the conduits can comprise flexible 4" single or double braid steel hoses configured to withstand vacuum exhaust fluid/air flow temperatures of at least about 125° F. or greater. Other diameter hoses, e.g. between about 2" or less to about 6"-10" or more) also can be used.

In some embodiments of the extraction assembly, the plurality of vacuum generators can comprise two or more vacuum generators, the two or more vacuum generators being configured to operate in parallel to enhance vacuum pressure generated by the vacuum source In some embodiments, the vacuum shut-down assembly can further comprise a pair of vacuum valve controls located at opposite ends of the vacuum source, and wherein upon extraction of at least one of the vacuum valve controls, the actuators close at one or more the fluid supply ports flow control valves through which the pressurized fluid flow is supplied to the vacuum source to halt generation of the vacuum flow, and open an air release valve.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIGS. 1A and 1B are a schematic side views of an example material extraction assembly for extraction of material from a retention collection including an example embodiment detailed end views of example embodiments of a vacuum source according to embodiments of the disclosure.

FIG. 7A is a schematic side view of an example material collector and an example carrier for transportation and/or orientation of the material collector, according to embodiments of the disclosure.

FIG. 7B is a schematic end view of the example material collector and example carrier shown in FIG. 7A, according to embodiments of the disclosure.

FIG. 8A is schematic side view of an example vacuum generation and sound attenuation assembly, according to embodiments of the disclosure.

FIG. 8B is a schematic top view of the example vacuum generation and sound attenuation assembly shown in FIG. 8A, according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1B:
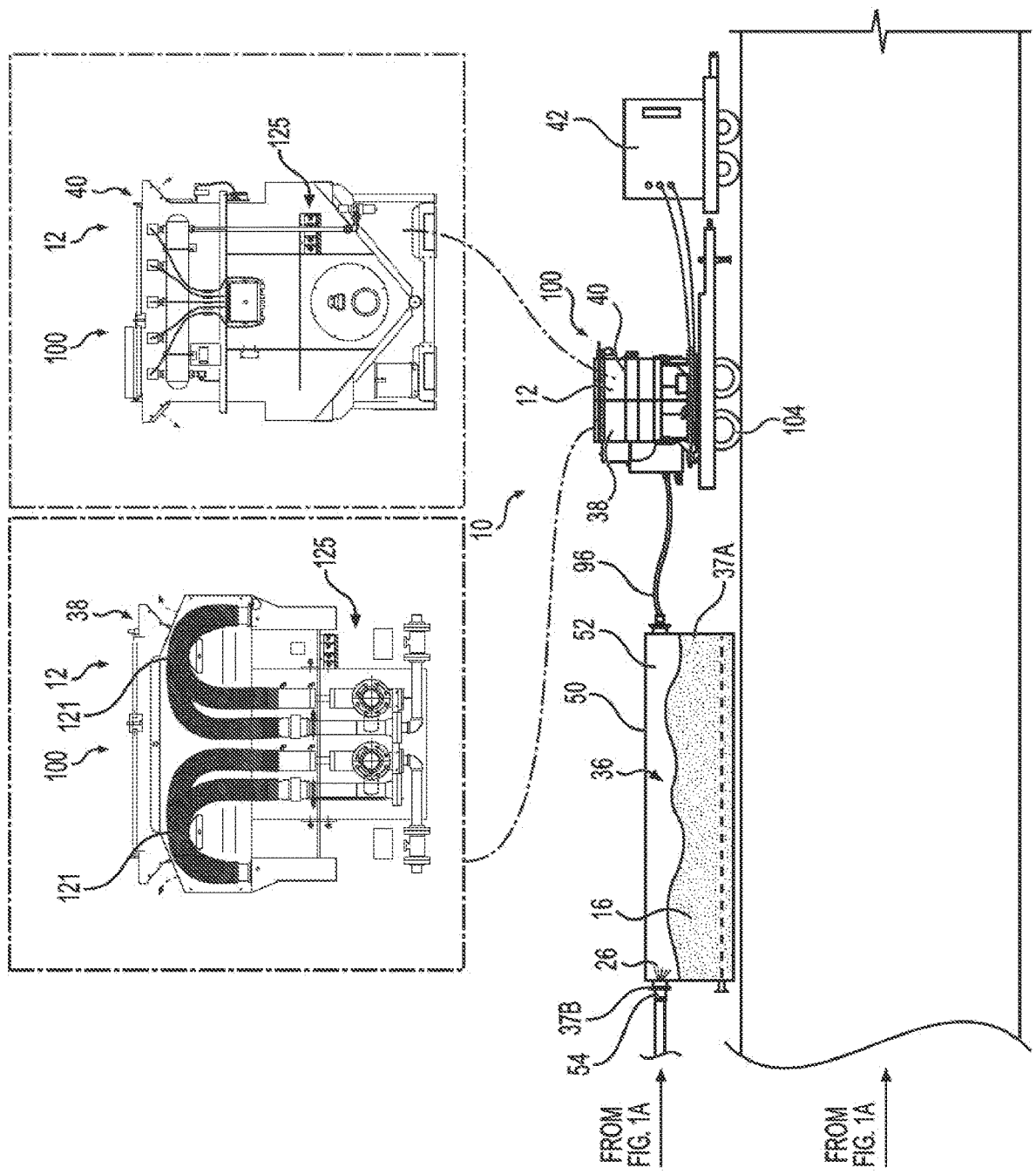

FIGS. 1A-1B, taken together illustrate schematic side views of an example material extraction assembly 10 including an example vacuum generation assembly 12, according to embodiments of the disclosure. The example material extraction assembly 10 may be configured to extract material 16 from a source of the material, that, in embodiments of the present disclosure can include a retention collection "14", such as a retention pond or other retention collection areas or material source. In embodiments, the material extraction assembly 10 may be used for extraction of a variety of different materials from a variety of different environments. For example, various materials, including by-products from various industrial processes and other waste materials, may be deposited or accumulated in retention collections, mixing with run-off water and/or other liquids, and creating a sludge or semi-solid/substantially solid waste material that needs to be removed from the environment. In some embodiments, the assemblies and methods may provide efficient extraction of the material to be removed from various environments, such as, for example, work sites, industrial sites, commercial sites, residential sites, natural sites, etc. Thus, while embodiments of the present disclosure discuss the use of the material extraction assembly 10 for extraction of materials from a retention collection, the material extracted assembly also can be used for extraction of a variety of material at a variety of sites.

Some embodiments disclosed herein may relate to material extraction assemblies and methods for extracting material from a source of the materials, such as, for example, removing undesired material from environments, such as, for example, industrial environments. In some embodiments, the undesired material typically may include substantially liquid, semi-solid, and/or substantially solid materials, such as waste or sludge collected in retention collections such as retention ponds or other collection areas at various locations, such as oil and/or gas production and refinery sites, water and sewage treatment facilities, remediation sites, and/or other industrial sites. It will also be understood that the industrial environments, retention collections, and the associated materials being removed/extracted as discussed herein are merely examples, and other types of environments and/or removal of a variety of other types of materials are contemplated. The material extraction assembles also can be operated at a wide range of temperatures, including temperatures below freezing, at which the extracted material can comprise mostly solid (e.g. frozen) materials.

The materials collected and removed from the retention collection further can include other solid materials, such as one or more of pall rings, beads, balls, pellets, sand, rocks, or other solid objects, which may be collected with the waste material deposited in the retention collection. Embodiments may also relate to assemblies and methods for conveying and depositing new and/or recycled material from a source of the material. For example, some embodiments disclosed herein may facilitate extraction of undesired materials or deposition of new and/or recycled material from or to an industrial environment using, for example, a high-pressure vacuum flow. Removing undesired material from an industrial environment using a high-pressure vacuum flow may provide for time-efficient removal of the undesired materials and/or may reduce or prevent contamination of the ambient environment with the undesired material or portions thereof; and provide for time-efficient replacement of said materials in the industrial environment.

FIGS. 1A-1B schematically depict an example material source 16 that, in the present embodiment, as shown as collected within a retention collection such as a retention pond 14. Retention ponds 14 generally are held to collect run-off water that, in many cases, further will include, or carry with it contaminants such as hydrocarbon by-products, chemical waste, sediment, and other matter including debris and other solid materials. Such collected material can form a semi-solid slurry or sludge, and as the water in the retention pond evaporates, can form more solid pieces of contaminated or waste material. Removing such materials in a semi-solid or substantially solid state has been shown to be difficult without addition of substantial amounts of water sufficient to put the material into a much more liquid or flowable state, though that increases the amount of material to be removed as well as the time and labor to do so.

As schematically depicted in FIGS. 1A-1B, the material extraction assembly 10 and related methods, according to at least some embodiments, may facilitate extraction of waste or other undesired extracted materials 16 from a retention pond 14 or other collection area, using one or more high-pressure vacuum flows. The use of high-pressure vacuum flows may facilitate extraction of the undesired material 16, for example, from retention ponds at remote locations where there is limited physical access and where the undesired material is collected at a lower elevation and at extended distances from the material extraction assembly. The use of high-pressure vacuum flows also may facilitate parallel removal of the undesired material 16 from multiple locations within the source of the material.

In some embodiments, the material extraction assembly 10 may be configured to efficiently extract the undesired material 16 from a retention pond located at a lower elevation and along extended distances of about 100 ft. to 900 ft., and, in embodiments, can range from about 100 ft. to 800 ft., 100 ft. to 700 ft., 100 ft. to 600 ft., 100 ft. to 500 ft., 100 ft. to 400 ft., 100 ft. to 300 ft., 100 feet to 200 ft., though other distances or lengths of travel of the extracted material 16 also can be provided, for example, by generating a high-pressure vacuum flow and directing the high-pressure vacuum flow along a flow path extending to the retention pond and back. In some embodiments, the high-pressure vacuum flow may generate suction directed out of an interior chamber or volume of a material collector 36 through an outlet port 24 so as to create a vacuum induced material flow 26 coming from the retention pond to the material collector with at least a portion of the undesired material 16 entrained in the vacuum induced vacuum flow 26.

Applicant has recognized that the undesired material may present a contamination threat to areas near the material extraction assembly 10. The undesired material 16 may include significant quantities of small particles that may be difficult to control. In some embodiments, the material extraction assembly 10 may facilitate extraction of undesired material with an at least partially sealed system. For example, the at least partially sealed system may be configured to extract and transfer the undesired material, including substantially solid materials from the retention collection 14 to a material collector 36 using a substantially sealed fluid flow path 26 having a limited number of potential exit points. In some embodiments, exhaust or contaminated air flow portions of the returned vacuum flow may be filtered prior to exiting the flow path to limit or prevent discharge of particulate forms of the undesired material from at least some embodiments of the material extraction assembly 10.

Applicant also has recognized that the undesired material 16 may be heterogeneous in nature and/or may include material that ranges in size from particulates to one or more inches in size. The undesired material 16 may also be in various states of matter. For example, some portions of the undesired material 16 may be substantially solid, or semi-solid and other portions may be liquid or semi-liquid. Conventional approaches to material removal may be unable to effectively process heterogeneous undesired materials. In some embodiments, the material extraction assembly 10 may facilitate extraction of heterogeneous undesired material, for example, using the high-pressure vacuum flow 26. In some embodiments, the high-pressure vacuum flow 26 may be capable of moving a broad range of materials in various states of matter. The use of a high-pressure vacuum flow 26 for material extraction may facilitate substantial containment of removed undesired material 16, thereby limiting or preventing release into or contamination of the ambient environment with portion of the extracted undesired material 16.

The example material extraction assembly 10 shown in FIGS. 1A-1B may be used to extract undesired material 16 from various environments. While described with respect to use in extracting materials 16 from a retention collection 14 such as a retention pond; at least some embodiments of the material extraction assembly also may be used to remove undesired material 16 from other environments, including, for example, commercial, residential, and natural environments. As shown in FIGS. 1A-1B, the example material extraction system 10 may use a high-pressure vacuum flow 26 to extract materials from industrial or other environments. For example, the high-pressure vacuum flow 26 may move the undesired material 16 along a flow path to extract and remove it from the retention pond. Once extracted, in some embodiments, the undesired material 16 may be transported to a site remote from the industrial environment, for example, for disposal, recycling, and/or remediation.

In some embodiments, for example, as shown in FIGS. 1A-1B, the material extraction assembly 10 may include a material collector 36, a vacuum source 38, a filter and sound attenuation chamber 40 for filtering contaminated air/exhaust from the material collector, and which may also include a sound attenuation assembly 41 connected to the vacuum source 38, and a fluid source 42 configured to provide pressurized fluid to the vacuum source 38. In some embodiments, one or more of the components of the material extraction assembly, such as the material collector 36, the vacuum source 38, the filter and sound attenuation chamber 40, or the fluid source 42 further may be configured to be easily transported between geographical locations for use at different environments, for example, by being supported on one or more trailers including wheels, tracks, skids, or other devices for facilitating movement between geographical locations. In some embodiments, components such as the vacuum source and filter and sound attenuation chamber generally can be provided as a unitary structure or module for ease of transport and operation.

Figure 2:
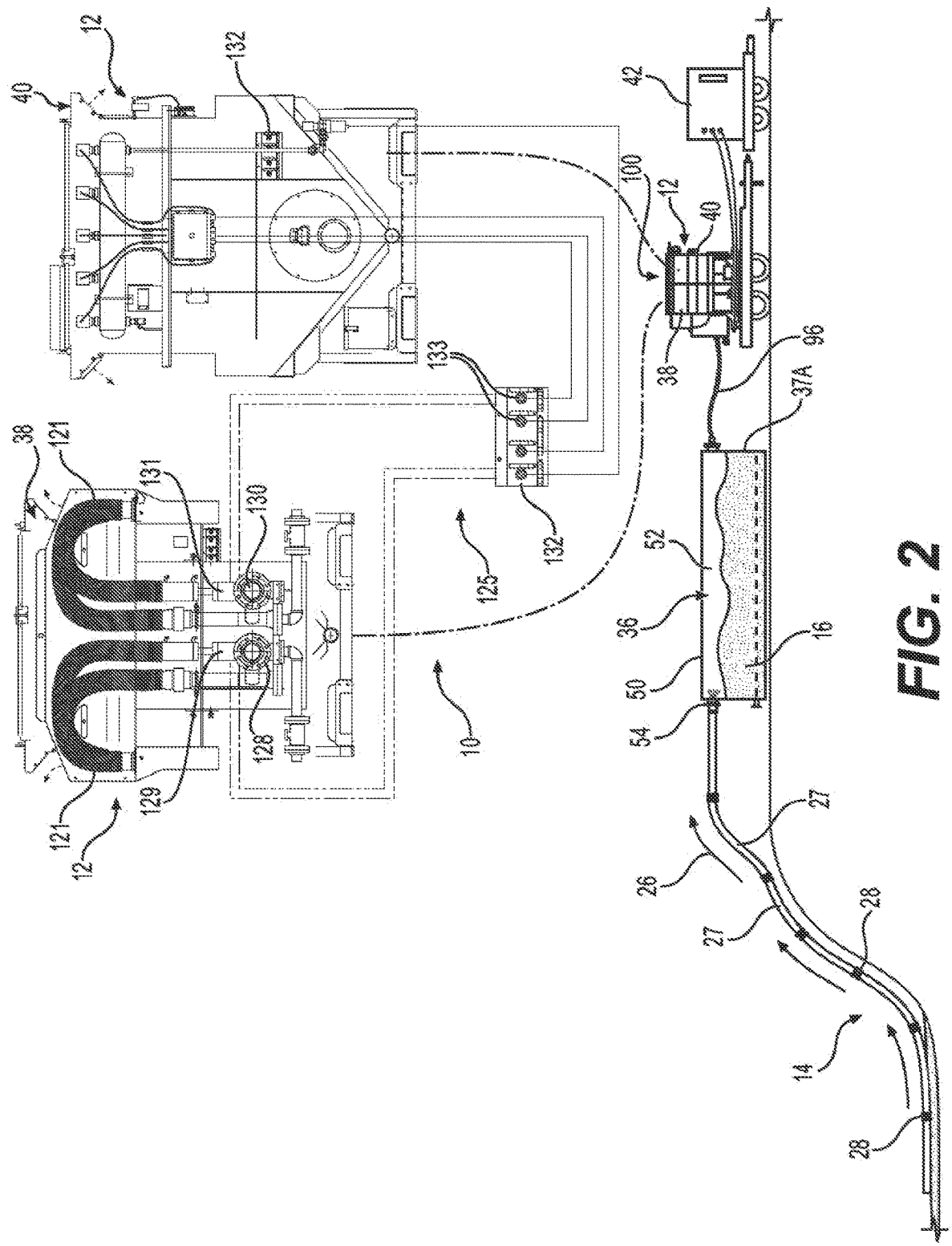
FIG. 2 is an end view schematically illustrating an example vacuum generation assembly with a vacuum shut-down system, according to embodiments of the disclosure

As indicated in FIGS. 1A-1B and 2, by way of example and not limitation, one or more of the material collector 36, the vacuum source 38, or the filter and sound attenuation chamber 40 may be arranged to form a flow path beginning at the source of the material (e.g., at the retention pond 14) and terminating at the filter and sound attenuation chamber 40. The flow path may be used to extract undesired material 16 from the reaction vessel 14 including extraction of the undesired material in semi-solid and substantially solid states, without requiring additional water be added to the undesired material, and, in some embodiments, limit contamination of the ambient environment. For example, the vacuum source 38 max generate a vacuum flow along the flow path, thereby generating a suction proximate the undesired material 16 in the retention pond 14 to draw the undesired material 16 into and along the flow path out of retention pond 14 and into material collector 36, for extracting and removal of the undesired material 16 from the retention pond. In some embodiments, a major portion of the undesired material 16 may be deposited in the material collector 36. In some embodiments, a minor portion of the undesired material 16 may flow from the material collector 36, through the vacuum source 38, and into the filter and sound attenuation chamber 40, entrained within a vacuum exhaust or contaminated air flow portion of the vacuum flow exhausted from the vacuum source. In some embodiments, the filter and sound attenuation chamber 40 may be configured to remove (or reduce) the minor portion of the undesired material 16 in the fluid flow prior to the fluid flow being exhausted into the ambient environment.

In some embodiments, to form the flow path, the material collector 36 may be pneumatically connected to the vacuum source along a first end 37A thereof, and to at least one collection conduit 46 at a second end 37B. In embodiments, the collection conduit can include a hose or a plurality of hose sections 27, which can be releasably coupled in series by cam-lock fittings 28 or similar coupling mechanisms. By way of example, in embodiments, the hose sections 27 each can extend approximately 15 ft.-30 ft. in length and have a diameter of, about 6" in diameter. In other embodiments, other size hose sections can be used, including diameters ranging from about 4" to about 8", though other diameter and length hose sections also can be provided. The hose sections will be connected together and to the material collector, such as at an intake port provided 54 at the second end 37B of the material collector, defining an extended length vacuum flow path 26 extending between the material collector and the retention collection 14, as indicated in FIGS. 1A-2.

As shown in FIGS. 1A-2, the collection conduit generally will have sufficient flexibility to extend down and along the contour of the side of the retention pond, and to enable movement thereof by workers. Other piping or types of hoses, including more rigid materials such as polyethylene piping, also can be used. The collection conduit will apply a suction created by the generation of the vacuum flow supplied to and passing within the material collector to the undesired material 16 within the retention pond 14 to draw-in and convey the extracted undesired material to the material collection. As also indicated in FIGS. 1A-2, the suction applied will move the extracted undesired material from the retention pond to an elevated positon, and will be controlled so as to enable such suction to be maintained over distances ranging from about 200 ft. to upwards of about 900 ft.

In some instances, the undesired material 16 in the retention pond 14 may present a clogging potential. For example, the undesired material 16 may include relatively large components that may tend to wedge or catch on structures through which the undesired material 16 is drawn. In some embodiments, the conduit 46 may be, at least in part, transparent, translucent, and/or capable of providing an indication of the contents passing through the conduit 46, which may be usable to detect and/or diagnose whether the conduit 46 is clogging. As noted herein, the undesired material 16 may be heterogeneous and may include relatively large components that may tend to clog narrow passages (e.g., constrictions in the conduit 46). To reduce the risk of clogging, in some embodiments, the collection conduit 46 may include, at least in part, a smooth inner surface, such as may be present in poly pipe. A smooth inner surface may reduce the risk of, or prevent, clogging of the collection conduit 46. In addition, in embodiments as indicated in FIG. 1A, the endmost hose section further can include a suction wand 29 (e.g. pipe or extension piece of a reduced diameter), couples thereto. The suction wand can comprise a smaller size hose or pipe, e.g. a 3-4" diameter pipe, and can also have a guard at its open end, configured to restrict entry of a person's hand and/or larger objects that could create a blockage.

Although the example suction manifold 44 is shown in FIGS. 1B-2 as only being pneumatically connected to one material collector 36, in some embodiments, multiple material collectors may be arranged in parallel to, for example, scale-up the extraction capacity of the material extraction assembly 10. For example, a series of material collectors can be arranged in rows or otherwise in adjacent positions such that as one material collector is filled, it can be disconnected from the vacuum source and the collection conduit, and a next material collector connected to the vacuum source and collection conduit and the extraction operation continued with downtime of the extraction operation substantially minimized.

During an extraction operation, a major portion of the undesired material 16 will be collected in the material collector 36. In some embodiments, however, some (e.g., a minor portion) of the undesired material 16 may flow out of the material collector 36 along a return portion of the flow path of the high-pressure vacuum flow 26 back into the vacuum source. In some embodiments, the material collector 36 generally will remove a major portion of the undesired material 16 from the fluid flow it receives along the flow path of the vacuum flow 26; and in some cases may receive substantially all, of the material extracted out of the retention pond 14. The material collector 36 also may include one or more structures configured to trap a major portion of the undesired material 16 in the fluid flow received inside the material collector 36. Once trapped, the major portion of the undesired material 16 may be retained in the material collector 36, for example, for disposal, recycling, and/or remediation.

Applicant has recognized that it may be desirable to rapidly convey materials in large quantities and/or in an efficient manner to desired locations, for example, that may present unique challenges. For example, it may be difficult to rapidly convey large quantities of materials to an elevated position relative to a source or supply of the material. Although liquid materials may be pumped to elevated positions using conventional pumps, other types of materials, such as semi-solid materials, sludge, particulates, sand, gravel, and discrete solid materials of regular or irregular sizes and shapes may be difficult efficiently to convey to elevated locations. For example, environments similar to the example environment illustrated in FIGS. 1A-2 may present a desire to convey a material from a lower location to an elevated position relative to the retention pond (e.g. from the bottom of a retention pond).

Figure 3:
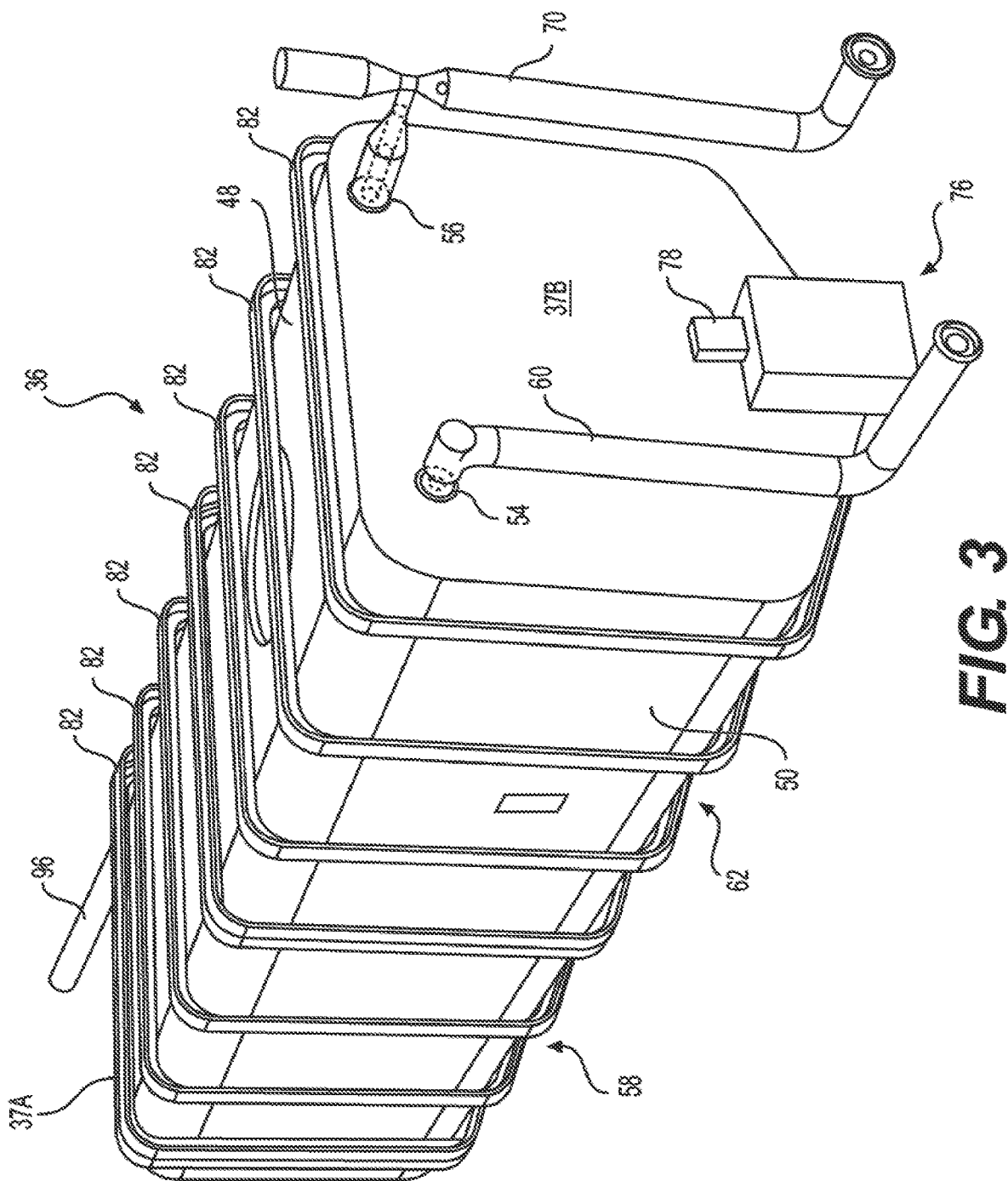
FIG. 3 is a schematic perspective view of an example material collector including an example vacuum box for a material extraction system, according to embodiments of the disclosure.
Figure 4:
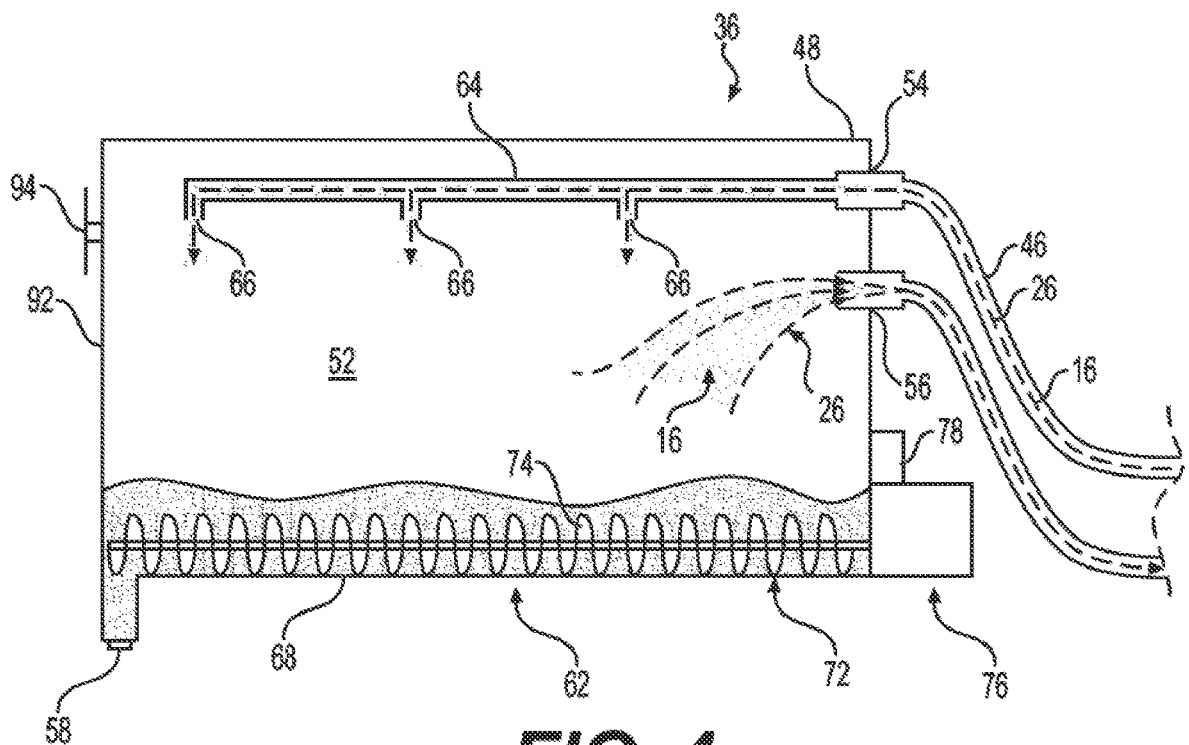
FIG. 4 is a schematic side section view of an example material collector, according to embodiments of the disclosure.
Figure 5:
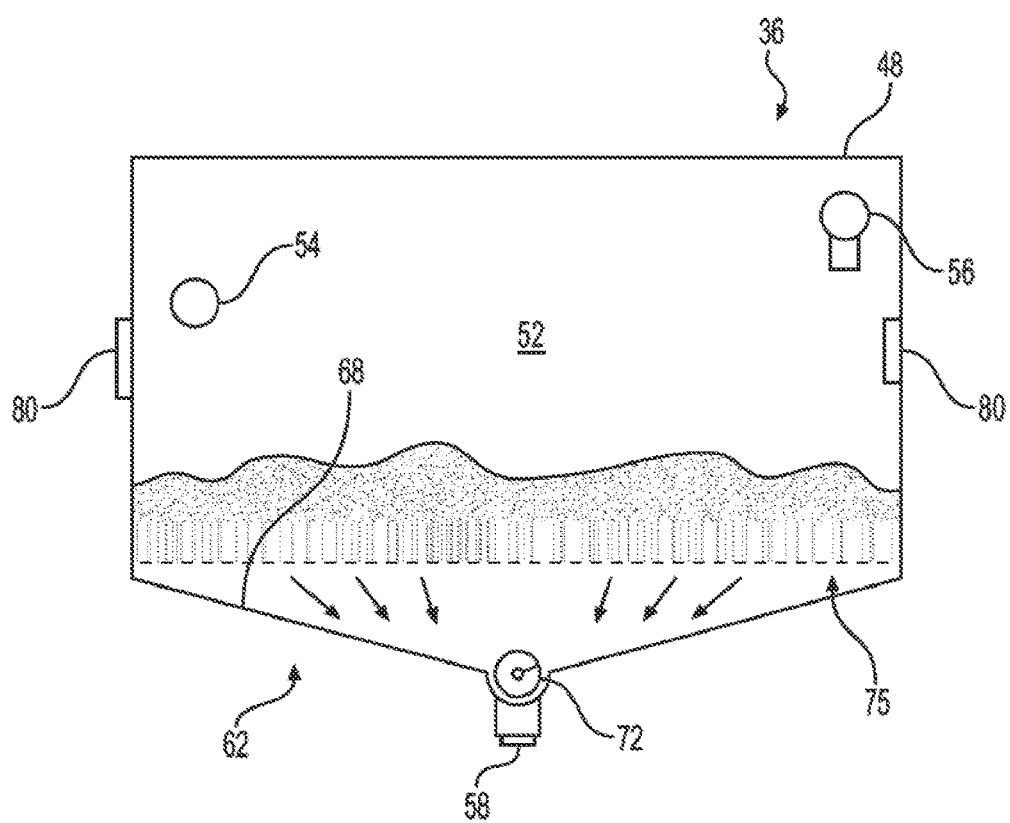
FIG. 5 is a schematic end section view of an example material collector, according to embodiments of the disclosure.

FIG. 3, FIG. 4, and FIG. 5 are schematic views of example material collectors 36, including an example vacuum box 48, according to embodiments of the disclosure when used for collecting waste or undesired material 16. FIG. 3 is a schematic perspective end view of an example material collector 36 including an example vacuum box 48. In some embodiments, the vacuum box 48 may define a structure through which the vacuum flow 26, including entrained undesired material 16, may traverse along the flow path of the vacuum flow 26. In some embodiments, the vacuum box 48 may include a housing 50 having first and second ends. The housing 50 further will include one or more walls at least partially defining an interior chamber or volume 52 of the housing 50 (see FIGS. 4 and 5). In some embodiments, the housing will be covered with a sealable cover such that the interior chamber 52 may be substantially sealed from the ambient environment by the housing 50, for example, so that a vacuum may be applied to the interior chamber 52, and a flow path through the interior chamber 52 may be established via the vacuum flow 26.

In some embodiments, as shown in FIG. 3 through FIG. 5, a plurality of ports may be provided in/on the housing 50 to facilitate the flow of fluid into and out of the interior chamber 52 of the housing 50. For example, each of the ports may (i) facilitate access to the interior chamber 52, (ii) facilitate connection of conduits or other structures to provide fluid flow through the interior chamber 52 along a flow path with other components of the material extraction assembly 10, and/or (iii) to facilitate removal of portions of undesired material 16 from the interior chamber 52.

For example, the ports may include an inlet port 54, a vacuum port 56, and a discharge port 58. The inlet port 54 may be positioned on the housing 50 and configured to allow access to the interior chamber 52 from outside the housing 50. The inlet port 54 may include an aperture through a wall of the housing 50 that facilitates pneumatic connection of the interior chamber 52 to other components of the material extraction assembly 10. In some embodiments, the inlet port 54 may be pneumatically connected to the collection conduit (FIGS. 1A-2). When connected to these reaction vessel ports 24, a fluid flow including undesired material 16 from the reaction vessel 14 may flow into the interior chamber 52 through the inlet port 54.

As shown in FIG. 4, in some embodiments, the inlet port 54 may be connected to one or more conduits 60 and/or other fluid flow components to form a flow path to various locations outside the housing 50. In some embodiments, the inlet port 54 may be connected to the one or more conduits 60 to connect a location where the inlet port 54 passes through housing 50 to a location that is more easily accessible for a person to secure pneumatic connections between the inlet port 54 and other components of the material extraction assembly 10. For example, with reference to FIG. 3, the inlet port 54 may extend through a wall of the housing 50 toward the top of the housing 50 and may include conduits 60 to enable the inlet port 54 to be accessible to a person located at a lower portion 62 of the material collector 36.

Applicant has recognized that for applications when undesired material 16 is being extracted from the reaction vessel 14, the vacuum box 48 may be able to store only a limited quantity of material and that the amount of the limited quantity may depend, for example, on how the material is distributed in the interior chamber 52 of the housing 50. For example, if material is deposited in the interior chamber 52 near locations where fluid flow may exit the interior chamber 52, significant quantities of the material in the interior chamber 52 may be drawn out of the interior chamber 52 rather than being retained in the vacuum box 48. The reaction vessel 14 (or other sources of material to be extracted) may include a greater volume of material than the vacuum box 48 is able to hold.

In some embodiments, the vacuum box 48 may be configured to facilitate distribution of material within (e.g., throughout) the interior chamber 52 of the vacuum box 48. Distributing the material in the interior chamber 52 may increase the amount of material that may be retained in the interior chamber 52 without increasing the rate at which the material exits vacuum box 48 due to fluid flow through the interior chamber 52 of the vacuum box 48. This may result in the vacuum box 48 having an increased effective material capacity (e.g., the maximum material capacity at which the quantity of material exiting a structure passes a threshold level) as compared to other structures that do not distribute material throughout their respective interiors. The increased effective material capacity of some embodiments of the vacuum box 48 may reduce the rate at which the vacuum box 48 may need to be replaced as a result of being full due to the use of high-pressure vacuum flow 26 for material extraction. In some embodiments, the vacuum box 48 may facilitate time-efficient replacement in a material extraction assembly, so as to enable the material extraction system to substantially continuously remove undesired material 16 using multiple vacuum boxes 48.

As shown in FIG. 4, in some embodiments, the vacuum box 48 may include a conduit 64 configured to distribute the undesired material 16 within the interior chamber 52 of the vacuum box 48. For example, the conduit 64 may be positioned in the interior chamber 52 and connected to a portion of the inlet port 54 that passes through a wall of the housing 50, so as to position the fluid flow inside the interior chamber 52 of the housing 50. In some embodiments, the conduit 64 may include multiple conduit ports 66 to facilitate distribution of the undesired material 16 within the interior chamber 52 of the housing 50, for example, by directing the fluid flow from the reaction vessel 14 traveling along the flow path to multiple locations within the interior chamber 52 of the housing 50. The multiple locations may be distributed along the length and/or width of the vacuum box 48, for example, so that the undesired material 16 entrained in vacuum flow 26 is distributed throughout the interior chamber 52 (e.g., rather than being generally deposited at a single location). The conduit ports 66 may be positioned to direct the undesired material 16 in the vacuum flow 26 toward the floor 68 of the housing 50, which may, in some embodiments, be shaped (e.g., V-shaped) to cause the undesired material 16 to flow toward the center of the floor 68, for example, as shown in FIG. 5. In some embodiments, the positioning of the conduit ports 66 may cause a major portion of the undesired material 16 to fall via gravity to the floor 68. For example, by being directed toward floor 68, the undesired material 16 entrained in the vacuum flow 26 may fall below the vacuum port 56, rendering the undesired material 16 less likely to exit the interior chamber 52 of the housing 50 due to the force of gravity.

In some embodiments, the vacuum port 56 may be positioned on the housing 50 to facilitate access to the interior chamber 52 from outside the housing 50, for example, to facilitate the high-pressure vacuum flow 26 to be applied to the interior chamber 52 of the housing 50. The vacuum port 56 may include an aperture passing through a wall of the housing 50 and may allow for the interior chamber 52 to be pneumatically connected to other components of the material extraction assembly 10. In some embodiments, the vacuum port 56 may be pneumatically connected to the vacuum source 38 to enable the vacuum source 38 to apply a vacuum to the interior chamber 52 of the housing 50. The one or more conduits 70 and/or other fluid flow components may form a flow path from the interior chamber 52 to various locations outside the housing 50. In some embodiments, the one or more conduits 70 may be connected at a location where the vacuum port 56 passes through a wall of the housing 50 to a location more easily accessible to a person to make pneumatic connections between the vacuum port 56 and other components of the material extraction assembly 10. For example, as shown in FIG. 3, the vacuum port 56 may extend through a wall of the housing 50 toward the top of the housing 50 and may include conduits 70 to enable the vacuum port 56 to be accessible to a person toward the lower portion 62 of the material collector 36.

In some embodiments, the interior chamber 52 may be placed along the flow path through which the undesired material 16 flows. In some embodiments, the inlet port 54 and the vacuum port 56 may be positioned with respect to the interior chamber 52 of the housing 50 to establish a flow path into and out of the interior chamber 52 of the housing 50. The flow path may cause fluid flow directed into the inlet port 54 to flow through the interior chamber 52 and out the vacuum port 56. The flow path through the interior chamber 52 may be placed along the flow path through the material extraction assembly 10. The flow path may be used in combination with other flow paths, for example, flow paths parallel to one another, to enhance the rate at which undesired material may be removed, to enhance the strength of the applied high-pressure vacuum flow 26 to facilitate removal of materials presenting a challenge to extraction (e.g., materials having a higher viscosity, materials including significant solid content, etc.), or for other purposes.

In some embodiments, the vacuum box 48 may be configured to move the undesired material 16 in the interior chamber 52 to reduce the likelihood of it flowing out the vacuum port 56, which may improve the capacity of the vacuum box 48. For example, the vacuum box 48 may include a material mover 72 configured to move the undesired material 16 within the interior chamber 52, for example, as shown in FIG. 4. Moving the undesired material 16 in the interior chamber 52 may further distribute the undesired material 16 in the interior chamber 52, thereby further increasing the effective undesired material capacity of the vacuum box 48. In some embodiments, the material mover 72 may apply force to various portions of the undesired material 16 in the interior chamber 52 to change the locations of the portions within the interior chamber 52. As shown in FIG. 4, in some embodiments, the material mover 72 may include an auger 74 and a drive unit 76 connected to the auger 74 and configured to drive (e.g., rotate) the auger 74.

In some embodiments, the auger 74 may be positioned in the interior chamber 52 to distribute the undesired material 16 within the interior chamber 52. The auger 74 may include a drill, one or more helical flights, and/or other structures for applying force to the undesired material 16 in the interior chamber 52 of the housing 50. For example, when the auger 74 rotates, a drill or helical flights of the auger 74 may apply force to the undesired material 16 to move it within the interior chamber 52. The movement caused by auger 74 may more evenly distribute the undesired material 16 within the interior chamber 52, for example, to reduce the likelihood of the undesired material 16 flowing out the exhaust port 56.

The movement of the undesired material within the vacuum box by the auger 74 further can be controlled so as to urge the undesired material toward a first or upstream end thereof. This can help to compact the extracted material for disposal, and in addition, can help facilitate dewatering of the extracted material. The extracted material typically can include a substantial amount of water, e.g. 50% or more in some cases. Since any water contained within the undesired material will have to be disposed of with the undesired material, dewatering/reducing the amount of water within the extract material enables an increase in the amount of more solid containment material that can be collected in the material collector for disposal. Dewatering of the undesired material collected within the vacuum box can reduce the water content down to about 20%. This dewatering further enables recapture of at least a portion of the water within the undesired material, on site for remediation and re-use at the site.

FIG. 5 illustrates an alternative embodiment of a vacuum box 48 with a dewatering feature, in this example, shown as a screen 75 arranged below the undesired material received and collected within the vacuum box. For example, the screen 75 can include a removable screen or filter material that is inserted into or otherwise placed into the interior chamber of the vacuum box. The screen can comprise a rigid screen or a flexible fabric filter material having a selected apparent opening size (AOS) sufficient to enable passage of water from the undesired material while filtering out solid materials and even finer particulates, without being clogged or the passage of water therethrough being blocked.

In some embodiments, the screen can include a steel 75 or other metal mesh and can be removeably mounted within the chamber of the vacuum box, e.g. between a first portion located above the screen and in which the undesired material is collected, and a second portion below which water drained from the undesired material can be recovered. In embodiments, the screen can be mounted to or formed as part of a tray that can be moved into and out of the interior chamber of the vacuum box. In addition, in embodiments, the screen can have an AOS in a range from about 40 mesh (sieve) to about 200 mesh (sieve) (e.g., about 380 microns to about 75 microns), to filter out approximately 85% of particulates or greater, though other mesh sizes also can be used.

In other embodiments, the screen can comprise a flexible screen material, such as a geotextile or other fabric. The flexible screen material can be laid into and cover sides and a portion of the bottom of the vacuum box to filter water released from the undesired material to a released valve at the bottom of the vacuum box. The flexible screen material can have an AOS of at least about 40 mesh (sieve) to about 200 mesh (sieve) (e.g., about 380 microns to about 75 microns), sufficient to filter out approximately 85% or greater of particulates in the reclaimed water. After use, the flexible screen material can be disposed of, instead of undergoing a separate cleaning process as with a replaceable/reusable metal screen. In addition, in embodiments, a water soluble polymer material can be added to the undesired material before or during extraction and collection thereof within the vacuum box, which can further facilitate the removal and capture of water from the extracted material.

The drive unit 76 may include a motor or other type of actuator usable to rotate the auger 74 by application of a rotational force. In some embodiments, the drive unit 76 may include a hydraulic motor driven using electric power. The quantity of electric power required to rotate auger 74 by the drive unit 76 may be directly related to the quantity of undesired material 16 in the interior chamber 52. For example, as the quantity of undesired material 16 in the interior chamber 52 increases, it may require progressively larger amounts of electric power for the drive unit 76 to rotate the auger 74. As a result, the quantity of electrical power used by the drive unit 76 may be used to determine the load on the auger 74 and/or the quantity of the undesired material 16 in the interior chamber 52 of the housing 50.

To manage the operation of auger 74, in some embodiments, the drive unit 76 may be operably connected to a drive controller 78, which may be coupled to system level controllers. The drive controller 78 may direct, instruct, or otherwise orchestrate operation of the drive unit 76. The drive controller 78 may include computing hardware (e.g., processors, memory, storage devices, communication devices, other types of hardware devices including circuitry, etc.) and/or computing instructions (e.g., computer code) that when executed by the computing hardware cause the drive controller 78 to provide its functionality.

Figure 6:
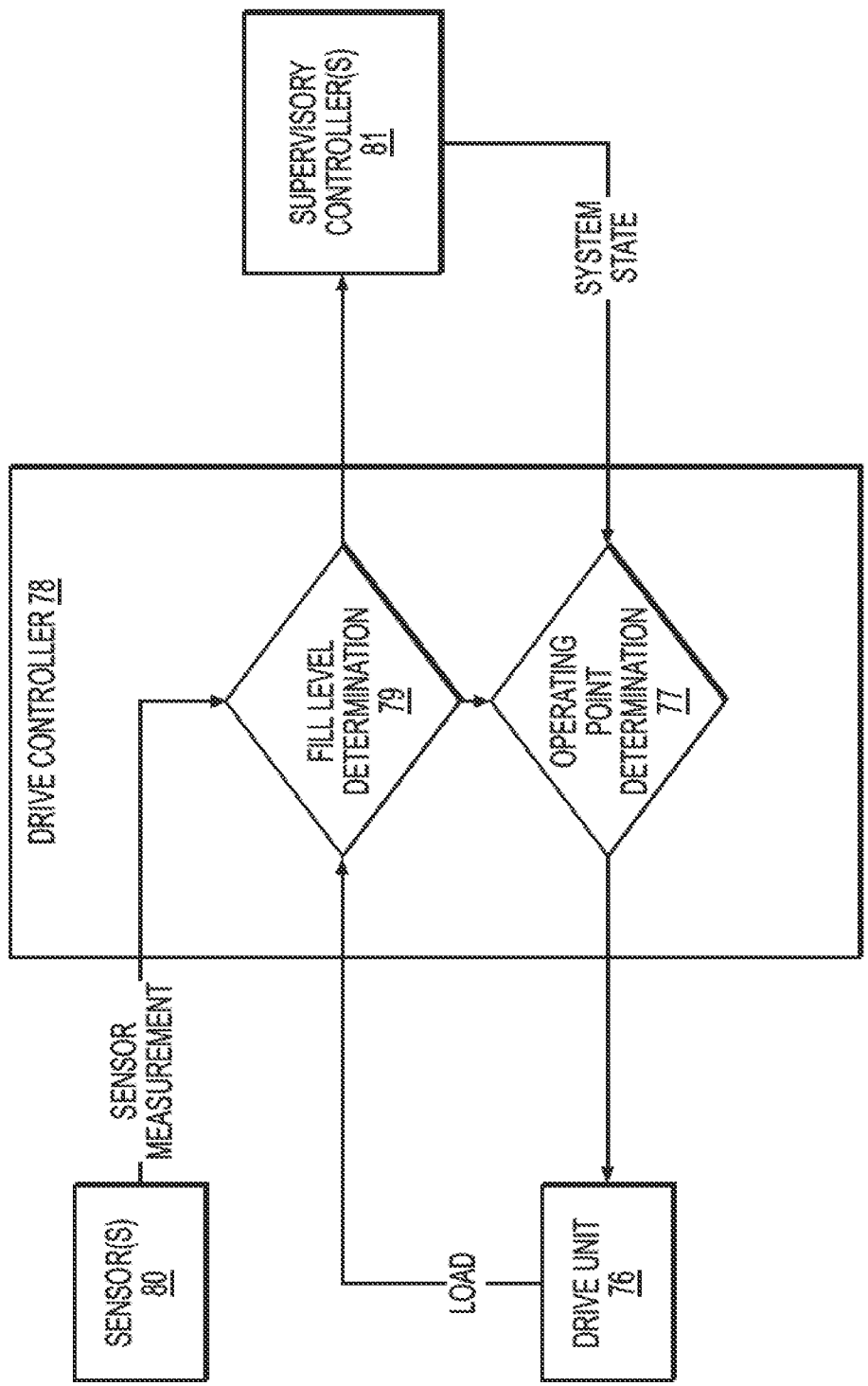
FIG. 6 is a block diagram of an example architecture for operating point determination for a material collector of a material extraction assembly, according to embodiments of the disclosure.

In some embodiments, the drive controller 78 may utilize its computing hardware to set an operating point 77 for the drive unit 76. For example, FIG. 6 is a block diagram of an example architecture for operating point 77 determination for a material collector 36 of a material extraction assembly 10, according to embodiments of the disclosure. For example, to set the operating point 77 of for the drive unit 76, the drive controller 78 may receive information from the drive unit 76 relating to the load placed on the drive unit 76 to drive, for example, the auger 74. For example, drive controller 78 may be configured to monitor the quantity of electric power used by the drive unit 76 to drive the auger 74 over time. For example, the drive unit 76 may communicate one or more signals indicative of its electrical power consumption to the drive controller 78. The drive controller 78 may include a data structure (e.g., a table, list, function, etc., stored in the computer hardware) usable to estimate the fill level 79 (e.g., a fill level determination 79 as shown in FIG. 6) of the vacuum box 48, for example, based at least in part on the electric power consumption of drive unit 76. For example, the data structure may include a lookup table that provides the fill level 79 of the vacuum box 48 as a function of its electrical power consumption.

To set the operating point 77 of the drive unit 76, in some embodiments, the drive controller 78 may obtain information from one or more sensors 80. For example, the one or more sensors 80 may be positioned at various locations on/in the housing 50 (and/or other locations) and may be operably connected to the drive controller 78 (e.g., in communication with the drive controller 78). The one or more sensors 80 may be configured to generate signals indicative of one or more physical properties, communicating the signals to the drive controller 78, and/or displaying information relating to the physical properties (or quantities determined from the measured physical properties, such as, for example, the fill level 79 of the vacuum box 48). The drive controller 78 may include a data structure (e.g., a table, list, function, etc.) usable to estimate the fill level 79 of the vacuum box 48 based at least in part on the physical properties measured with the one or more sensors 80. The data structure may include a lookup table that provides the fill level 79 of the vacuum box 48 as a function of the measured physical properties. The measured physical properties may include, for example, temperatures, depths/heights of material in the interior chamber 52, opacities of the material, quantities of light reflected by or transmitted through the material, etc.

To measure temperatures, in some embodiments, the vacuum box 48 may include one or more sensors such as thermocouples or other devices for measuring temperature. The one or more sensors 80 may be positioned to measure the temperature of the housing 50, the interior chamber 52, or other components of the vacuum box 48. In some embodiments, the data structure may provide the fill level 79 of the vacuum box 48 as a function of, for example, the temperature of one or more portions of the vacuum box 48.

To measure depths or heights of the undesired material in the vacuum box 48, in some embodiments, the vacuum box 48 may include one or more sensors 80 including depth sensors, such as float sensors, interferometers, etc. The depth sensors may be positioned in the interior chamber 52, on the housing 50, and/or in other locations to measure the height of the undesired material 16 in the vacuum box 48. In some embodiments, the data structure may provide the fill level 79 of the vacuum box 48 as a function of, for example, the heights of the undesired material 16 in the vacuum box 48.

To measure available light, in some embodiments, the vacuum box 48 may include one or more sensors 80 that include photo-sensors (e.g., charge-coupled devices, etc.). The photo-sensors may be positioned to measure the intensity of light reflected by or transmitted by the undesired material 16 in the interior chamber 52 (or other visual indicators), so as to determine the fill level 79 of the vacuum box 48. In some embodiments, the data structure may provide the fill level 79 of the vacuum box 48 as a function of, for example, the measured light intensity of the undesired material 16 in vacuum box 48.

To determine the fill level 79 of the vacuum box 48, in some embodiments, the drive controller 78 receives sensor signals from the one or more sensors 80 using one or more wireless or wired connections. The drive controller 78 may provide the measurements and/or the load on the drive unit 76 to system level controllers (e.g., supervisory controller(s)) using the one or more wireless or wired connections. The drive controller 78 may use the measurements to determine the fill level 79 of the vacuum box 48 using the data structures. Based on the determined fill level 79 and/or a state of the system (e.g., provided by system supervisory controller(s) 81), the drive controller 78 may determine an operating point 77 for the drive unit 76. The drive unit 76 may consume electric power based on the operating point 77, thereby enabling the drive controller 78 to control the rate at which undesired material 16 is moved within the vacuum box 48.

FIG. 7A is a schematic side view and FIG. 7B is a schematic end view of an example material collector 36 and an example carrier 84 for transportation and/or orientation of the material collector 36, according to embodiments of the disclosure. When in an industrial environment, for example, the vacuum box 48 may be subject to forces applied to it by the environment. To manage these forces, in some embodiments, the vacuum box 48 may include structural housing support members 82 positioned on/in the housing 50. The structural housing support members 82 may be positioned along the length of housing 50 and may at least partially encircle multiple walls of the housing 50. In some embodiments, the structural housing support members 82 may at least partially encircle three or more walls of the housing 48 (e.g., a top wall and two side walls). The structural housing support members 82 may have a thickness that extends away from the housing 50 so as to reduce the likelihood of force being directly transmitted to the housing 50. The structural housing support members 82 may enable the housing 50 to be efficiently repositioned by distributing load for moving the vacuum box 48 across the housing 50. The structural housing support members 82 may also increase the rigidity of the housing 50 (e.g., by enhancing the cross section of the housing 50, where the structural housing support members 82 are connected to the housing 50), thereby allowing the vacuum box 48 to be moved with reduced risk of damage (e.g., due to forces applied to the vacuum box 48 to move it).

In some embodiments, the vacuum box 48 may include a floor 68 having a V-shaped cross-section or other features. Such a floor 68 or other features may tend to make the housing 50 tip to one side or the other side if the housing 50 is placed directly onto a planar surface. To orient the vacuum box 48, in some embodiments, the vacuum box 48 may be provided with a carrier 84, for example, as shown in FIGS. 7A and 7B. The housing 50 and/or the structural housing support members 82 may be positioned on the carrier 84. The carrier 84 may be a structure configured to substantially maintain an upright orientation of the vacuum box 48. The carrier 84 may include a base plate 86 configured to apply force to the vacuum box 48 to move the vacuum box 48 in a manner that is unlikely to damage the vacuum box 48. In some embodiments, lifting member receivers 88 may be positioned on the base plate 86 and may extend into the base plate 86 to allow forks or other structures of heavy equipment to efficiently lift or otherwise apply force to the base plate 86. Forklifts or other types of machinery (e.g., cranes) may be capable of lifting the carrier 84 and the vacuum box 48 using the lifting member receivers 88 (or other features of the vacuum box 48). The support members 82 may be positioned between base plate 86 and the vacuum box 48 to distribute force from the base plate 86 to the vacuum box 48. The vacuum box 48 may have a floor 68 having a V-shaped cross-section, which may tend to cause the vacuum box 48 to list to one side or the other if positioned on a planar surface. The support members 82 may attach the base plate 86 to the vacuum box 48, so that when the carrier 84 is positioned on a flat surface, the vacuum box 48 is maintained in a predetermined orientation, such as an upright orientation. The base plate 86 may be provided with wheels 90 (and/or tracks and/or skids) to facilitate movement of the vacuum box 48. The wheels 90 may be positioned relative to the base plate 86 to allow the carrier 84 with the vacuum box 48 to roll while being loaded, unloaded, and moved around an environment to which the vacuum box 48 is deployed.

Once the vacuum box 48 is filled with material, it may need to be unloaded before it may continue to be used. To facilitate rapid unloading of the vacuum box 48, in some embodiments, the vacuum box 48 may include a door 92 (FIG. 4). The door 92 may substantially extend across one end of the housing 50. The door 92 may enable the interior chamber 52 of the housing 50 to be physically accessed. The door 92 may include a handle 94, which facilitates opening and closing of the door 92. When opened, the end of the housing 50 may be unsealed, thereby allowing for large scale access to the undesired material 16 in the housing 52. When the door 92 is closed, the interior chamber 52 may generally be sealed. The door 92 may allow for efficient removal of undesired material 16 from the interior chamber 52, thereby allowing for a full vacuum box 48 to be quickly emptied and returned to use for undesired material 16 extraction purposes. For example, to efficiently remove undesired material 16 from the interior chamber 52, the door 92 may be opened, and the vacuum box 48 may be oriented, so that gravity force tends to cause material in the interior chamber 52 to exit the housing 50 through the door 92.

FIG. 8A is schematic side view and FIG. 8B is a schematic top view of an example vacuum generation and sound attenuation assembly 12, according to embodiments of the disclosure. To transfer the material 16 from the retention collection 14 over an extended distance and from a lower elevation to the material collector 36, located at a higher, elevated position as shown in FIG. 1, a high-pressure vacuum flow 26 may be applied to the material collector 36.

In some embodiments, the vacuum generation and sound attenuation assembly 12 may include a vacuum source 38, which may be pneumatically connected to the material collector 36 by a conduit 96 (e.g., a hose). The pneumatic connection may allow the vacuum source 38 to apply a high-pressure vacuum flow 26 to the material collector 36. For example, the vacuum flow 26 may be applied to the interior chamber 52 of the material collector 36 via one or more conduits 96 (or through other types of pneumatic connections between the components). The applied vacuum flow 26 may generate the vacuum induced fluid flow 26 along the flow path, thereby conveying the undesired material 16 from the retention collection 14 to material collector 36.

In some embodiments, the vacuum generation and sound attenuation assembly 12 may include a vacuum source 38, which may be pneumatically connected to the material collector 36 by a conduit 96 (e.g., a hose). The pneumatic connection may allow the vacuum source 38 to apply a high-pressure vacuum flow 26 to the material collector 36. For example, the vacuum flow 26 may be applied to the material collector 36 and transmitted through the collection conduit 46 to draw material from the retention collection 14, by generating a suction or vacuum induced fluid flow 26 of a sufficient high vacuum pressure for extraction and convey the undesired material 16 in liquid, semi-solid and/or substantially solid forms, between the retention collection and the material collector.

As shown in FIGS. 8A and 8B, in some embodiments, the vacuum generation and sound attenuation assembly 12 may include a sound attenuation chamber 40 connected to the vacuum source 38. In some embodiments, the sound attenuation chamber 40 may include an attenuation housing 98 at least partially defining an interior chamber of interior volume being positioned to receive at least a portion of the vacuum flow 26 from the vacuum source 38 and attenuate sound generated by the vacuum source 38 during operation. In some embodiments of the vacuum generation and sound attenuation assembly 12, the vacuum source 38 and the sound attenuation chamber 40 may be connected to one another to form a unified vacuum and attenuation module 100, for example, as shown in FIGS. 1, 2, 8A, and 8B. In some embodiments, the vacuum source 38 may be directly connected to the sound attenuation chamber 40.

In the example embodiment shown, the unified vacuum and attenuation module 100 includes a chassis 102 supporting the vacuum source 38 and the sound attenuation chamber 40, and the chassis 102 may be configured to be transported between geographical locations. In some embodiments, wheels 104 may be connected to the chassis 102 to facilitate transportation, although tracks, skids, etc., may be connected to the chassis 102 instead of, or in addition to, wheels 104, depending, for example, on the type of terrain over which the vacuum and attenuation module 100 may be expected to traverse. In some embodiments, the chassis 102 may be self-propelled, for example, including a powertrain having an engine, hydraulic motor, and/or electric motor. Mounting the vacuum and attenuation module 100 on a mobile chassis 102 may facilitate rapid set-up, removal, and/or reconfiguration of the material extraction assembly 10 in accordance with embodiments of the disclosure.

In some embodiments, the vacuum source 38 may be implemented using a variety of configurations, depending, for example, on the environment to which the material collector 36 is deployed for operation. For example, in some embodiments, as shown in FIGS. 8A and 8B, the vacuum source 38 may generate a vacuum, which may be applied to the material collector 36. For example, the vacuum source 38 may include one or more vacuum generators 106 configured to generate the vacuum flow 26, and the vacuum generators 106 may be pneumatically connected to one or more material collectors 36, for example, via a conduit 96. In some examples, the one or more vacuum generators 106 may receive at least some electrical power via renewable means, such as batteries, solar panels, wind turbines, and/or other similar sources. In other embodiments, for example, the vacuum source 38 as shown in FIGS. 8A and 8B may generate a vacuum, which may be applied to the suction manifold 44.

The one or more vacuum generators 106 may be configured to generate the vacuum flow 26 in different ways, depending at least in part on, for example, the environment to which the vacuum and attenuation module 100 is deployed. For example, in some embodiments, the vacuum generators 106 may be configured to generate the vacuum flow 26 using the flow of another fluid. For example, the vacuum generators 106 may be connected to a fluid source 42 (see FIGS. 1A-2 FIG. 2) via a fluid supply conduit 46. In some such embodiments, the vacuum generators 106 may be configured to receive a pressurized supply of the fluid through the fluid supply conduit 46. The flow of the pressurized fluid may cause the vacuum generators 106 to generate a high-pressure vacuum flow 26, thereby applying a high-pressure vacuum flow 26 to one or more material collectors 36, which may, in turn, transfer the vacuum flow 26 from the one or more material collectors 36 to the vacuum source 38. The flow of the pressurized fluid will cause the vacuum generators 106 to apply an increased, high vacuum pressure for collection and conveyance of extracted retention collection material from the retention collection to the material collector 36 located at an elevated position relative to the retention collection. The returned vacuum-induced fluid flow 26 received from the one or more material collectors 36 also may include a minor portion of the undesired material 16 from the one or more material collectors 36, for example, as described herein.

Figure 9:
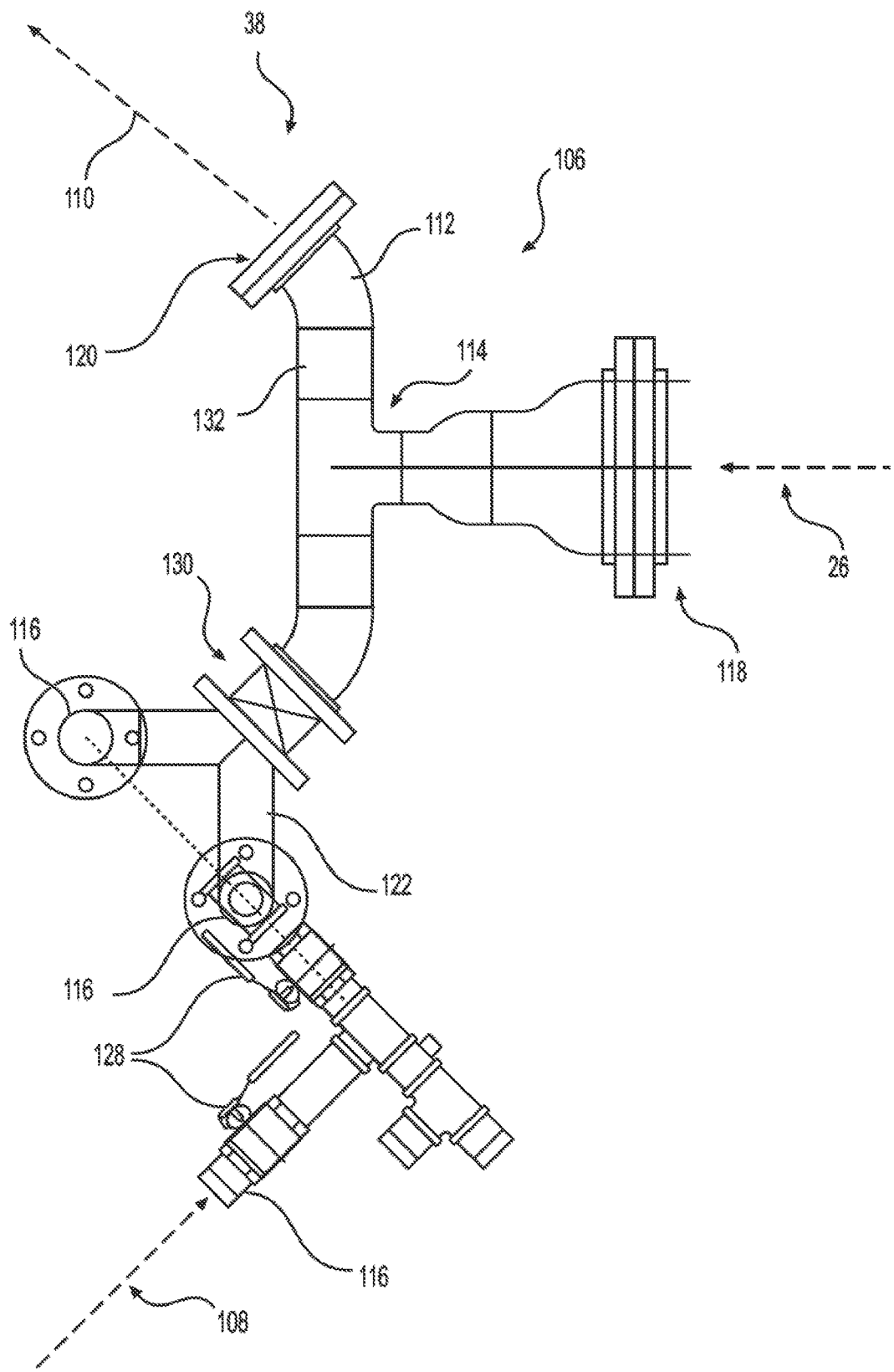
FIG. 9 is a schematic view of an example vacuum generator, according to embodiments of the disclosure.

When the one or more vacuum generators 106 generate the vacuum flow 26, in some embodiments, the vacuum generators 106 may combine vacuum-induced flow 26 and a fluid supply flow 108, and exhaust the combined flows as a vacuum exhaust fluid flow 110, which may include the minor portion of the undesired material 16, for example, as schematically shown in FIG. 9. To limit or prevent contamination of the ambient environment with the minor portion of the undesired material 16, the vacuum generators 106 may be pneumatically connected to the sound attenuation chamber 40 via a vacuum conduit 112 (e.g., a hose). The vacuum exhaust fluid flow 110 may flow from the vacuum source 38 into the sound attenuation chamber 40 via the conduit 112. Accordingly, the vacuum source 38 may be in the fluid flow path from the material collector 14 to sound attenuation chamber 40.

In some embodiments, in order to generate a more powerful high-pressure vacuum flow 26, multiple vacuum sources 38 and/or one or more sound attenuation chambers 40 may be positioned on a common chassis 102 to form a more powerful vacuum generation and sound attenuation assembly 12 (e.g., a more powerful unified vacuum and attenuation module 100). For example, multiple vacuum sources 38 may each be pneumatically connected to the (one or more) sound attenuation chambers 40, which may cause two (or more) separate flow paths (e.g., for each of the vacuum sources 38) and which may be combined at the one or more sound attenuation chambers 40. In some embodiments, the vacuum sources 38 may be pneumatically connected to a common material collector 36 (e.g., to increase the strength of the high-pressure vacuum flow 26 through the common material collector 36) or different material collectors 36 (e.g., to enable the undesired material 16 to be transferred to multiple material collectors 36 in parallel). In some embodiments, the vacuum sources 38 may be pneumatically connected to a suction manifold (e.g., to increase the strength of the high-pressure vacuum flow 26) or to multiple inlets in parallel.

In some embodiments, the vacuum source 38 may be implemented using a variety of different structures, depending at least in part on, for example, the environment to which vacuum source 38 is deployed. For example, in some embodiments, the vacuum source 38 may include one or more vacuum generators 106, each having a venturi mechanism 114 configured to receive pressurized fluid from the fluid source 42 (see FIG. 1 and FIG. 2) and use a venturi effect to generate the vacuum flow 26 between the source of the material and the vacuum generation and sound attenuation assembly 12. For example, each venturi mechanism 114 may be a vacuum generation mechanism that generates a vacuum using another fluid flow.

As schematically depicted in FIG. 9, which shows an example vacuum generator 38 according to embodiments of the disclosure, the venturi mechanism 114 may include fluid supply ports 116 through which the supply of pressurized fluid from the fluid source 42 used to generate the vacuum is received. The venturi mechanism 114 also may include a vacuum port 118 through which the generated vacuum flow may be applied, and an exhaust port 120 through which the fluid flow used to generate the vacuum flow and any material drawn into the vacuum port 118 with the generated vacuum flow may be exhausted from the venturi mechanism 114.

In some embodiments, to generate the vacuum flow 26, the fluid supply ports 116 are pneumatically connected to the fluid source 42, which may be a mobile fluid supply. For example, the fluid supply ports 116 may be pneumatically connected to a compressed fluid stored at or in the fluid source 42. The compressed fluid may be used to generate the fluid supply flow 108 from the fluid source 42. The fluid supply flow 108 may be received through the pneumatic connection and into the fluid supply ports 116. The fluid supply flow 108 may be configured to drive the one or more venturi mechanism(s) 114, thereby generating the vacuum flow 26 produced by the vacuum source 38, which may be applied to other devices via the vacuum port 118.

The strength of the vacuum flow 26 generated by the one or more venturi mechanisms 114 of the vacuum source may depend at least in part on, for example, the rate of the fluid supply flow 108 used to drive the venturi mechanism 114. In order to achieve and maintain higher vacuum pressure generation, in some embodiments, the vacuum source 38 may include a combiner 122. The combiner 122 may include a manifold for combining multiple fluid supply flows 108 received by the fluid supply ports 116 into a single fluid flow and directing a single fluid flow into one or more venturi mechanisms 114 for generating the vacuum flow 26.

In some embodiments, to manage or control the flow rate, pressure, and/or volume of the fluid supply flow 108 into the venturi mechanism 114, which may be used to control or regulate the strength of the vacuum flow 26, fluid flow control valves 124 may be positioned between the fluid supply ports 116 and the fluid source 42. In some embodiments, the strength of the vacuum flow 26 generated by the venturi mechanism 114 may be substantially proportional to the flow rate, pressure, and/or volume of fluid flow into the fluid supply ports 116. The fluid flow control valves 124 may be used to limit (e.g., reduce, stop, etc.) the rate of fluid flow into the venturi mechanism 114 from the fluid supply ports 116.

In some embodiments, the vacuum port 118 may be pneumatically connected to the one or more material collectors 36 and/or the suction manifold 44 to apply a vacuum to the one or more material collectors 36 and/or suction manifold 44. Applying the vacuum may generate the vacuum-induced fluid flow 26 into the vacuum port 118. When connected to one or more material collectors 36, the vacuum-induced fluid flow 26 may draw material 16 into the one or more material collectors 36 from the source of the material (e.g., the retention collection 14). A major portion of the material 16 may be trapped by and within the material collector 36, and a minor portion of the material 16 may flow into the vacuum source 38 in vacuum-induced fluid flow 26.

To prevent or limit contamination of the ambient environment by a portion of any undesired material 16, in some embodiments, the exhaust port 120 may be pneumatically connected to the sound attenuation chamber 40. For example, the exhaust port 120 may be pneumatically connected to the sound attenuation chamber 40, which may exhaust the vacuum-induced fluid flow 26, which may include the minor portion of the undesired material 16, and the fluid supply flow 108, for example, as a combined fluid flow into the sound attenuation chamber 40.

In some embodiments, the pneumatic connections between the ports 116, 118, and/or 120 of the vacuum source 38 may be made using conduits, such as hoses or other flexible tubular structures. The conduits may enable the pneumatic connections to be efficiently made, thereby reducing the setup time for assembling the material extraction assembly 10, for example, shown in FIG. 1. In some embodiments, the conduits may include relatively rigid piping (e.g., poly pipe or polyethylene pipe). The piping may render the conduits at least partially self-supporting, for example, when conveying high pressure or high vacuum pressure.

In addition, it has been recognized that the use of conduits, such as hoses or other flexible tubular structures may flex or move due to the forces applied to them by the fluid flows. A person may be impacted by the conduits if the flexing or movement of the conduits is significant and/or unexpected. In some embodiments, the material extraction assembly 10 may reduce or eliminate one of more of the conduits, for example, by pneumatically connecting one or more of the components of the material extraction assembly 10 to one another in a manner that eliminates a need for at least some of the conduits (e.g., connecting components directly to one another). For example, the material extraction assembly 10, in some embodiments, may include direct attachment of the vacuum source 38 to one or more material collectors 36, the suction manifold 44, and/or to the sound attenuation chamber 40. By directly attaching the vacuum source 38 to the one or more material collectors 36, a suction manifold, conduits, additional hoses or other flexible structures may not be necessary As shown in FIG. 10A, FIG. 10B, FIG. 10C, FIG. 10D, FIG. 10E, FIG. 10F, FIG. 10G, FIG. 10H, FIG. 10I, FIG. 10J and FIG. 11 (also FIGS. 8A and 8B), in some embodiments, the vacuum source 38 may be directly connected to the sound attenuation chamber 40 forming a unified vacuum and attenuation module 100. Directly connecting the vacuum source 38 to the sound attenuation chamber 40 may result in the vacuum-induced fluid flow to flow from the vacuum source 38 (e.g., as part of the vacuum exhaust fluid flow 110) directly into the sound attenuation chamber 40. In some such embodiments, both the vacuum source 38 and the sound attenuation chamber 40 may be rigid structures able to absorb forces applied to them by the vacuum flow 26 without significantly deforming or moving. The unified module 100 may be fitted with lifting receiver members 99 so the vacuum source 38 and sound attenuation chamber 40 may be easily transported to and deployed by operators of the site using a forklift, crane, or other appropriate equipment and/or methods.

Applicant has recognized that the undesired material 16 extracted from the retention collection 14 may, in some instances, be challenging to move via fluid flow by virtue of, for example, the semi-solid and/or substantially state of matter of the material 16, the weight of the undesired material 16, the viscosity and/or surface tension of the undesired material 16, and/or other physical properties of the undesired material 16. Such characteristics of the material 16 may limit the rate at which the material 16 may flow through the fluid flow path if only a limited level of the vacuum flow 26 is generated by the vacuum generators 106.

In some embodiments, the material extraction assembly 10 may be configured to provide a high-pressure vacuum flow 26, which may be suitable to expedite flow of the material 16 through the collection conduit and along an extended length fluid flow path. To expedite the flow of the undesired material 16, the vacuum source 38, in some embodiments, may include two or more vacuum generators 106, and in some embodiments, four or more venturi mechanisms such as two or more venturi mechanisms 114, which may be operated in parallel with each other in order to enhance the pressure of the vacuum flow 26 generated by the vacuum source 38. Each of the vacuum generators 106 may be driven using the pressurized fluid from the fluid source 42 (and/or other sources of pressurized fluid, such as other fluid sources (e.g., mobile fluid supplies)).

FIGS. 10A, 10B, 10C, 10D, and 10E are schematic views of an example vacuum generation and sound attenuation assembly 12 showing an example vacuum source end, according to embodiments of the disclosure. The example vacuum generation and sound attenuation assembly 12 shown in FIGS. 10A through 10E includes an embodiment of vacuum source 38 having multiple venturi mechanisms 114. For example, as illustrated, the vacuum source 38 includes four venturi mechanisms 114. The four venturi mechanisms 114 may be operated simultaneously in parallel to provide a high-pressure vacuum flow 26 and different levels of vacuum pressure.

In some embodiments, to manage the pressure generated by vacuum source 38, the venturi mechanisms 114 maybe divided into two dual vacuum sources 126. Each of the venturi mechanisms 114 of the dual vacuum sources 126 may be fluidly connected in parallel to each other, for example, so that they each may be driven using a common fluid supply port 116, may commonly exhaust out of a common exhaust port 120, and/or may apply vacuum using a common vacuum port 118. In this example manner, each dual vacuum source 126 may provide a higher pressure vacuum flow 26 than may be provided using a single venturi mechanism 114 driven by a similar rate of fluid flow received from the fluid source 42.

A plurality of vacuum conduits 121 may be provided with the vacuum source 38 to provide an exhaust air flow path between one or more of the vacuum sources 126 and the filter and sound attenuation chamber 40. The vacuum conduits 121 may be, for example, ducts of flexible steel conduits, such as flexible corrugated steel conduits.

In some embodiments, the vacuum conduits can comprise flexible piping or hoses configured to withstand elevated temperatures of vacuum exhaust fluid/air flows exhausted to the filter and sound attenuation chamber 40. For example, in embodiments, additional venturi mechanisms (e.g. 2-4 or more single or double venturi's) may be used to provide higher power levels for generating a high pressure vacuum flow to create and maintain a sufficient suction for extracting and conveying the undesired material over extended distances and along a slope to an elevated position. For example, multiple venturi mechanisms may be used to generate a vacuum flow with a vacuum pressure of about 27 in-Hg to about 29 in.-Hg in order to extract and convey liquid, semi-solid, and solid materials from the retention collection over extended distances (e.g. at least about 200 ft. to about 900 ft.) and along a slope or rise in elevation of approximately 0° to approximately 90°.

The generation of such higher pressure vacuum flows can, however create higher temperatures exhaust air flows of about 125° F. to about 180° F. The vacuum conduits 121 will be selected/configured to withstand such elevated temperatures, and in some embodiment can include flexible 4" braided steel conduits or flex hoses adapted to withstand such elevated temperatures of 125° F. to 180° F. or greater. By way of example, and not limitation, in embodiments, the vacuum conduits may include 4" T316L stainless steel flexible hoses with a 304 stainless steel single braid wrapping, such as Annuflex™ 4" 316ss/304ss hoses from Hose Master of Cleveland, Ohio. Other types of conduits and/or flexible hoses, including different diameter (e.g. about 2" to about 10" steel flexible hoses/conduits also can be used, which can enable larger volume vacuum flows to be generated/used.

The vacuum conduits 121 also may be capable of absorbing reaction loads at the joints with the vacuum sources 126 and/or the sound attenuation chamber 40, for example, while resisting collapse under the negative pressures of the vacuum flows 26 from the venturi mechanisms 114 of the vacuum sources 126.

To control the generation of the vacuum flow 26 by the one or more vacuum sources 38, in some embodiments, the ports 116, 118, and/or 120 of each dual vacuum source 126 may be controlled by corresponding respective control valves 128, 130. The control valves 128, 130, may be usable to control the rate of fluid flow through each of the respective ports.

In some embodiments, to manage the process of generating the high-pressure vacuum flow 26, the vacuum source 38 may include a vacuum source controller 136. The vacuum source controller 136 may be in communication with one or more of the control valves 128, 130. The vacuum source controller 136 may be configured to control operation of one or more of the control valves 128, 130 to provide vacuum flows having desired pressures. For example, the vacuum source controller 136 may be operably coupled to an adjustor, such as a switch, dial, or other mechanism that a person may operate to achieve a desired level of vacuum pressure to be generated by the vacuum source 38. The vacuum source controller 136 may use one or more signals from the adjustor to set the operation points for the one or more control valves 128, 130 to generate the desired vacuum pressure with, for example, the venturi mechanisms 114.

The vacuum source controller 136 may include computing hardware (e.g., processors, memory, storage devices, communication devices, other types of hardware devices including circuitry, etc.), and/or computing instructions (e.g., computer code) that when executed by the computing hardware cause the vacuum source controller 136 to provide its functionality. The vacuum source controller 136 may include a lookup table or other data structure usable to determine the operating points for the one or more control valves 128, 130 based on a desired vacuum flow level. Once operating points are determined, the vacuum source controller 136 may modify operation of one or more of the control valves 128, 130 based on the operating points. For example, vacuum source controller 136 may modify the quantities of power used to drive control valves 128, 130 to set the quantity of fluid flow through each of the ports 116, 118, and/or 120.

Figure 10A:
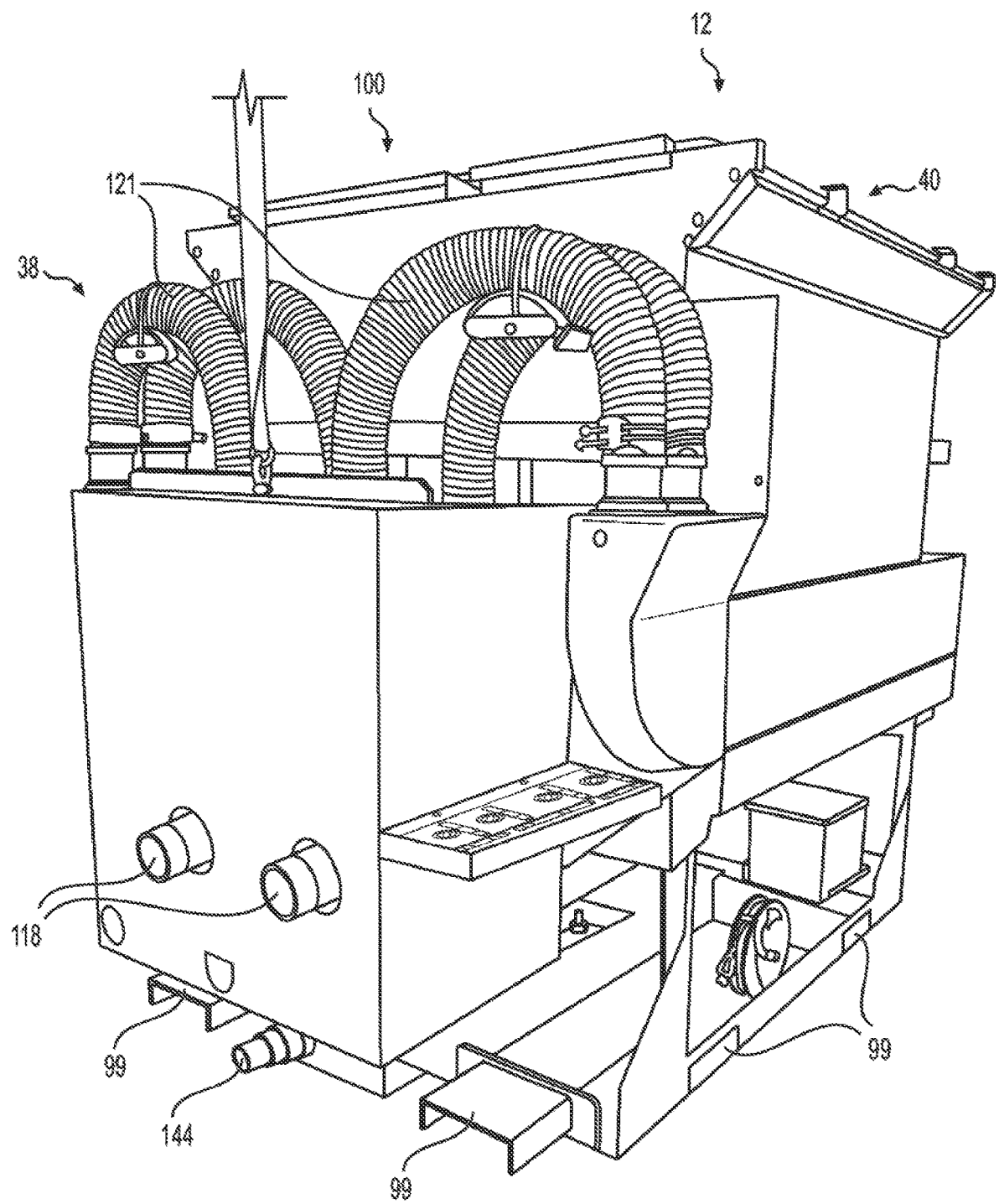
FIG. 10A is a schematic perspective view of an example vacuum generation assembly with emergency shut-down system and a sound attenuation assembly, according to embodiments of the disclosure.
Figure 10B:
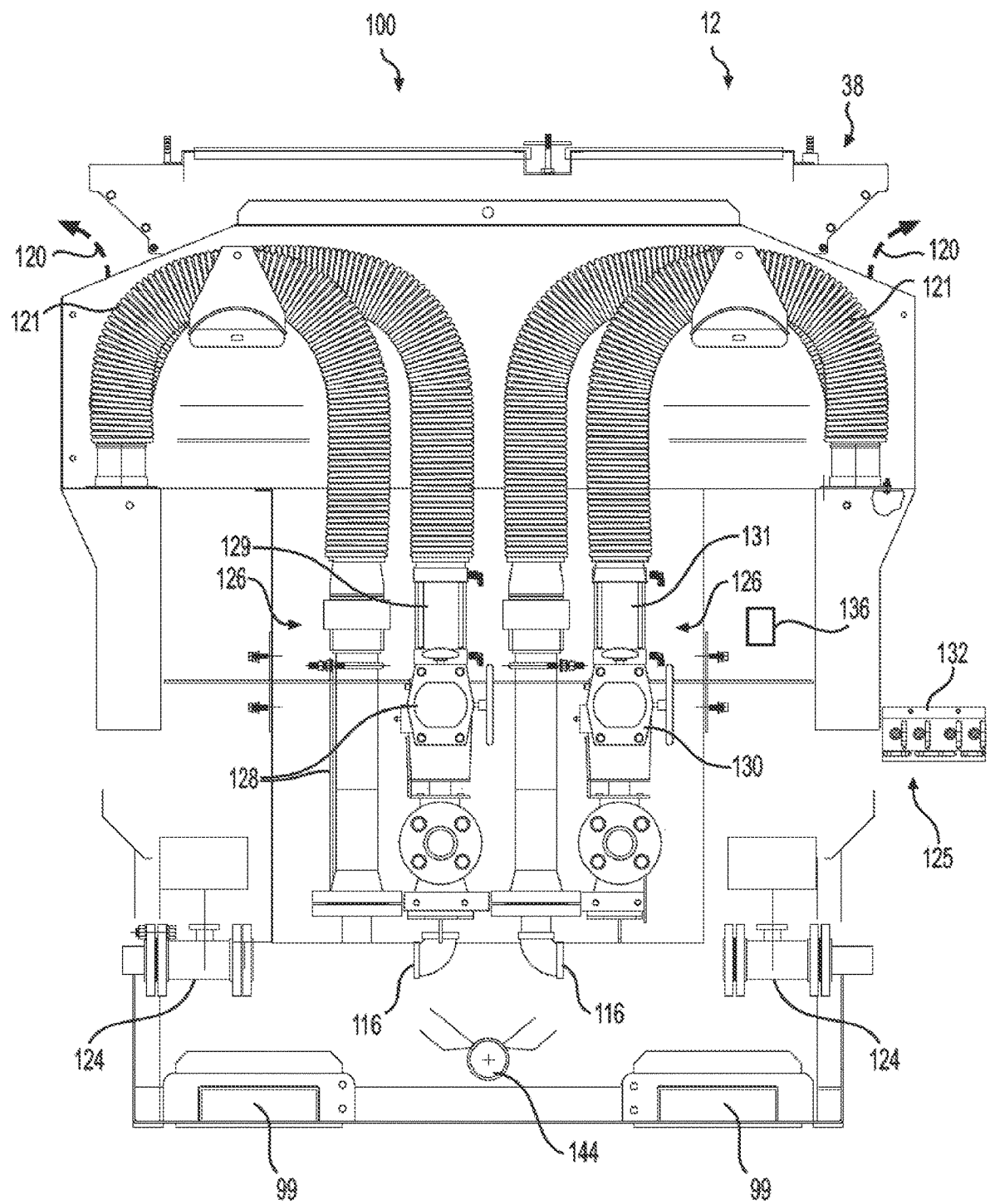
FIG. 10B is a schematic end view of the example vacuum generation and sound attenuation assembly of FIG. 10A, according to embodiments of the disclosure.
Figure 10C:
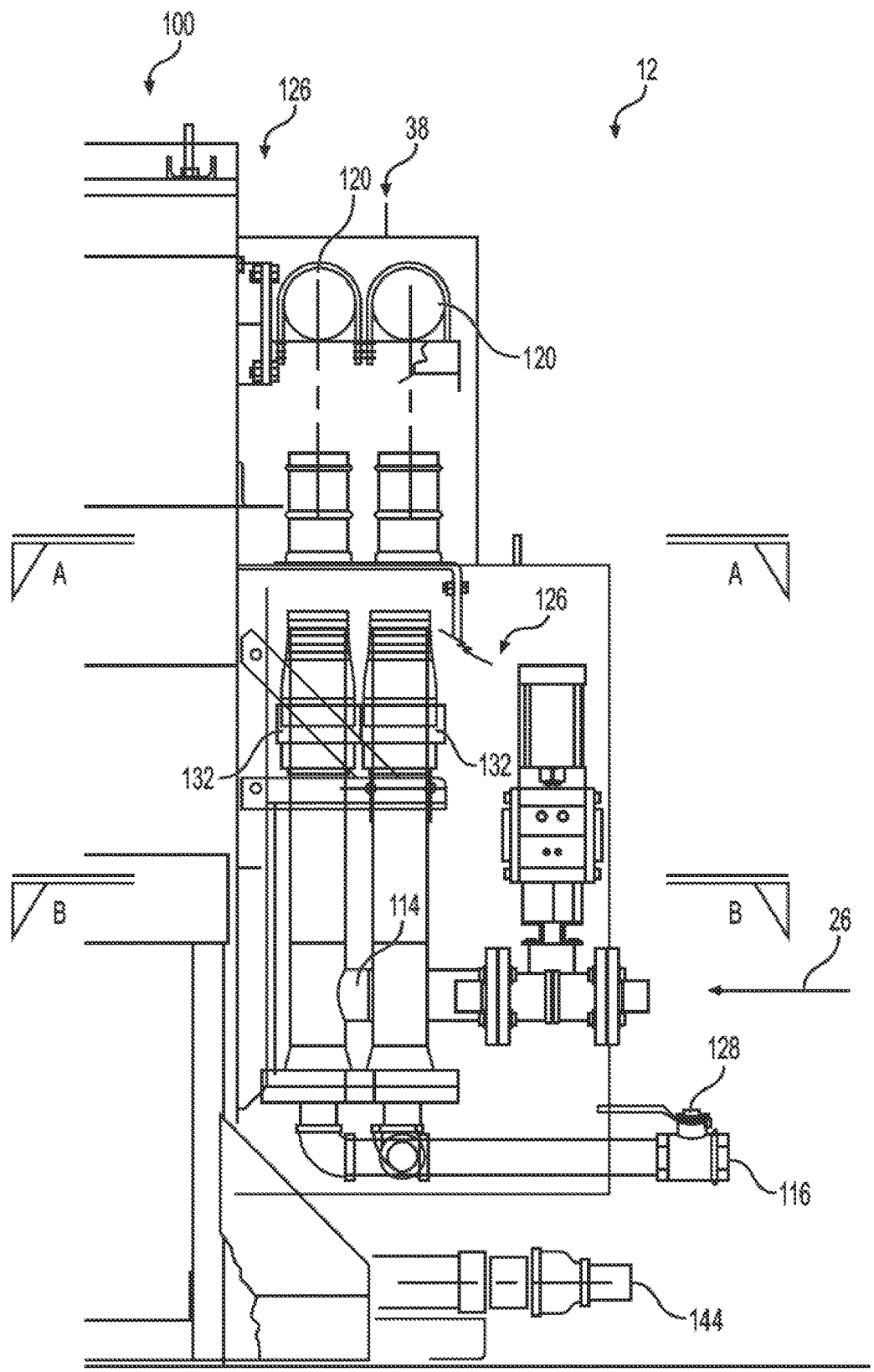
FIG. 10C is a schematic partial side view of the example vacuum generation assembly shown in FIG. 10A, showing a side view of the example vacuum source end, according to embodiments of the disclosure.
Figure 10D:
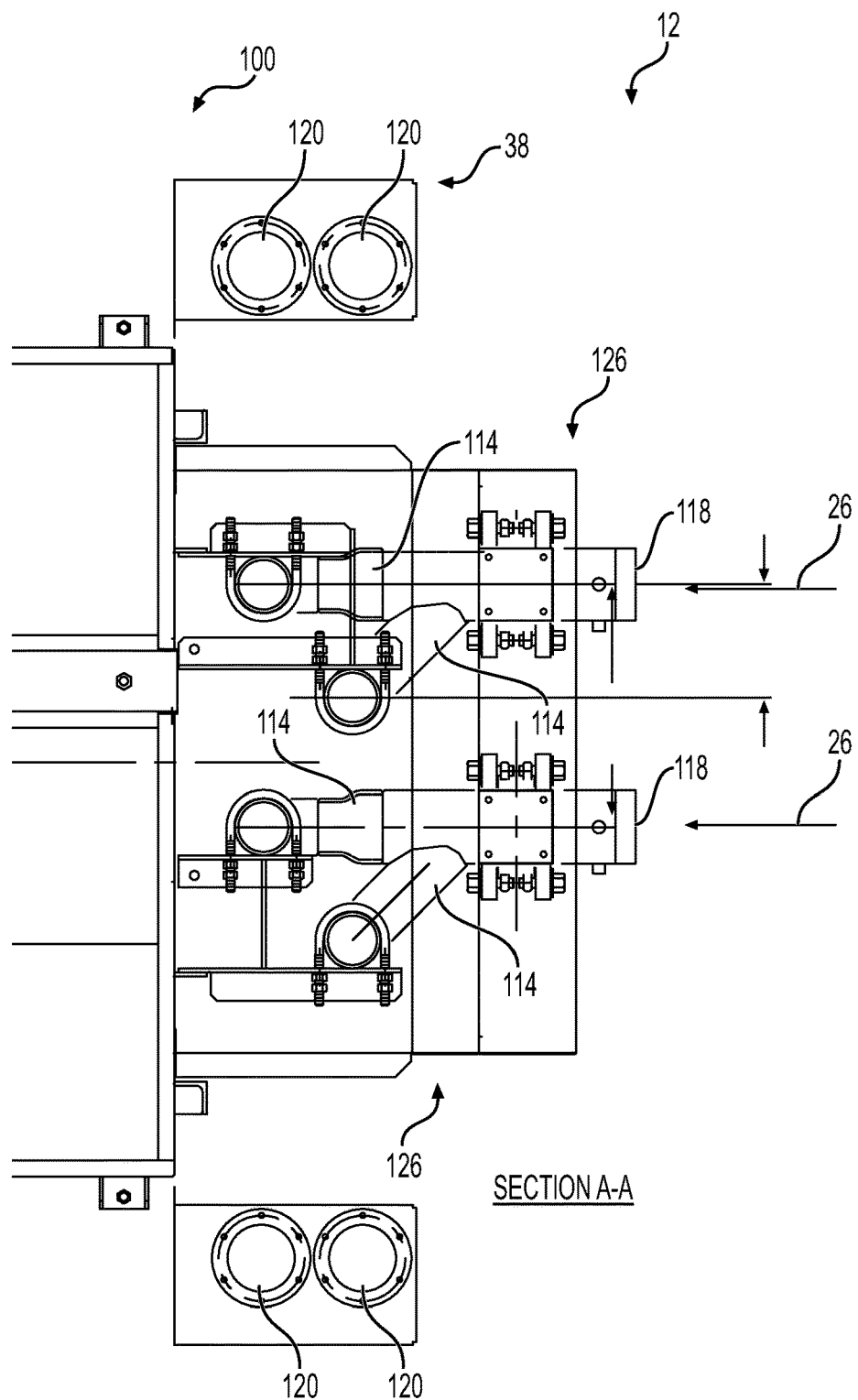
FIG. 10D is a schematic partial section view of the example vacuum generation assembly shown in FIG. 10A taken along section A-A of FIG. 10C, showing a top view of the example vacuum source end, according to embodiments of the disclosure.
Figure 10E:
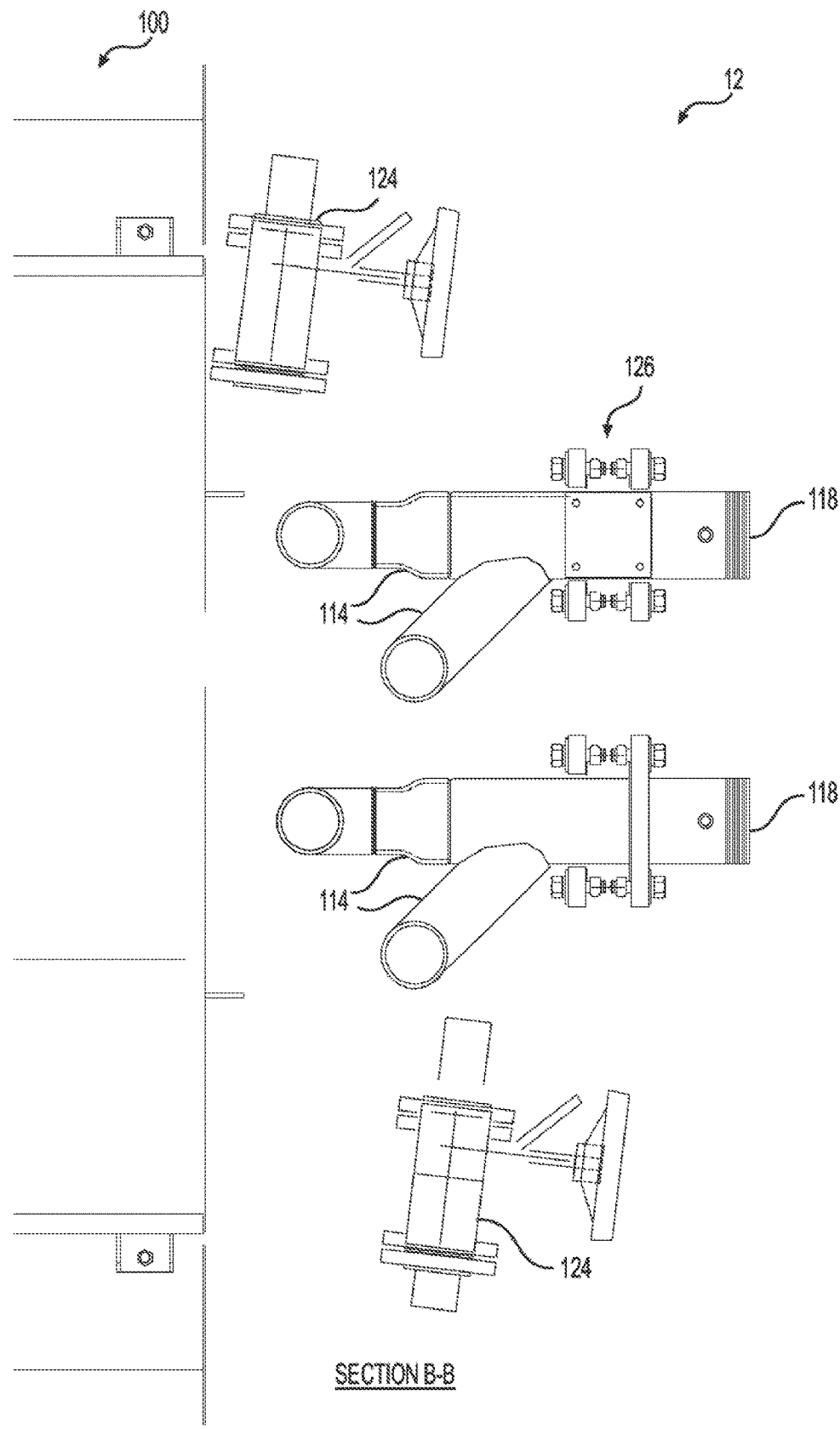
FIG. 10E is a schematic partial section view of the example vacuum generation assembly shown in FIG. 10A taken along section B-B of FIG. 10C, showing a top view of the example vacuum source end, according to embodiments of the disclosure.
Figure 10F:
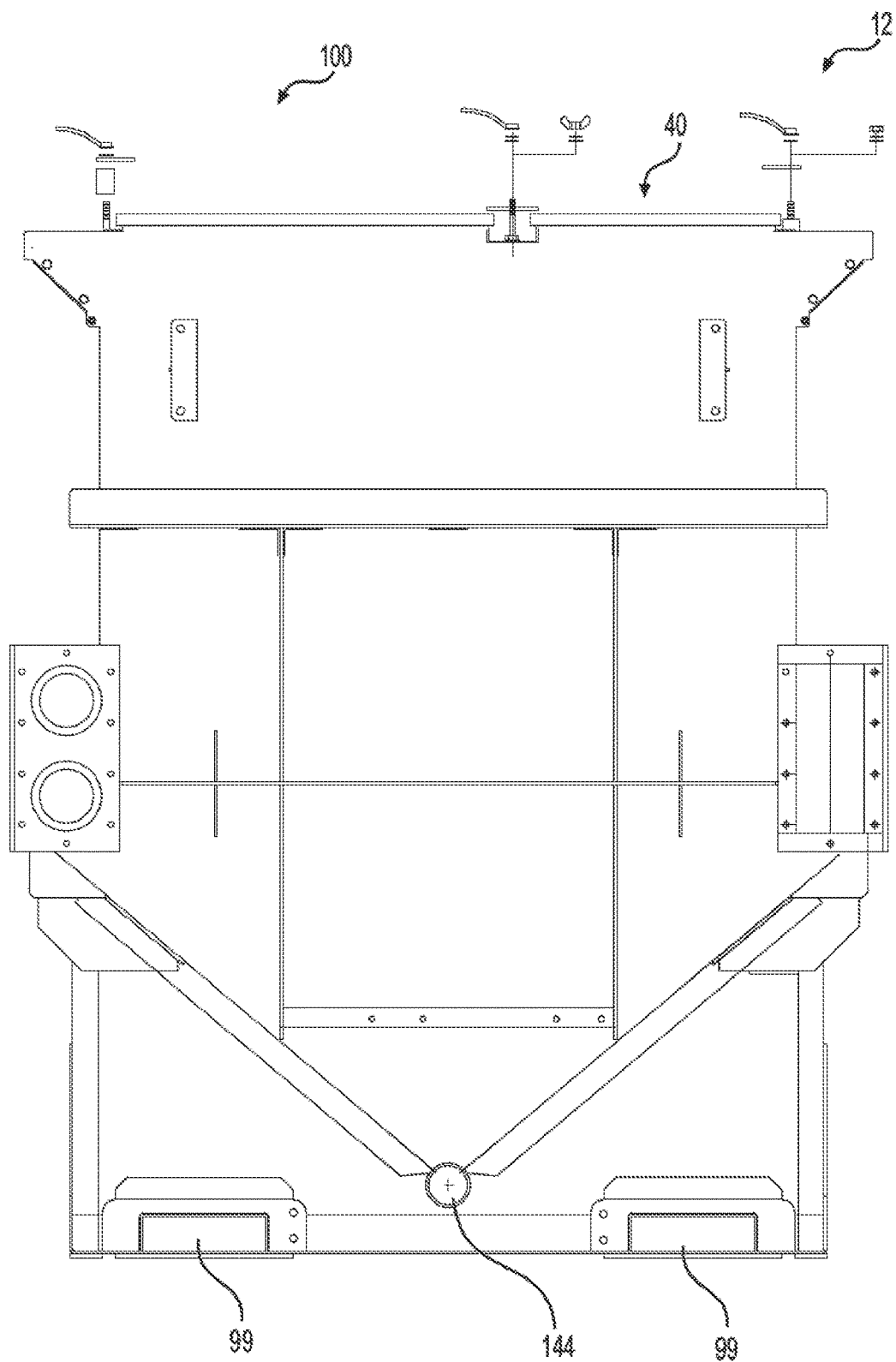
FIG. 10F is a schematic end view of the example vacuum generation assembly shown in FIG. 10A, showing the example vacuum source end, according to embodiments of the disclosure.
Figure 10G:
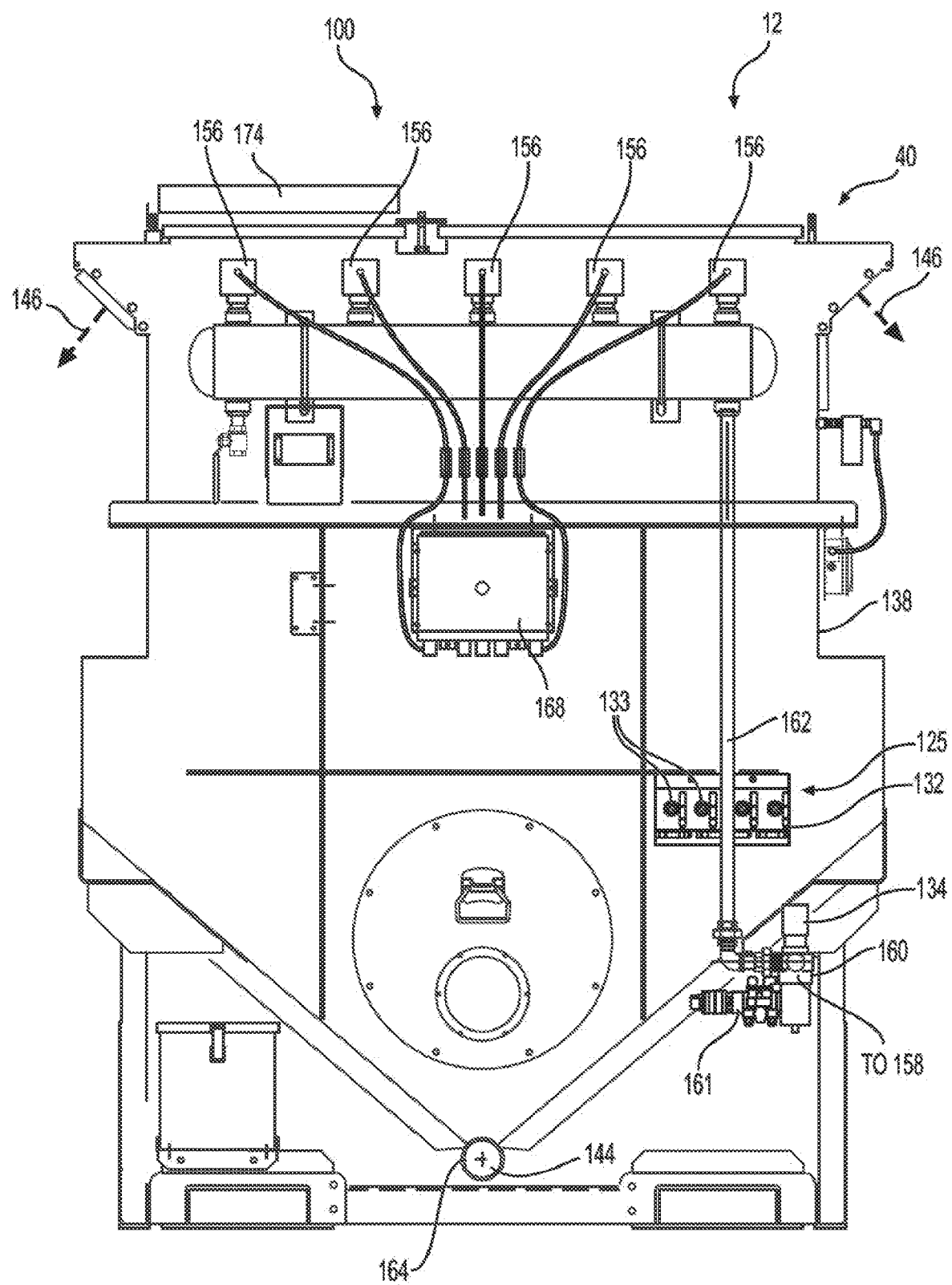
FIG. 10G is a schematic end view of the example vacuum generation assembly shown in FIG. 10A, showing an example sound attenuation chamber end, according to embodiments of the disclosure.

As generally illustrated in FIGS. 10B and 10C, the control valves 128 and 130 can comprise actuator controlled valves, each including an actuator 129, 131. Such actuators can include pneumatic or electric actuators, coupled to the control valves 128, 130. The control valves can include ball valves that include gates or closure members moveable between open and closed positions within a housing of each of the control valves. For example, in embodiments, each of the control valves 128, 130 can comprise pneumatic actuated ball valves having a high temperature pneumatic actuator coupled thereto, such as 2" pneumatic actuated ball valves with high temperature pneumatic actuators as provided by Bray controls. Other types of pneumatic or electrically actuated control valves, as well as additional size control valves also can be used.

The actuators 129, 131 of the control valves 128, 130 can be controlled by the vacuum source control 136 to move the gate or other closure member of each control valve between open and closed positions to regulate the fluid flow (e.g. compressed air or other motive force flow from the fluid source) into each single or double venturi mechanism for generation and control of the vacuum pressure of the vacuum flows from each of the venturi mechanisms.

In some embodiments, the vacuum controller can regulate the opening and closing of the control valves in response to signals or feedback from sensors range downstream, e.g. within the material collector along the collection conduit, or at other locations, which sensors can measure and provide information or data regarding the vacuum pressure or suction force of the vacuum flow being generated. In response, the vacuum source controller can operate the actuators to open or close the control valves 128, 130 to increase or regulate the incoming fluid flow from the fluid supply to thus increase the vacuum pressure of the vacuum flow generated by the venturi mechanisms as needed to substantially maintain a high vacuum pressure sufficient to extract and draw liquid, semi solid, and/or solid portions of the extracted material from the retention collection at extended distances and to raised or elevated positions for depositing in the material collector.

In addition, in embodiments, the vacuum source 38 further can include a vacuum shutdown 125 system (FIGS. 2, 10A-10B and 10G) configured to initiate a shutdown of the generation of the vacuum flow by the vacuum source within approximately 10 seconds or less, and, in embodiments, within approximately 3-5 seconds. The vacuum shutdown system, generally can include control panels 132, which, in embodiments, can include a control panel located on opposite sides or ends of the vacuum source. The control panels typically will be arranged or located at positions along the housing of the vacuum source to enable easy access and operation thereof by operators or other workers. The control panels generally also can include a series of controls 133, which can include toggle switches, buttons or other controls.

In embodiments, each control panel 132 will be connected to the actuators 129, 131 of each of the control valves 128, 130 and further can be connected to one or more actuators 134, which can be coupled to one or more fluid control valves at to one or more fluid supply ports or release valves connected thereto (e.g. fluid supply port 160 and release valve 161 in FIG. 10G), and further can be coupled to series of release valves or gates located along the downstream end or portion of the vacuum source. For example, the controls can be linked to a pneumatic or electrically actuated control valve for controlling a flow of filtered and regulated compressed air from a supply or manifold to the vacuum source. In other embodiments, the controls 132 (FIG. 2) further can be linked to release valves coupled to return conduits along which the vacuum flow 26 is returned from the material collector back to the vacuum source.

To initiate shutdown of the vacuum flow through the material extractor assembly, either in an emergency or during normal operations, an operator can engage the controls so as to shut down each of the control valves 128, 130 through pressurized fluid or compressed air is supplied to the one or more single or double venturi mechanisms. Upon shutdown of the flow of pressurized fluid from the fluid supply to the venturi mechanisms, generation of the vacuum flow is halted. In addition, upon actuation of one or more of the additional controls, the air release valves or gates along the downstream side of the vacuum source also can be opened so as to vent any excess air, such as from the returned vacuum flow coming from the material collector, from the system. Thus, the vacuum generation by the vacuum source can be rapidly shut down/discontinued and excess pressurized air purged within about 10 seconds, and in embodiments, within about 3-5 seconds.

In some embodiments, to limit or prevent contamination of the ambient environment with any undesired material 16, the sound attenuation chamber 40 may be configured remove undesired material 16 from the vacuum-induced fluid flow 26 prior to exhaustion into the ambient environment. To do so, the sound attenuation chamber 40 may be pneumatically connected to the vacuum source 38. In some embodiments, the sound attenuation chamber 40 is pneumatically connected to the vacuum source 38 by a conduit (e.g., a hose). In some embodiments, for example, as shown in FIGS. 10A-10J, the sound attenuation chamber 40 is directly and pneumatically connected to the vacuum source 38, thereby reducing reliance on a conduit, which may provide a potential hazard during operation.

Figure 10H:
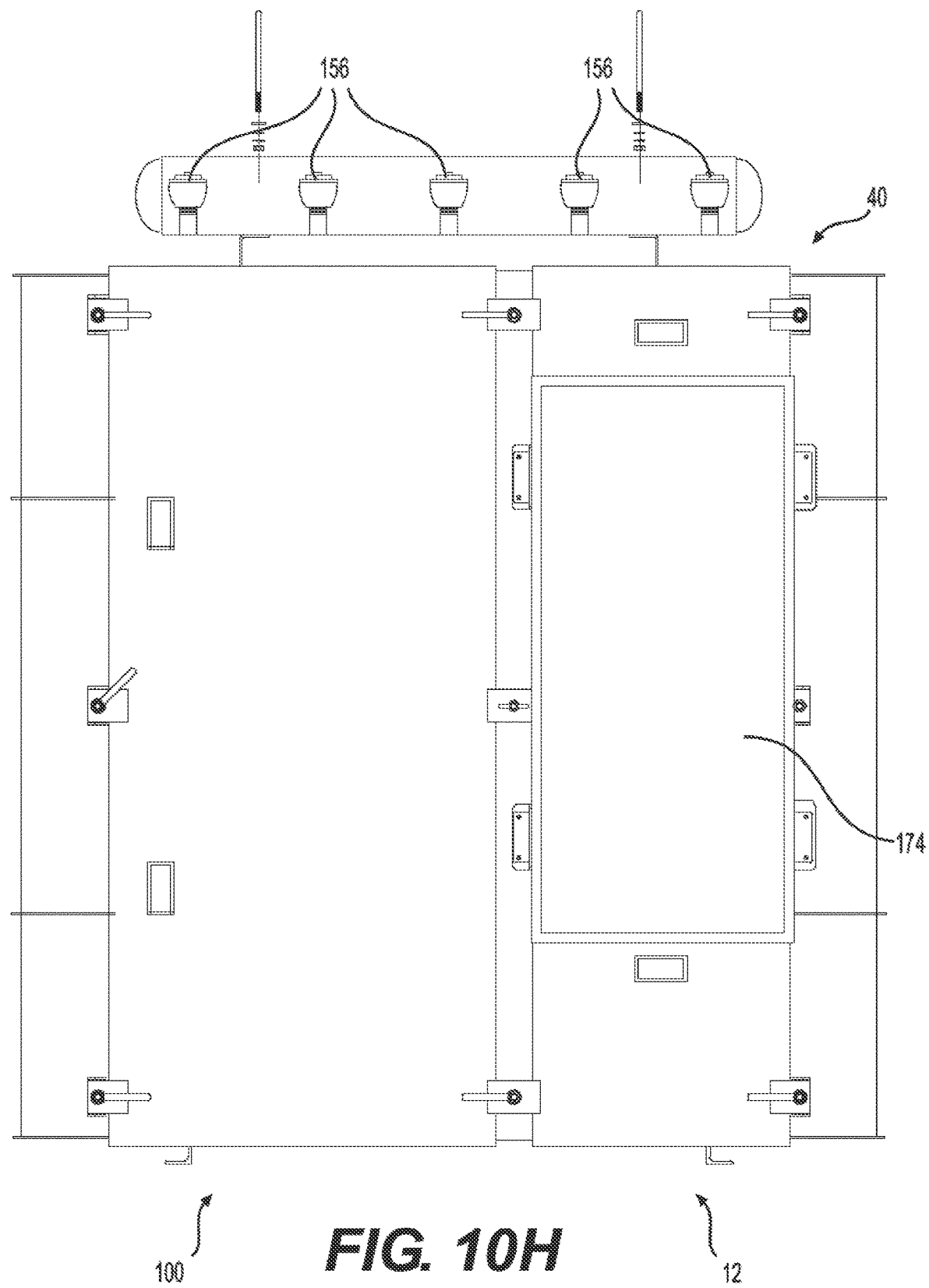
FIG. 10H is a schematic top view of the example vacuum generation assembly shown in FIG. 10A, according to embodiments of the disclosure.
Figure 10J:
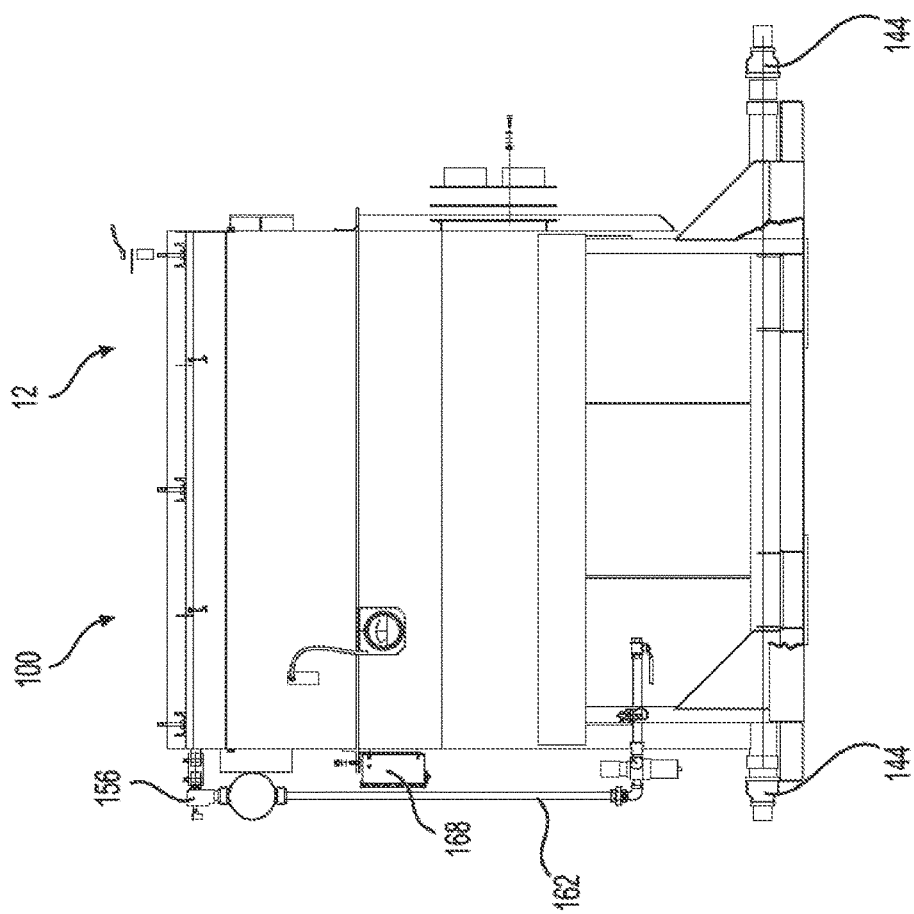
FIG. 10J is a schematic second side view, opposite the first side, of the example vacuum generation assembly shown in FIG. 10A, according to embodiments of the disclosure.
Figure 10I:
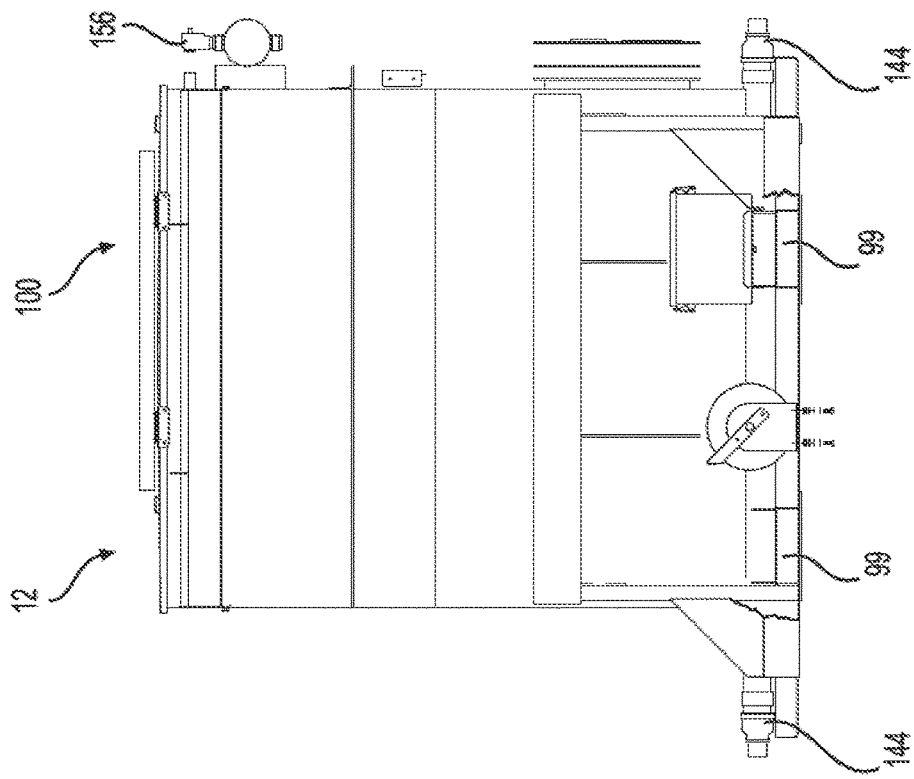
FIG. 10I is a schematic first side view of the example vacuum generation assembly shown in FIG. 10A, according to embodiments of the disclosure.
Figure 11:
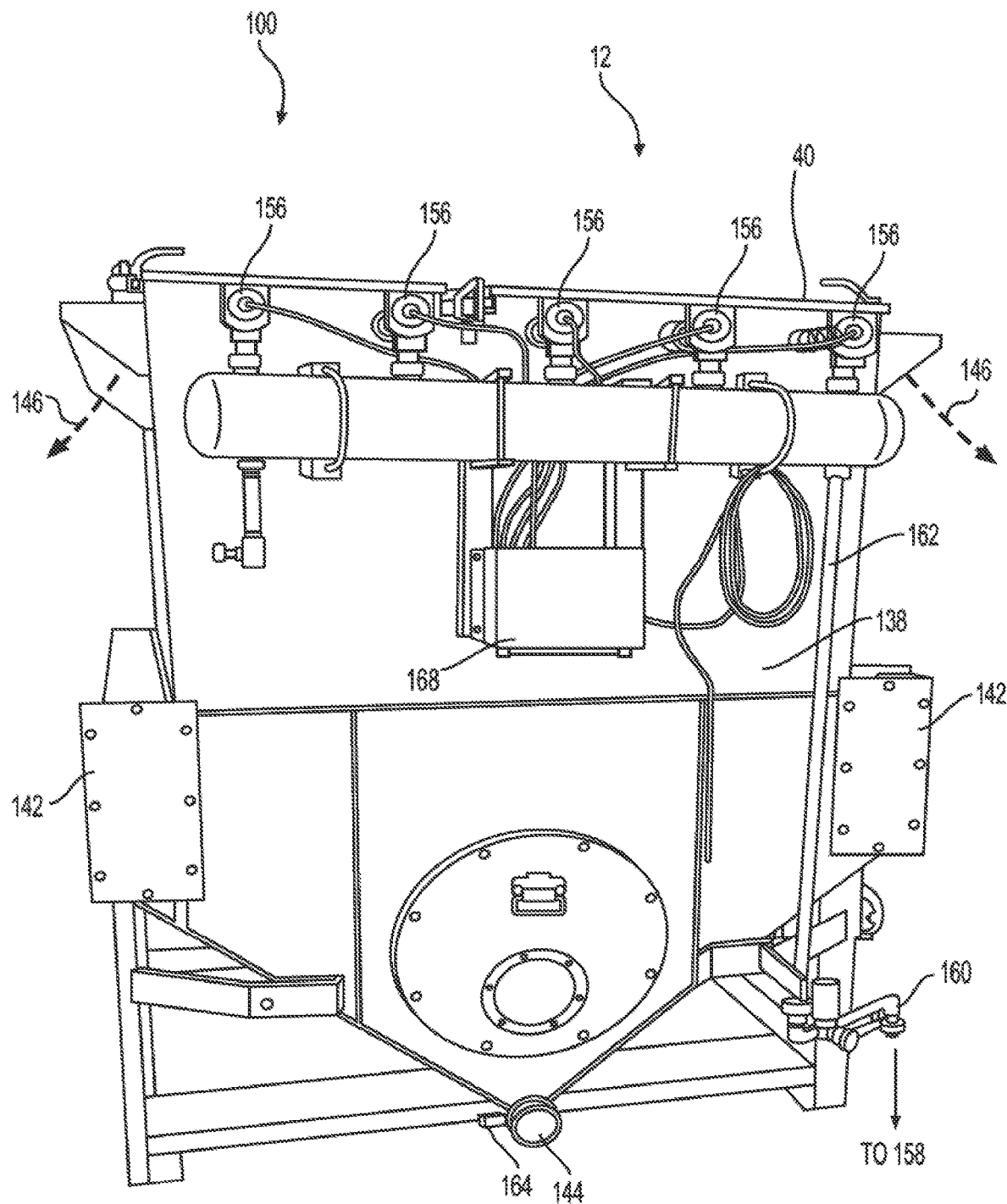
FIG. 11 is a schematic perspective view of an example vacuum generation and assembly, showing an example sound attenuation chamber end, according to embodiments of the disclosure.
Figure 12:
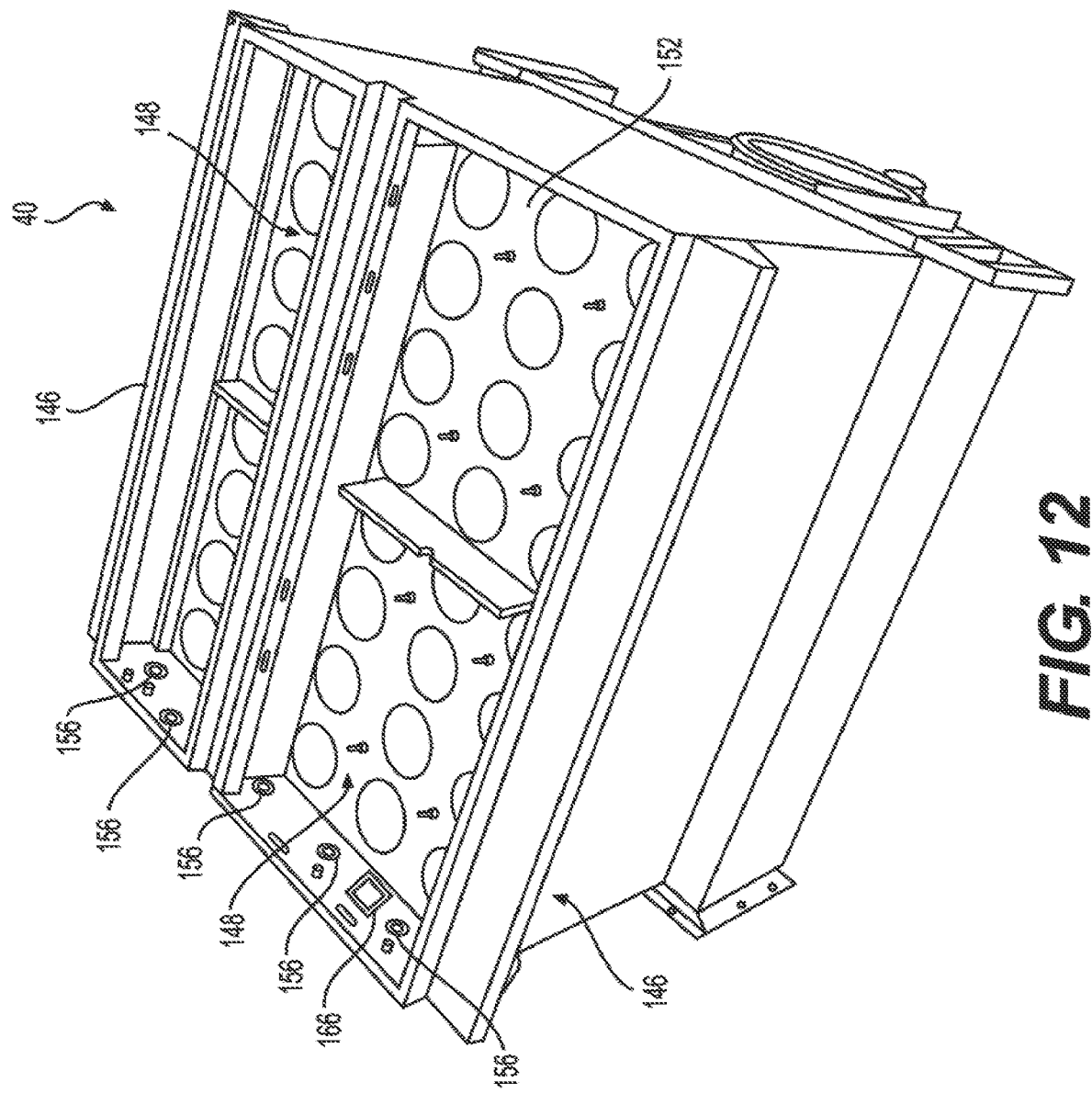
FIG. 12 is a schematic top perspective view of an example vacuum generation assembly, with example filter media, according to embodiments of the disclosure.
Figure 13:
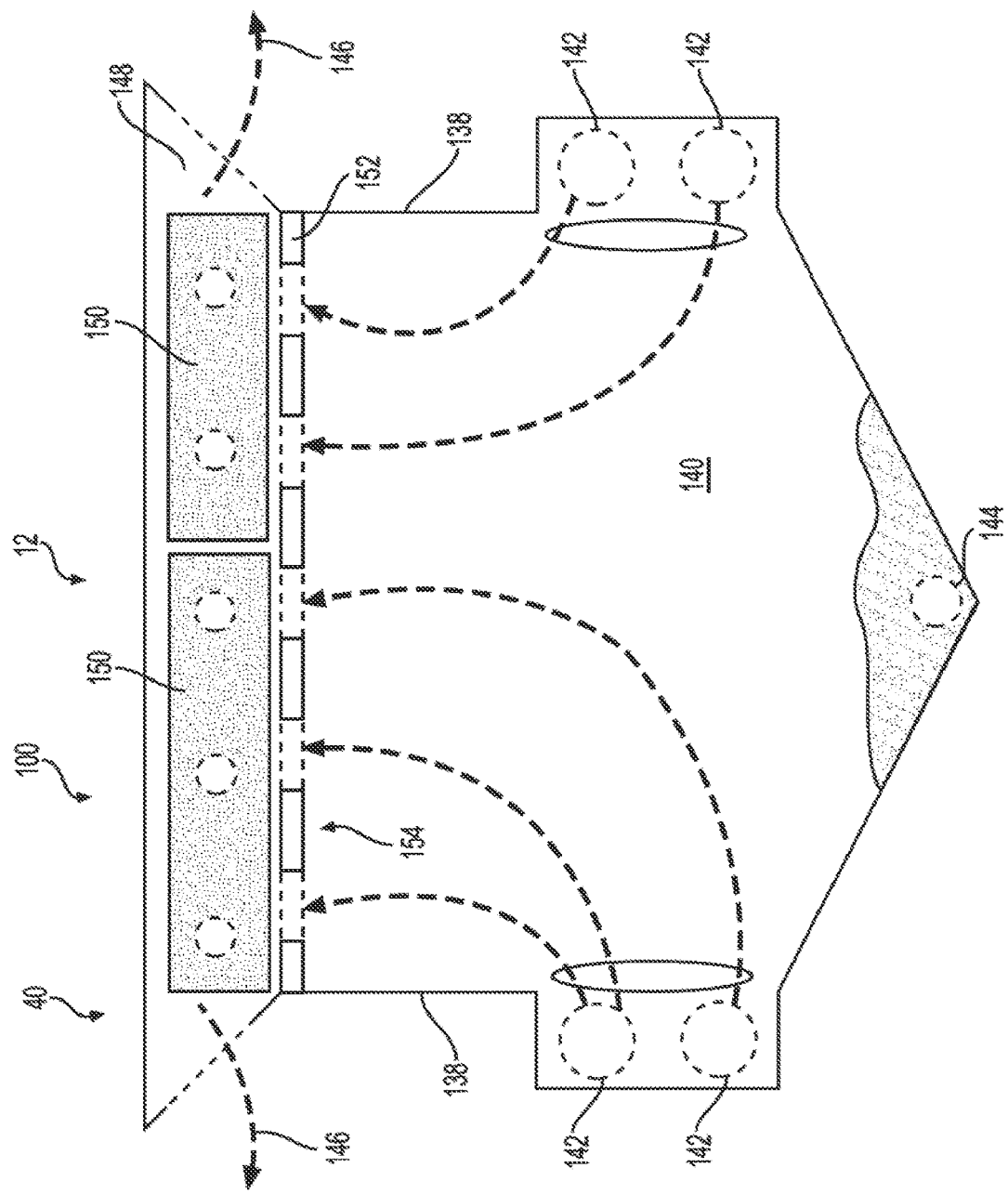
FIG. 13 is a simplified schematic end section view of an example sound attenuation chamber, according to embodiments of the disclosure.

In some embodiments, the vacuum source 38 and the sound attenuation chamber 40 may be configured such that the vacuum source 38 and the sound attenuation chamber 40 may be relatively easily separated from one another. This may facilitate maintenance and/or cleaning of the vacuum source 38 and/or the sound attenuation chamber 40. In some embodiments, this may facilitate conversion of the unified vacuum and attenuation module 100 for tailoring it to different uses. For example, this may facilitate attachment of different vacuum sources (e.g., having different features, sizes, and/or capacities) to the sound attenuation chamber 40, and/or attachment of different sound attenuation chambers (e.g., having different features, sizes, and/or capacities) to the vacuum source 38. FIGS. 10H, 10I, and 10J schematically depict an embodiment of sound attenuation chamber 40 that has been separated from a vacuum source and that is configured for attachment to a vacuum source.

Applicant has recognized that some industrial environments, such as the example environments including a reaction vessel 14 shown in FIG. 1 and FIG. 2, may include personnel tasked to operate the equipment in these environments. The presence of such personnel may restrict the acceptable level of sound that may be produced for undesired material removal purposes. The sound attenuation chamber 40, according to some embodiments, may be configured to attenuate sound generated by the vacuum source 38 and/or the fluid source 42 to sufficient levels, such that personnel may not need to wear protective hearing due to the sound generated by the material extraction assembly 10 and/or material conveyance assembly 11. In some embodiments, the sound attenuation chamber 40 may be configured to reduce the sound level generated by the material extraction assembly 10 and/or material conveyance assembly 11 by an amount ranging from ten percent to forty percent (e.g., by twenty-five decibels). For example, without the sound attenuation chamber 40, according to some embodiments, the assembly 10, 11 may generate approximately 115 decibels of sound. In contrast, when the sound attenuation chamber 40 is incorporated into the material extraction assembly 10, the sound level may be reduced to about 89 decibels.

The sound attenuation chamber 40, in some embodiments, may both filter materials received from fluid flows before exhausting the received fluid flows and attenuate sound from received fluid flows before exhausting the received fluid flows into the ambient environment. In some embodiments, the sound may be attenuated to an extent that personnel in the area need not wear hearing protection, although personnel may need to wear hearing protection for other reasons.

FIGS. 10G, 10H, 11, 12, and 13 illustrate examples of embodiments of a sound attenuation chamber 40. The sound attenuation chamber 40, in some embodiments, may include an attenuation housing 138 at least partially defining an interior chamber or interior volume 140 positioned to receive at least a portion of the vacuum flow 26 from the vacuum source 38 and attenuate sound generated by the vacuum source 38 during operation. The attenuation housing 138 may substantially seal the interior volume 140 from the ambient environment. The attenuation housing 138 may include one or more walls or other structural members to at least partially seal the interior volume 140.

In some embodiments, to filter undesired material 16 entering the sound attenuation chamber 40, the sound attenuation chamber 40 may include one or more inlet ports 142, one or more discharge ports 144, and/or one or more exhaust ports 146. At least some of the ports may be positioned on the attenuation housing 138 to provide access to the interior volume 140 from outside the attenuation housing 138. For example, the respective ports may include holes, apertures and/or other structures through one or more walls of the attenuation housing 138 that enable access to interior volume 140.

The inlet ports 142 may be pneumatically connected to the vacuum source 38. When pneumatically connected to the vacuum source 38, the inlet ports 142 may receive vacuum-induced flow 26 from the vacuum source 38. The minor portion of the undesired material 16 may be entrained in vacuum-induced flow 26, thereby presenting a potential contamination hazard if exhausted into the ambient environment without further filtering and/or treatment.

The exhaust ports 146, in some embodiments, may be pneumatically connected to the ambient environment. The fluid flow path through the material extraction assembly 10 may end at the exhaust ports 146. Consequently, in some embodiments, vacuum-induced flow 26 drawn from the source of the fluid (e.g., the reaction vessel 14, FIG. 1) and through the flow path may exit the flow path through the exhaust ports 146. The interior volume 140 may be in the flow path between the inlet ports 142 and the exhaust ports 146, such that vacuum-induced flow 26 flows through the interior volume 140 prior to being exhausted into the ambient environment.

In some embodiments, to partially attenuate sound, the exhaust ports 146 may be of substantially larger size than the inlet ports 142. The size difference between these ports may reduce or eliminate backpressure on the vacuum-induced flow 26. The flow path may expand greatly in cross-sectional area as the vacuum-induced flow 26 transitions from the inlet ports 142 into the interior volume 140. As a result, any sound generated by the vacuum-induced flow 26 may generally occur at an interface between the inlet ports 142 and the interior volume 140. In some embodiments, accordingly, the sound attenuation chamber 40 may, in part, dissipate the sound generated by the vacuum-induced flow 26 by generating it within the sound attenuation chamber 400, for example, such that the sound will dissipate prior to exiting the sound attenuation chamber 40.

In some embodiments, to filter undesired material 16 prior to exhaustion to the ambient environment, the interior volume 140 may include a filter media region 148. The filter media region 148 may include a portion of the interior volume 140 in which filter media 150 may be positioned. The filter media region 148 may be positioned, for example, such that the vacuum-induced flow 26 must substantially flow through the filter media region 148 and filter media 150 prior to being exhausted through the exhaust ports 146 to the ambient environment. In some embodiments, the interior volume 140 may include a filter media support plate 152. The filter media support plate 152 may be configured to support the filter media 150 within the filter media region 148. In some embodiments, the filter media support plate 152 may generally divide the interior volume 140 into two or more sections and may include holes through which the vacuum-induced flow 26 may travel between the sections. One or both sides of the filter media support plate 152 may include one or more baffles 154 configured to attenuate sound. The one or more baffles 154 may attenuate sound generated by the vacuum-induced flow 26, for example, prior to exhaustion out of the sound attenuation chamber 40.

In some embodiments, to filter undesired material 16 prior to exhaustion to the ambient environment, the filter media 150 may be configured to filter at least a portion of the minor portion of the undesired material 16 from the vacuum-induced flow 26. The filter media 150 may include any type of filter media for removing material from fluid flows. The filter media 150 also may be sound absorptive and, in part, help to dissipate the sound generated by the vacuum-induced flow 26. The filter media 150 may, in some examples, exhibit a relatively limited filtration capacity. As filter media 150 filters the undesired material 16, its permeability to fluid flow may decrease.

To manage the filtration capacity of the filter media 150, in some embodiments, the sound attenuation chamber 40 may include one or more jet generators 156 positioned relative to the sound attenuation chamber 40 to generate jets of fluid flow directed toward the filter media 150 to at least partially maintain the filtration capacity of the filter media 150. For example, the jet generators 156 may be positioned to generate jets of fluid flow directed toward the filter media 150 to at least partially refresh or restore the filtration capacity of filter media 150. For example, the jet generators 156 may be positioned outside the attenuation housing 138 and oriented facing into the filter media region 148.

When the jet generators 156 generate the jets, the jets may transfer undesired material 16 filtered by the filter media 150 out of the filter media 150 and into the interior volume 140. This may, in some embodiments, at least partially restore the permeability and/or the filtration capacity of the filter media 150. For example, the jets may cause undesired material 16 trapped in the filter media 150 to drop out of the filter media region 148, for example, through holes in the filter media support plate 152 and into interior volume 140.

To drive the jet generators 156, in some embodiments, the sound attenuation chamber 40 may include a jet fluid supply 158. The jet fluid supply 158 may be configured to store compressed fluid. In some embodiments, the jet fluid supply 158 may include a storage tank in which the compressed fluid is stored. The compressed fluid may be a gas, such as, for example, compressed air. The jet fluid supply 158 may be pneumatically coupled to the jet generators 156. The jet generators 156 may include one or more ports and one or more electrically driven actuators configured to control the rate at which the compressed fluid from the jet fluid supply 158 exits the jet generators 156. Thus, the jet generators 156 may modulate one or more of a strength of the jets of fluid flow, timing of the jets of fluid flow, or one or more other characteristics associated with the jets of fluid flow.

To fill the jet fluid supply 158, in some embodiments, the sound attenuation chamber 40 may include a fluid supply port 160 (though multiple fluid supply ports also can be provided). The fluid supply port 160 may be pneumatically connected to the jet fluid supply 158 to refill the jet fluid supply 158 with compressed fluid, for example, when another source of compressed fluid (e.g., the fluid source 42) is pneumatically coupled to the fluid supply port 160.

In some embodiments, due to a limited size of the interior volume 140, only a finite quantity of undesired material 16 may be stored in the interior volume 140. Over time the interior volume 140 may become filled with undesired material 16 as undesired material 16 is removed from the source of the material (e.g., the reaction vessel 14). Once the interior volume 140 is filled, the sound attenuation chamber 40 may become inoperable, for example, undesired material 16 may block fluid flow through the interior volume 140.

To manage the fill level 79 of the interior volume 140, in some embodiments, the sound attenuation chamber 40 may include one or more discharge ports 144. The discharge ports 144 may facilitate removal of undesired material 16 from the interior volume 140. In some embodiments, undesired material 16 may be removed from the interior volume 140 through the discharge port(s) 144 while the vacuum-induced flow 26 flows through the interior volume 140.

To remove undesired material 16 from the interior volume 140, in some embodiments, the discharge port 144 may be pneumatically connected to a material collector 36 (e.g., a vacuum box 48). For example, the discharge port 144 may be pneumatically connected to a material collector 36 via a conduit 162 (e.g., such as a restrictive hose). When a high-pressure vacuum is applied to the material collector 36, undesired material 16 in the interior volume 140 may be drawn out of the interior volume 140, through the conduit 162, and into the material collector 36. Thus, both the major portion and the minor portion of the undesired material 16 extracted from the source of the material (e.g., the reaction vessel 14) may be transferred to a material collector 36. The discharge port 144 may be pneumatically connected to other components for undesired material discharge purposes without departing from embodiments disclosed herein.

To control when and/or the rate of removal of the undesired material 16 from the interior volume 140, in some embodiments, the sound attenuation chamber 40 may include a discharge port control valve 164. The discharge port control valve 164 may be positioned to control the rate of fluid flow through the discharge port 144. For example, the discharge port control valve 164 may include an electrically driven actuator usable to control the rate of fluid flow through discharge port 144. In some embodiments, the discharge port control valve 164 may control the rate of fluid flow through discharge port 144 to selectively remove undesired material 16 from the interior volume 140.

To determine when and/or at which rate to remove undesired material 16 from the interior volume 140, in some embodiments, the sound attenuation chamber 40 may include one or more sensors 166. The sensors 166 may be positioned to monitor the filtration capacity of the filter media 150, the fill level 79 of the interior volume 140, and/or the flow rate of undesired material 16 out of the discharge port 144. The sensors 166 may be configured to generate signals indicative of any physical property of the sound attenuation chamber 40 and use the signals to determine these quantities. For example, the sensors 166 may include photo-sensors that measure the filtration capacity of the filter media 150 based on a quantity of light transmitted by the filter media 150. In some embodiments, the sensors 166 may include a transducer configured to measure the mass of undesired material 16 to determine the fill level 79 of the interior volume 140. The sensors 166 may include other components for measuring the same or different types of physical properties without departing from embodiments disclosed herein.

Figure 14:
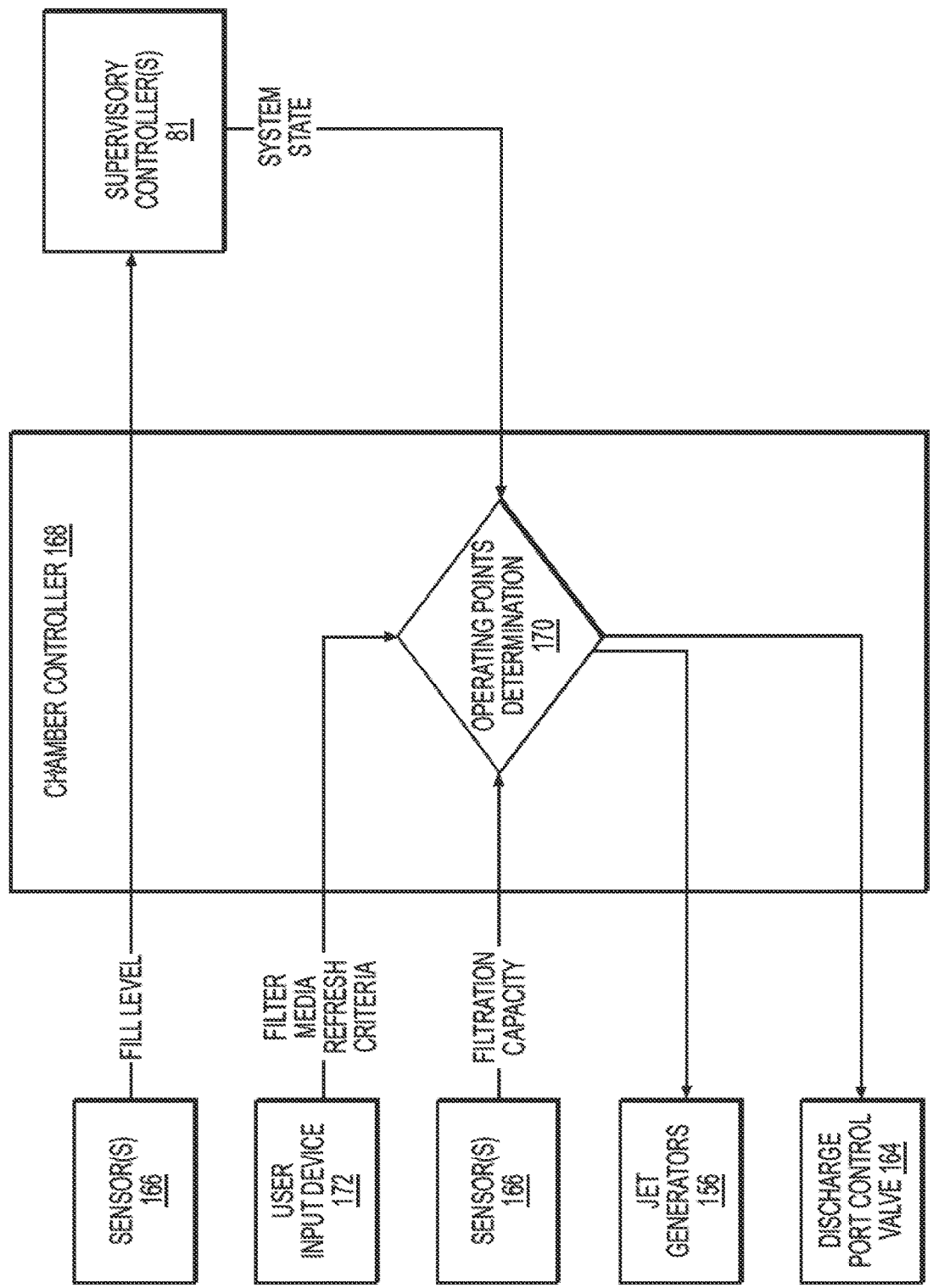
FIG. 14 is a block diagram of an example architecture for operating an example sound attenuation chamber of an example material extraction assembly or material loading assembly, according to embodiments of the disclosure.

FIG. 14 is a block diagram of an example architecture for operating an example sound attenuation chamber 40 of an example material extraction assembly 10, according to embodiments of the disclosure. To coordinate operation of the sound attenuation chamber 40, in some embodiments, the sound attenuation chamber 40 may include a chamber controller 168 in communication with one or more of a discharge port control valve actuator, one or more jet generators 156, and the one or more sensors 166. For example, the chamber controller 168 may be operably connected to the discharge port control valve 164, the jet generators 156, and the sensors 166. The chamber controller 168 may obtain information from sensors 166 and selectively drive the discharge port control valve 164 and/or the jet generators 156 based on the information to ensure that (i) the filter media 150 is capable of continuing to filter fluid flows through the interior volume 140 and (ii) the interior volume 140 is not overfilled with undesired material 16.

In some embodiments, the chamber controller 168 may include computing hardware (e.g., processors, memory, storage devices, communication devices, other types of hardware devices including circuitry, etc.), and/or computing instructions (e.g., computer code) that when executed by the computing hardware cause chamber controller 168 to provide its functionality. The chamber controller 168 may include a lookup table or other data structure usable to make an operating points determination 170 for the discharge port control valve 164 and/or the jet generators 156 based at least in part on the fill level 79 and filtration capacity of the filter media 150. Once the operating points are determined, the chamber controller 168 may be configured to modify operation of the discharge port control valve 164 and/or the jet generators 156 based at least in part on the operating points. For example, the chamber controller 168 may be configured to modify the quantities of power used to drive the discharge port control valve 164 and/or the jet generators 156 to set the quantity of fluid flows through each of the discharge port control valves 164 and/or the jet generators 156. As a result, in some embodiments, the sound attenuation chamber 40 may be more likely to be able to substantially continuously operate.

In some embodiments, to enable a person to control operation of the sound attenuation chamber 40, the sound attenuation chamber 40 may include a user input device 172. The user input device 172 may be in communication with to the chamber controller 168. The user input may be communicated to the chamber controller 168 via the user input device 172. The user input device 172 may include, for example, one or more buttons, touch sensitive displays, levers, knobs, and/or other devices (e.g., control panels, tablet computers, and/or smart phones) that are operable by a person to provide the chamber controller 168 with information for operating or controlling the sound attenuation chamber 40.

The chamber controller 168 may be configured to receive information from a person via the user input device 172 regarding how frequently to refresh the filtration capacity of the filter media 150 and/or information regarding how frequently to discharge undesired material 16 from the interior volume 140. The chamber controller 168 may use such information when determining the operating points for the discharge port control valve 164 and/or the jet generators 156. For example, a person may provide operational preferences or other information using the user input device 172 to configure operation of the sound attenuation chamber 40.

In some embodiments, the chamber controller 168 may be powered using electricity. The sound attenuation chamber 40 may include one or more solar panels 174 that provide electrical power to the chamber controller 168. The chamber controller 168 may include one or more batteries in which power from the one or more solar panels 174 may be stored prior to use by the chamber controller 168 (and/or other controllers of the material extraction assembly 10).

Applicant has recognized that some environments, such as industrial environments similar to the environment illustrated in FIGS. 1A-2, may include volatile hydrocarbon fluids (and/or other types of volatile materials) or other types of fluids susceptible to combustion. Some embodiments of the material extraction assembly 10, or one or more components thereof, may not be powered by combustible power sources. Rather, the material collector 36, the vacuum source 38, the sound attenuation chamber 40, and/or the fluid source 42 may be powered with electricity and/or compressed fluid. In some such embodiments, the material extraction assembly 10 may be capable of removing undesired materials from an environment, such as an industrial environment, without the risk of igniting combustible materials in the environment (or with a reduced risk).

In some embodiments, various components may utilize fluid flows to provide their functionalities. To operate these components, the material extraction assembly 10 may include the fluid source 42, which may be a mobile fluid supply. The fluid source 42 may be configured to supply pressurized or compressed fluid to the vacuum source 38 and/or the sound attenuation chamber 40. The fluid supplied may be may be pneumatically connected to the vacuum source 38 (e.g., to generate vacuums) and/or the sound attenuation chamber 40, for example, to refresh the filtration capacity of the filter media 150.

To supply pressurized or compressed fluid, the fluid source 42 may compress fluid and store the compressed or pressurized fluid for future use. In some embodiments, the fluid source 42 may include an air compressor, and the air compressor may be configured to compress air from the ambient environment to generate the compressed or pressurized fluid. The fluid source 42 may compress other fluids without departing from embodiments disclosed herein.

To limit or prevent combustion risk, in some embodiments, the fluid source 42 may compress fluid using electricity. The fluid source 42 may obtain the electricity from any electricity source. In some embodiments, the fluid source 42 may include one or more batteries for providing the electricity to the fluid source 42. In some embodiments, the fluid source 42 may include a power cable and/or other componentry for obtaining electricity from another source (e.g., from a utility company or other large scale supplier, a solar setup, and/or or other non-combustion-based electricity producers, etc.).

Applicant has recognized that environments, such as industrial environments, such as the site illustrated in FIGS. 1A-2, may require a high uptime by their operators. As a result, the time required to setup the material extraction assembly 10 may be a significant cost to the operators of the site. In some embodiments, the material extraction assembly 10 disclosed herein may provide for the efficient setup, operation, and removal of the assembly in many environments, including industrial environments. In some embodiments, any of the components of the material extraction assembly 10 may be placed or mounted on chassis including trailers or other types of high mobility structures to enable them to be efficiently placed and oriented with respect to, for example, a reaction vessel.

Applicant has recognized that environments, such the example environment shown in FIGS. 1A-2, may have different requirements for material removal. For example, different industrial environments may have different quantities of undesired material and/or undesired material at different industrial environments may have different physical properties. The material extraction assembly 10 in accordance with embodiments disclosed herein may provide for rapid deployment of a material extraction assembly 10 that is customized or tailored to meet the requirements of each industrial environment. As a result, different numbers of components may be deployed and connected (e.g., pneumatically connected) in parallel and/or in series to provide desired levels of vacuum strength and/or desired storage capacities for undesired material.

For example, in embodiments, the material collector 36 may be pneumatically connected to one or more vacuum sources 38 through hoses 182. By pneumatically connecting two vacuum sources 38 to a single material collector 36, the strength of the high-pressure vacuum in the material collector 36 may be increased. Consequently, a higher degree of suction may be applied to undesired material 16 in the retention collection, thereby increasing the transfer rate of undesired material 16 from retention and allowing more difficult material to be transferred out of collection 14. The suction strength of the material extraction assembly 10 in accordance with embodiments may be scaled up (or down) as desired in this example manner to meet environment requirements.

In some embodiments, the vacuum source 38 pneumatically connected to a material collector 36 may be driven with fluid flow from a corresponding fluid source 42 (e.g., a mobile fluid supply). For example, the fluid sources 42 (e.g., gas supplies) may be pneumatically connected to one or more corresponding vacuum sources 38 through conduits.

In some embodiments, the vacuum source 38 pneumatically connected to a material collector 36 may also exhaust through a corresponding sound attenuation chamber 40. For example, the vacuum source 38 may exhaust through a corresponding sound attenuation chamber 40 may be positioned on a trailer together with the vacuum source to form a mobile unit. In this manner, the material extraction assembly 10 may be quickly and efficiently deployed and scaled up (or down) as desirable to meet environment requirements.

To facilitate efficient reconfiguration of the material extraction assembly 10, any of the pneumatic connections may be implemented using quick connect-disconnect connections and/or pneumatic isolators, with the quick connect-disconnect connections may allow for any of the pneumatic connections to be quickly made and removed. The pneumatic isolators also may automatically seal the material removal system when a pneumatic connection is disconnected. Pneumatic isolators positioned between the vacuum source and the material collector 36. Quick connect-disconnect connections and/or pneumatic isolators may be used to facilitate the pneumatic reconfiguration of any of the fluidic topologies illustrated throughout this application.

Some embodiments of the material extraction assembly 10 may include a number of components configured to cooperatively operate to provide a desired functionality. To orchestrate the operation of these components, in some embodiments, the operation of the material extraction assembly 10 may be coordinated in an at least partially automated manner. For example, as explained herein, any of the components of the material extraction assembly 10 may include a supervisory controller 81, which may coordinate operation of one or more of the components.

Figure 15:
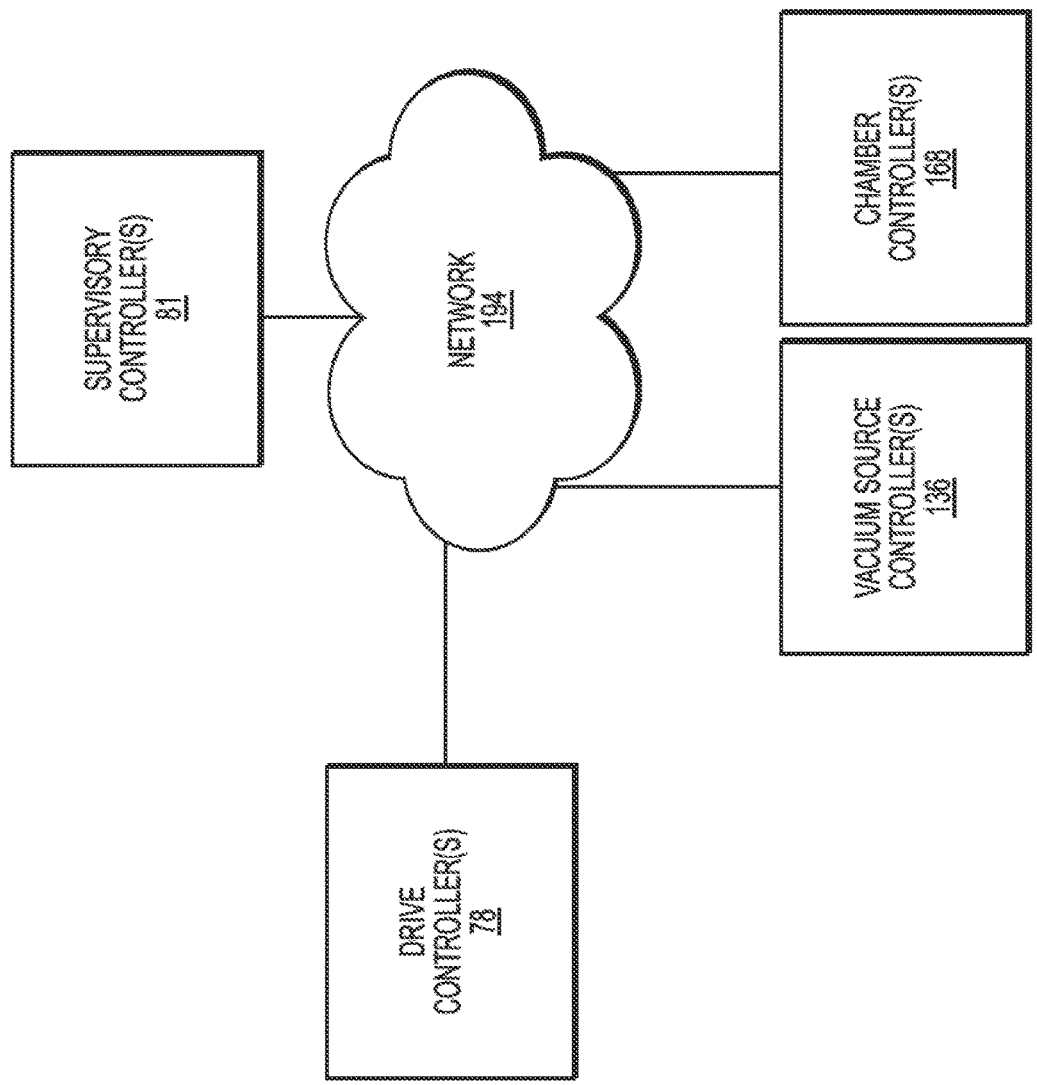
FIG. 15 is a block diagram of an example supervisory controllers for coordinating substantially continuous material conveyance by an example material conveyance assembly, according to embodiments of the disclosure.

As shown in FIG. 15, the material extraction assembly 10 may include one or more supervisory controllers 81, which may be in communication with one or more of the drive controller 78 associated with operation of one or more material collectors, a vacuum source controller 136 associated with operation of one or more vacuum sources, and/or a chamber controller 168 associated with controlling operation of one or more sound attenuating chambers 40. The aforementioned supervisory controller(s) and other controllers may be in communication with one another via a network 194. The network 194 may include one or more wired and/or wireless networks through which the supervisory controller(s) 81 and other controllers may communicate.

FIG. 16A, FIG. 16B, FIG. 16C, and FIG. 16D illustrate of an example method 1800 for extracting material from a source of the material, for example, any one or more of the example sources of material described herein, as well as others. The example method 1800 is illustrated as a collection of blocks in a logical flow graph, which represent a sequence of operations. In some embodiments of the method 1800, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the method.

Figure 16A:
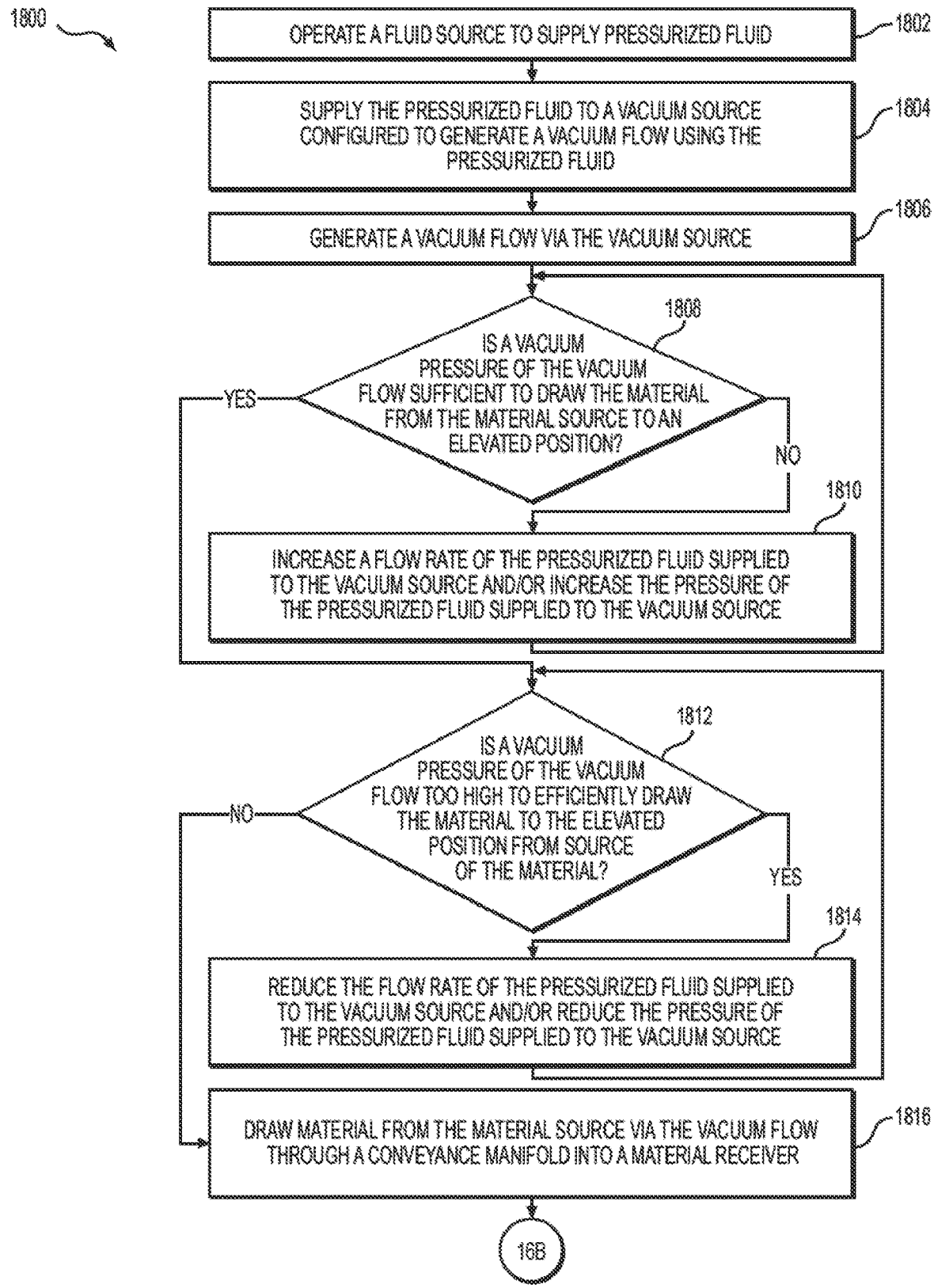
FIG. 16A is a block diagram of an example method for extracting material from a source of the material, according to embodiments of the disclosure.
Figure 16B:
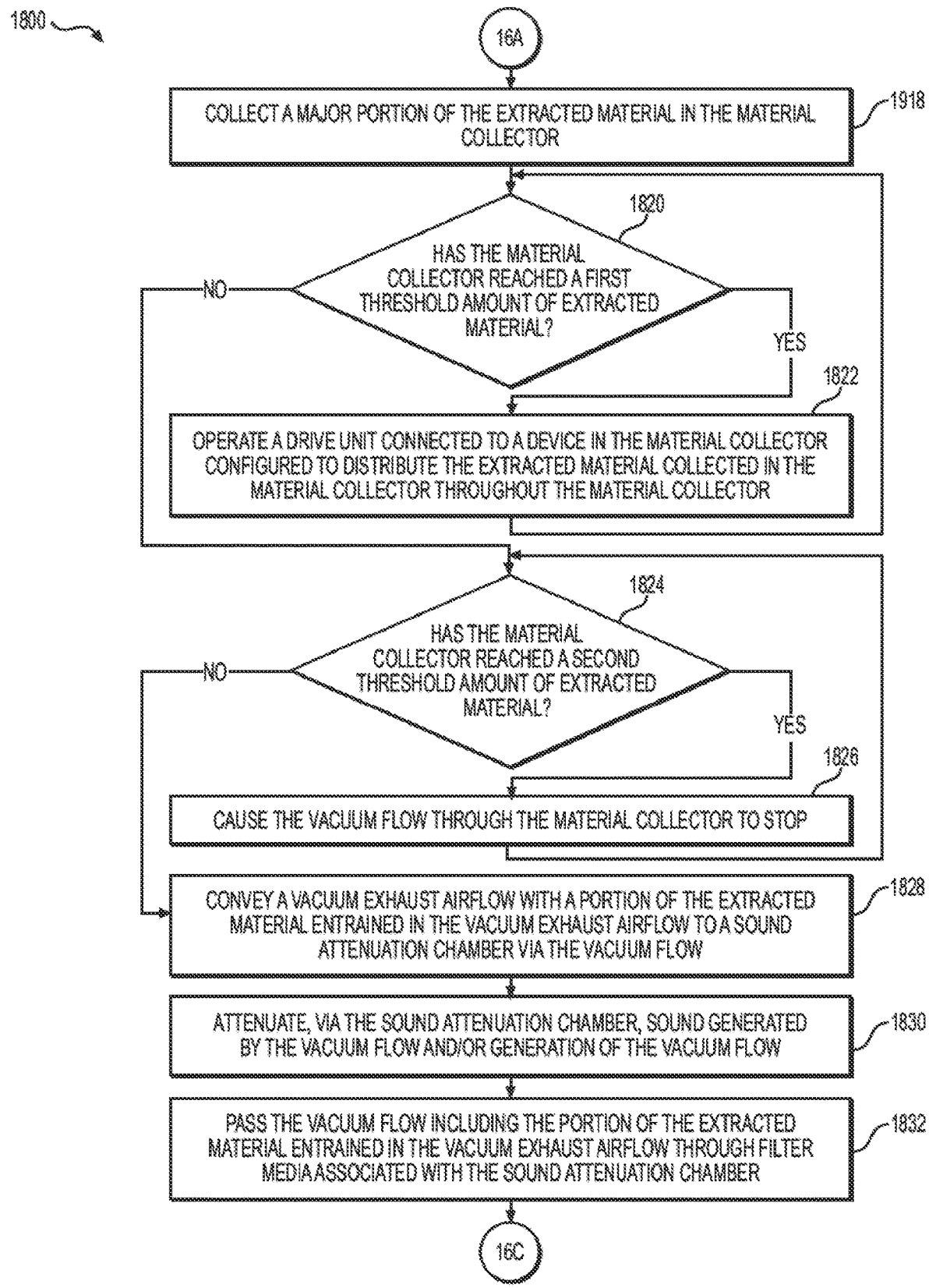
FIG. 16B is a continuation of the block diagram shown in FIG. 17A, according to embodiments of the disclosure.
Figure 16C:
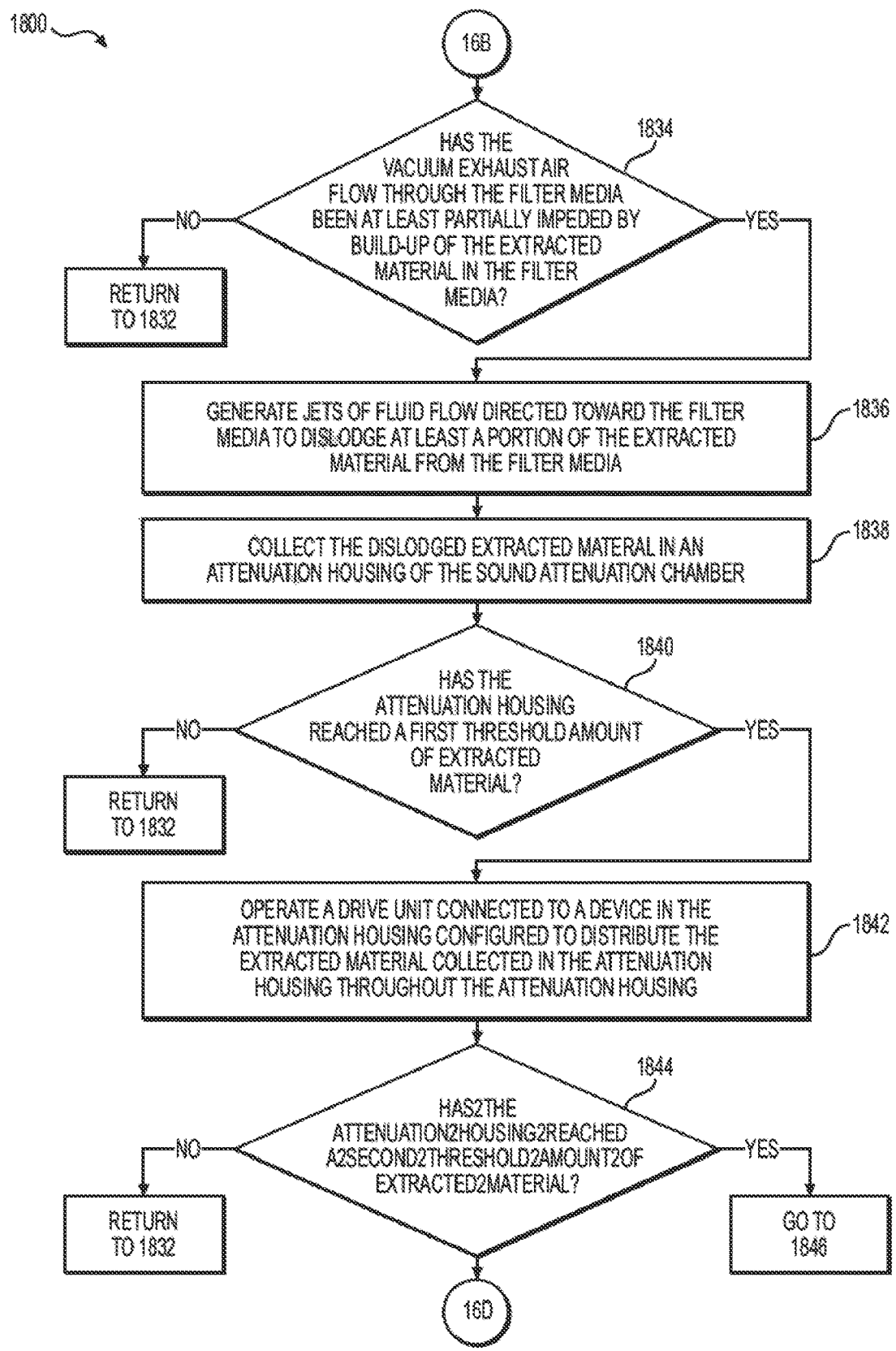
FIG. 16C is a continuation of the block diagram shown in FIGS. 17A and 17B, according to embodiments of the disclosure.
Figure 16D:
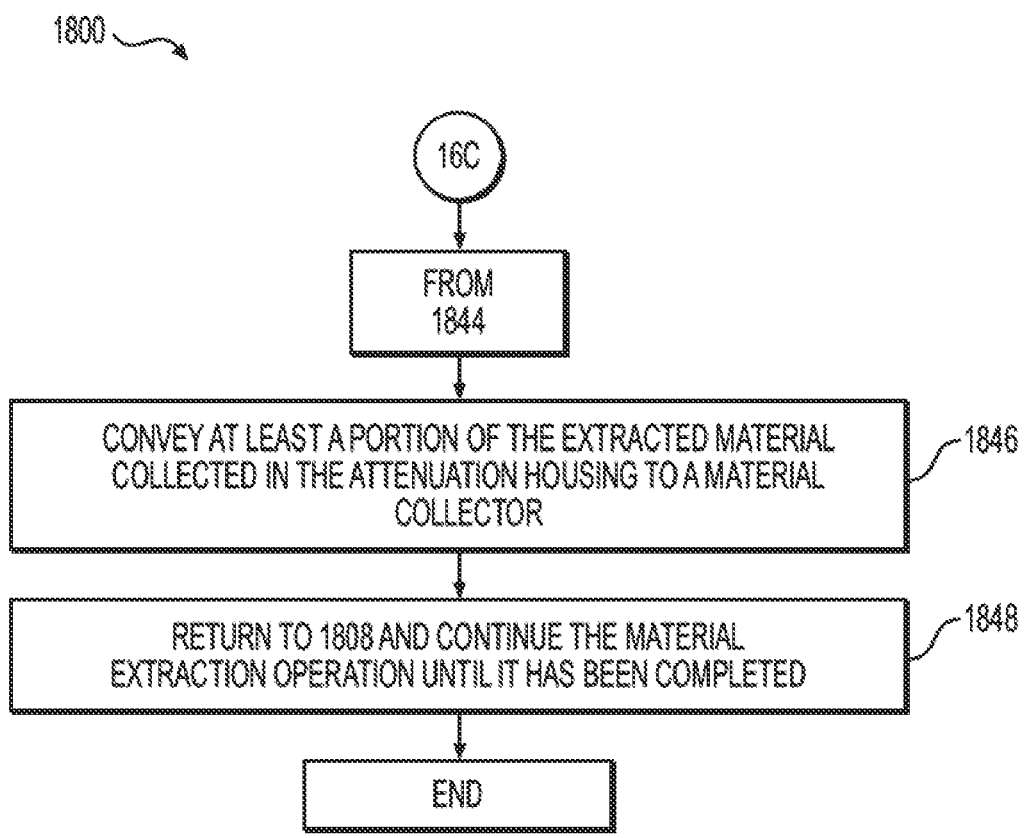
FIG. 16D is a continuation of the block diagram shown in FIGS. 17A, 17B, and 17C, according to embodiments of the disclosure.

FIG. 176 through FIG. 16D are a block diagram of an example method 1800 for extracting material from a source of the material, according to embodiments of the disclosure. At 1802 (see FIG. 16A), the example method 1800 may include operating a fluid source to supply pressurized fluid, for example, as described herein.

The example method 1800, at 1804, may include supplying the pressurized fluid to a vacuum source configured to generate a vacuum flow using the pressurized fluid, for example, as described herein. In some embodiments, one or more conduits may be provided between one or more fluid sources and the vacuum generator to supply pressurized fluid from the one or more fluid sources to the vacuum source, for example, as described herein.

At 1806, the example method 1800, may include generating a vacuum flow via the vacuum source, for example, as described herein. For example, the vacuum source may include a plurality of vacuum generators configured to use the pressurized fluid to generate the vacuum flow. In some embodiments, the vacuum source may include two or more, three or more, or four of more vacuum generators. In some embodiments, one or more of the vacuum generators may include a venturi mechanism configured to use the pressurized fluid flow the generate the vacuum flow.

The example method 1800, at 1808, may include determining whether a vacuum pressure of the vacuum flow is sufficient to extract the material from the source of the material, for example, as described herein. For example, pressure sensors and/or flow rate sensors may be provided upstream and/or downstream of the vacuum source, and a controller may receive sensor signals from the sensors and determine whether the vacuum pressure is sufficient. In some embodiments, the controller may be configured to compare the pressure and/or flow rate determined based at least in part of the sensor signals and compare the pressure and/or flow rate to pressure and/or flow rate information stored in memory (e.g., via a look-up table) for different types of materials that may be extracted. In some embodiments, an operator of the system may input, for example, via a user input device, the type of material being extracted, and the controller may be configured to determine the pressure and/or flow rate appropriate for extracting the type of material input by the operator. In some embodiments, the controller may be configured to automatically determine the type of material being extracted, for example, via infra-red sensors, image sensors, optical sensors, and/or laser sensors, such as LIDAR, and analytical models, such as, for example, machine-learning-trained analytical models. Other ways of determining sufficient vacuum pressure are contemplated.

If, at 1808, is determined that the vacuum pressure is not sufficient to extract the material, at 1810, the example method 1800 may include increasing one or more of a flow rate of the pressurized fluid supplied to the vacuum source or increasing the pressure of the pressurized fluid supplied to the vacuum source.

Thereafter, the example method 1800 may include returning to 1808 to determine whether the vacuum pressure of the vacuum flow is sufficient to extract the material from the source of the material.

If, at 1808, it is determined that the vacuum pressure of the vacuum flow is sufficient to extract the material from the source of the material, at 1812, the example method 1800 may include determining whether the vacuum pressure is too high to efficiently extract the material from the source of material. This may be performed in a manner at least similar to the example manner described with respect to 1808.

If, at 1812, it is determined that the vacuum pressure is too high, at 1814, the example method 1800 may include reducing one or more of a flow rate of the pressurized fluid supplied to the vacuum source or reducing the pressure of the pressurized fluid supplied to the vacuum source.

Thereafter, the example method 1800 may include returning to 1808 to determine whether the vacuum pressure of the vacuum flow is sufficient to extract the material from the source of the material.

If, at 1812, it is determined that the vacuum pressure is not too high, at 1816, the example method 1800 may include drawing material from the material source into a material collector via the vacuum flow to collect extracted undesired material from the material source, for example, as described herein. One or more manifolds and/or one or more conduits may be provided between the source of the material and the material collector to convey the extracted undesired material to the material collector, for example, as described herein.

At 1818 (see FIG. 16B), the example method 1800 may include collecting a major portion of the extracted undesired material in the material collector, for example, as described herein.

The example method 1800, at 1820, may include determining whether the material collector has reached a first threshold amount of extracted undesired material, for example, as described herein. In some embodiments, one or more sensors may be provided to generate signals indicative of the amount of extracted undesired material in the material collector, for example, as described herein. In some examples, a controller may be provided and configured to receive the sensor signals, and based at least in part on the sensor signals, determine whether the first threshold has been met.

If, at 1820, it is determined that the material collector has reached the first threshold amount, at 1822, the example method 1800, may include operating a drive unit connected to a device in the material collector configured to distribute the extracted undesired material collected in the material collector throughout the material collector, for example, as described herein. For example, the drive unit may be connected to an auger configured to rotate via the drive unit and redistribute at least some of the extracted undesired material within the material collector, for example, as described herein.

At 1824, the example method 1800 may include determining whether the material collector has reached a second threshold amount of extracted undesired material approaching maximum capacity of the material collector, for example, as described herein. In some embodiments, as noted above at 1820, one or more sensors may be provided to generate signals indicative of the amount of extracted undesired material in the material collector. In some examples, a controller may be provided and configured to receive the sensor signals, and based at least in part on the sensor signals, determine whether the second threshold has been met.

If, at 1824, it is determined that the material collector has reached the second threshold amount of extracted undesired material, at 1826, the example method 1800 may include causing the vacuum flow through the material collector to stop. This may include, for example, closing a valve in the conduit between the source of the material and the material collector to prevent the extracted undesired material from continuing to flow into the material collector. In some embodiments, this may include ceasing the method 1800 until, for example, the material collector may be emptied or the conduit may be connected to a different material collector. In some embodiments, the conduit connecting the material collector to the source of the material may be disconnected from the source of the material and another material collector may be connected to the conduit. Thereafter, the method 1800 may be restarted. The full material collector may be taken to a location for disposal of the extracted undesired material, recycling of the extracted undesired material, or remediation of the extracted undesired material.

If, at 1824, it is determined that the material collector has not reached the second threshold amount of extracted undesired material approaching maximum capacity of the material collector, at 1828, the example method 1800 may include conveying a minor portion of the extracted undesired material to a sound attenuation chamber via the vacuum flow, e.g. a vacuum exhaust air flow with a minor portion of the extracted undesired material entrained therein. For example, a conduit may be provided between the material collector and the sound attenuation chamber providing a flow path for the vacuum flow to convey the minor portion of the material (e.g., material not trapped in the material collector) to the sound attenuation chamber. In some embodiments, the sound attenuation chamber of the vacuum source may be connected to one another (e.g., directly connected to one another), for example, to form a unitary vacuum and attenuation module, for example, as described herein.

At 1830, the example method 1800 may include attenuating, via the sound attenuation chamber, sound generated by the vacuum flow and/or generation of the vacuum flow, for example, as described herein.

The example method 1800, at 1832, may include passing the vacuum flow including the minor portion of the extracted undesired material entrained within the vacuum flow through filter media associated with the sound attenuation chamber (e.g., at least partially enclosed within the sound attenuation chamber) to capture at least a portion of the minor portion of extracted undesired material in the filter media, for example, as described herein.

At 1834 (see FIG. 16C), the example method 1800 may include determining whether flow of the vacuum flow (e.g. an exhaust air flow) passing through the filter media may be at least partially impeded by build-up of the extracted undesired material in the filter media. This may be determined, for example, by determining whether a pressure change associated with the vacuum flow between opposite sides of the filter media has reached a threshold level indicative of the vacuum flow through the filter media being at least a partially impeded by a build-up of the extracted undesired material in the filter media. Other ways of determining whether the vacuum flow through the filter media is at least a partially impeded by a build-up of the extracted undesired material in the filter media are contemplated.

If, at 1834, it is determined that the flow of the vacuum flow through the filter media may be at least partially impeded by build-up of the extracted undesired material in the filter media, at 1836, the example method 1800 may include generating jets of fluid flow directed toward the filter media to dislodge at least a portion of the extracted undesired material from the filter media, for example, as described herein. In some embodiments, the example method 1800 may include periodically generating the jets of fluid flow directed toward the filter media instead of, or in addition to, determining whether flow of the vacuum flow through the filter media may be at least partially impeded by build-up of the extracted undesired material in the filter media. For example, the jets of fluid flow directed toward the filter media may be initiated based on parameters, such as, for example, the amount of time the material extraction assembly has been operating, the pressure level and/or flow rate of the vacuum flow, and/or the type of material being extracted from the material source. One of more of these parameters may be determined based at least in part on, for example, sensor signals, a controller, and/or operator input.

At 1838, the example method 1800 may include collecting the dislodged extracted undesired material in an attenuation housing of the sound attenuation chamber, for example, as described herein. For example, the jets of fluid, when generated may cause at least a portion of the extracted undesired material trapped in the filter media to fall from the filter media into the attenuation housing for collection.

The example method 1800, at 1840, may include determining whether the attenuation housing has reached a first threshold amount of extracted undesired material, for example, as described herein. This may be performed in a manner at least similar to the example manner described with respect to 1820 above.

If, at 1840, it is determined that the attenuation housing has reached the first threshold amount, at 1842, the example method 1800, may include operating a drive unit connected to a device in the attenuation housing configured to distribute the extracted undesired material collected in the attenuation housing throughout the attenuation housing, for example, as described herein. For example, this may be performed in a manner at least similar to the manner described with respect to 1822 above.

At 1844, the example method 1800 may include determining whether the attenuation housing has reached a second threshold amount of extracted undesired material, for example, as described herein. This may be performed in a manner at least similar to the example manner described with respect to 1824 above.

If, at 1844, it is determined that the second threshold has been reached, the example method 1800 may include, at 1846 (see FIG. 16D), conveying at least a portion of the extracted undesired material collected in the attenuation housing to a material collector, for example, as described herein. For example, a discharge valve in the attenuation housing may be opened, and the vacuum flow may be used to convey at least a portion of the extracted undesired material collected in the attenuation housing to a material collector connected to the attenuation housing via a conduit.

At 1848, the example method 1800 may include returning to, for example, 1808 and continuing the material extraction operation until it has been completed.

It should be appreciated that at least some subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Figure 17A:
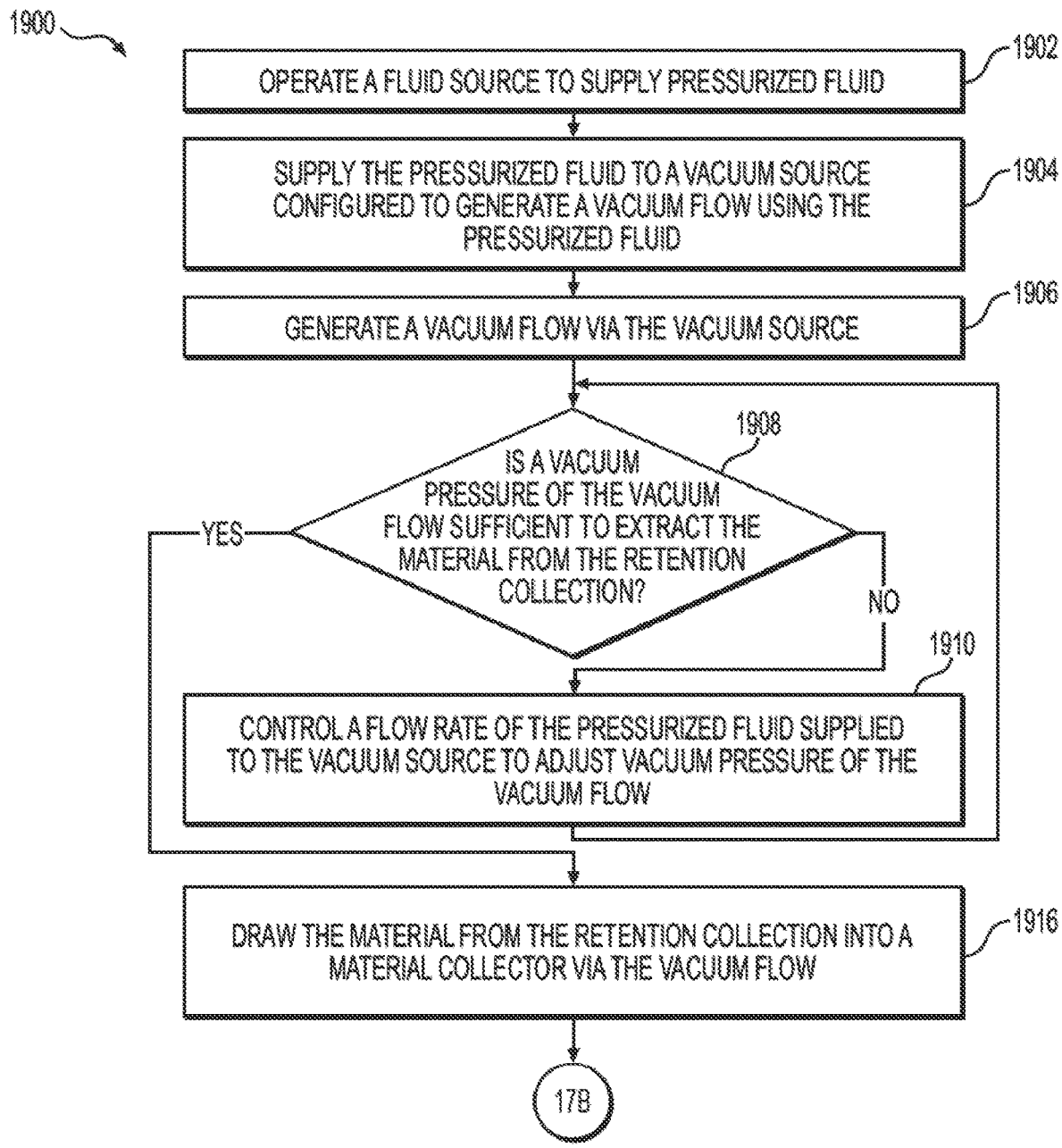
FIG. 17A is a block diagram of an example method shut-down of the vacuum flow, according to embodiments of the disclosure.
Figure 17B:
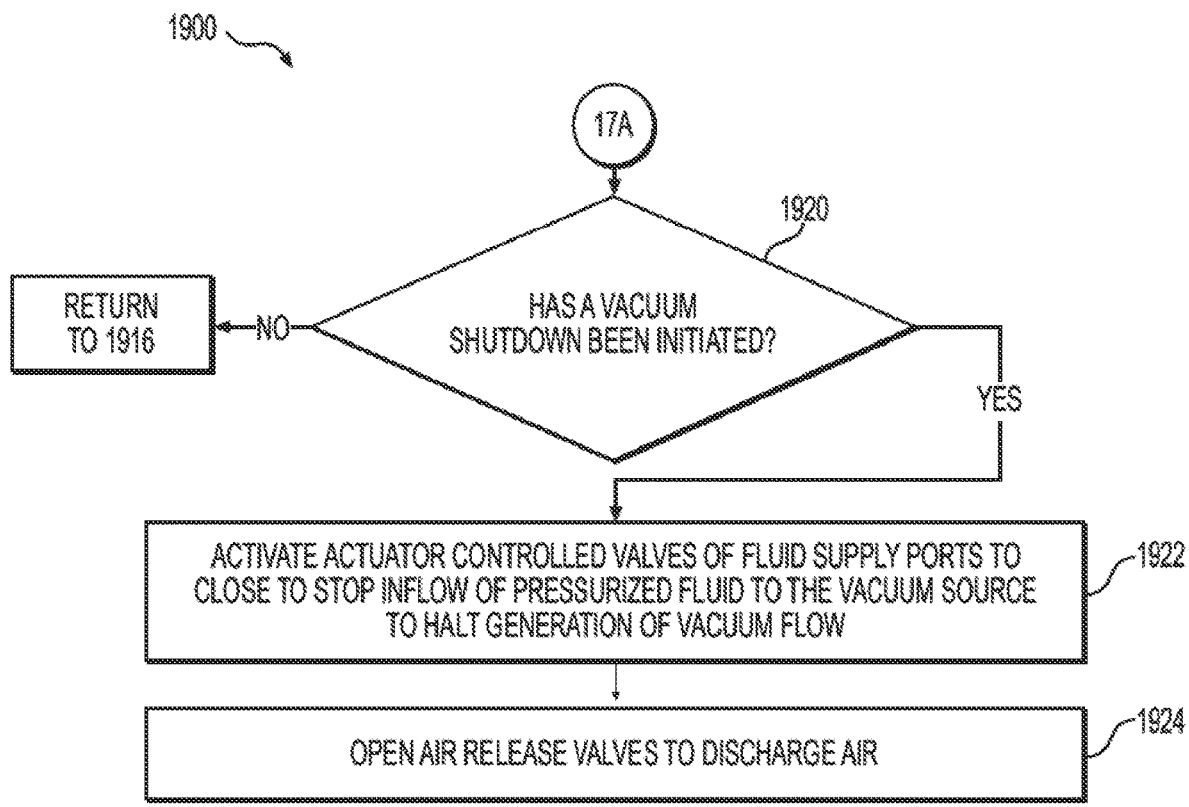
FIG. 17B is a continuation of the block diagram shown in FIG. 18A, according to embodiments of the disclosure.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like FIG. 17A and FIG. 17B illustrate an example method 1900 for shut-down of the vacuum source using the vacuum shut-down system 135 as part of an operation of the material extraction assembly 10 according to embodiments of the disclosure. At least some steps for the generation of a vacuum flow and extraction of material from a retention collection may be at least similar to those described in method 1800. The example method 1900 is illustrated as a collection of blocks in a logical flow graph, which represent a sequence of operations. In some embodiments of the method 1900, one or more of the blocks may be manually and/or automatically executed. In the context of software, where applicable, the blocks may represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks may be combined in any order and/or in parallel to implement the method.

At 1902 (see FIG. 17A), the example method 1900 may include operating a fluid source to supply pressurized fluid, and at 1904 supplying the pressurized fluid to a vacuum source configured to generate a higher pressure vacuum flow using the pressurized fluid. The vacuum source may include a plurality of vacuum generators, and the plurality of vacuum generators may include venturi mechanisms configured to use the pressurized fluid flow the generate the vacuum flow as indicated at 1906, and as described herein.

The example method 1900, at 1908 as indicated and 1912, may include determining whether a vacuum pressure of the vacuum flow is sufficient or too high to efficiently extract the material from the retention collection, according to embodiments as described herein. For example, pressure sensors and/or flow rate sensors may be provided within the vacuum source or the material collector, and/or along the collection conduit, and a controller may receive sensor signals from the sensors and determine whether the vacuum pressure is sufficient. If, at 1908, it is determined that the vacuum pressure is not sufficient to extract and draw or convey the undesired material from the retention collection to the material collector (e.g. the vacuum pressure is not sufficient to extract and remove liquid, semi-solid, and/or solid materials or the collection conduit is found to be subject to clogging), the example method 1900 may include controlling (e.g. increasing) one or more of a flow rate or a pressure of the pressurized fluid supplied to the vacuum source, as indicated at 1910. Thereafter, the method 1900 may return to 1908 to determine whether the vacuum pressure of the vacuum flow within the desired bounds.

If the vacuum pressure lies within the desired range or is determined to be sufficient to continue extraction of the material in liquid, semi-solid, and/or substantially solid form, the material will continue to be extracted and conveyed into a material collector via the vacuum flow to collect the extracted undesired material, for example, as described herein.

In the example method 1900, as indicated at 1920, if it is determined that a vacuum shut-down has been initiated; for example, by an operator engaging one or more controls of a vacuum shut-down system, a series of actuators coupled to control valves that control the flow of pressurized fluid to the vacuum generators (e.g. the single or double venture mechanisms) can be activated to close their associated control valves, shutting off the pressurized fluid flows to the vacuum generators to cause a cessation of the generation of the vacuum pressure and thus the vacuum flow from the vacuum generators. At substantially the same time, air release valves or gates between the material collector and the vacuum source can be opened to release any remaining pressurized air/vacuum flow from the material extraction assembly. The shut-down of the vacuum pressure/vacuum flow generated by the vacuum source can be accomplished in a reduced time, e.g. in about 10 seconds or less, and in embodiments, within about 3-5 seconds.

FIG. 19 is a schematic diagram of an example material controller 200 configured to at least partially control a material extraction assembly 10 and/or a material conveyance assembly 11, according to embodiments of the disclosure. The material controller 200 may include one or more of the controllers described herein. The material controller 200 may include one or more processor(s) 2100 configured to execute certain operational aspects associated with implementing certain systems and methods described herein. The processor(s) 2100 may communicate with a memory 2102. The processor(s) 2100 may be implemented and operated using appropriate hardware, software, firmware, or combinations thereof. Software or firmware implementations may include computer-executable or machine-executable instructions written in any suitable programming language to perform the various functions described. In some examples, instructions associated with a function block language may be stored in the memory 2102 and executed by the processor(s) 2100.

The memory 2102 may be used to store program instructions that are loadable and executable by the processor(s) 2100, as well as to store data generated during the execution of these programs. Depending on the configuration and type of the material controller 200, the memory 2102 may be volatile (such as random access memory (RAM)) and/or non-volatile (such as read-only memory (ROM), flash memory, etc.). In some examples, the memory devices may include additional removable storage 2104 and/or non-removable storage 2106 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 2102 may include multiple different types of memory, such as static random access memory (SRAM), dynamic random access memory (DRAM), or ROM.

The memory 2102, the removable storage 2104, and the non-removable storage 1906 are all examples of computer-readable storage media. For example, computer-readable storage media may include volatile and non-volatile, removable and non-removable media implemented in any method or technology for storage of information, such as computer-readable instructions, data structures, program modules, or other data. Additional types of computer storage media that may be present may include, but are not limited to, programmable random access memory (PRAM), SRAM, DRAM, RAM, ROM, electrically erasable programmable read-only memory (EEPROM), flash memory, or other memory technology, compact disc read-only memory (CD-ROM), digital versatile discs (DVD) or other optical storage, magnetic cassettes, magnetic tapes, magnetic disk storage or other magnetic storage devices, or any other medium, which may be used to store the desired information and which may be accessed by the devices. Combinations of any of the above should also be included within the scope of computer-readable media.

The material controller 200 may also include one or more communication connection(s) 2108 that may facilitate a control device (not shown) to communicate with devices or equipment capable of communicating with the material controller 200. The material controller 200 may also include a computer system (not shown). Connections may also be established via various data communication channels or ports, such as USB or COM ports to receive cables connecting the material controller 200 to various other devices on a network. In some examples, the material controller 200 may include Ethernet drivers that enable the material controller 200 to communicate with other devices on the network. According to various examples, communication connections 2108 may be established via a wired and/or wireless connection on the network.

The material controller 200 may also include one or more input devices 2110, such as a keyboard, mouse, pen, voice input device, gesture input device, and/or touch input device. It may further include one or more output devices 2112, such as a display, printer, and/or speakers. In some examples, computer-readable communication media may include computer-readable instructions, program modules, or other data transmitted within a data signal, such as a carrier wave or other transmission. As used herein, however, computer-readable storage media may not include computer-readable communication media.

Turning to the contents of the memory 2102, the memory 2102 may include, but is not limited to, an operating system (OS) 2114 and one or more application programs or services for implementing the features and embodiments disclosed herein. Such applications or services may include remote terminal units 2116 for executing certain systems and methods for controlling operation of the material extraction assembly 10 (e.g., semi- or full-autonomously controlling operation of the assembly), for example, upon receipt of one or more control signals generated by the material controller 200. In some embodiments, one or more remote terminal unit(s) 2116 may be located on one or more components of the material extraction assembly 10. The remote terminal unit(s) 2116 may reside in the memory 2102 or may be independent of the material controller 200. In some examples, the remote terminal unit(s) 2116 may be implemented by software that may be provided in configurable control block language and may be stored in non-volatile memory. When executed by the processor(s) 2100, the remote terminal unit(s) 2116 may implement the various functionalities and features associated with the material controller 200 described herein.

Figure 18:
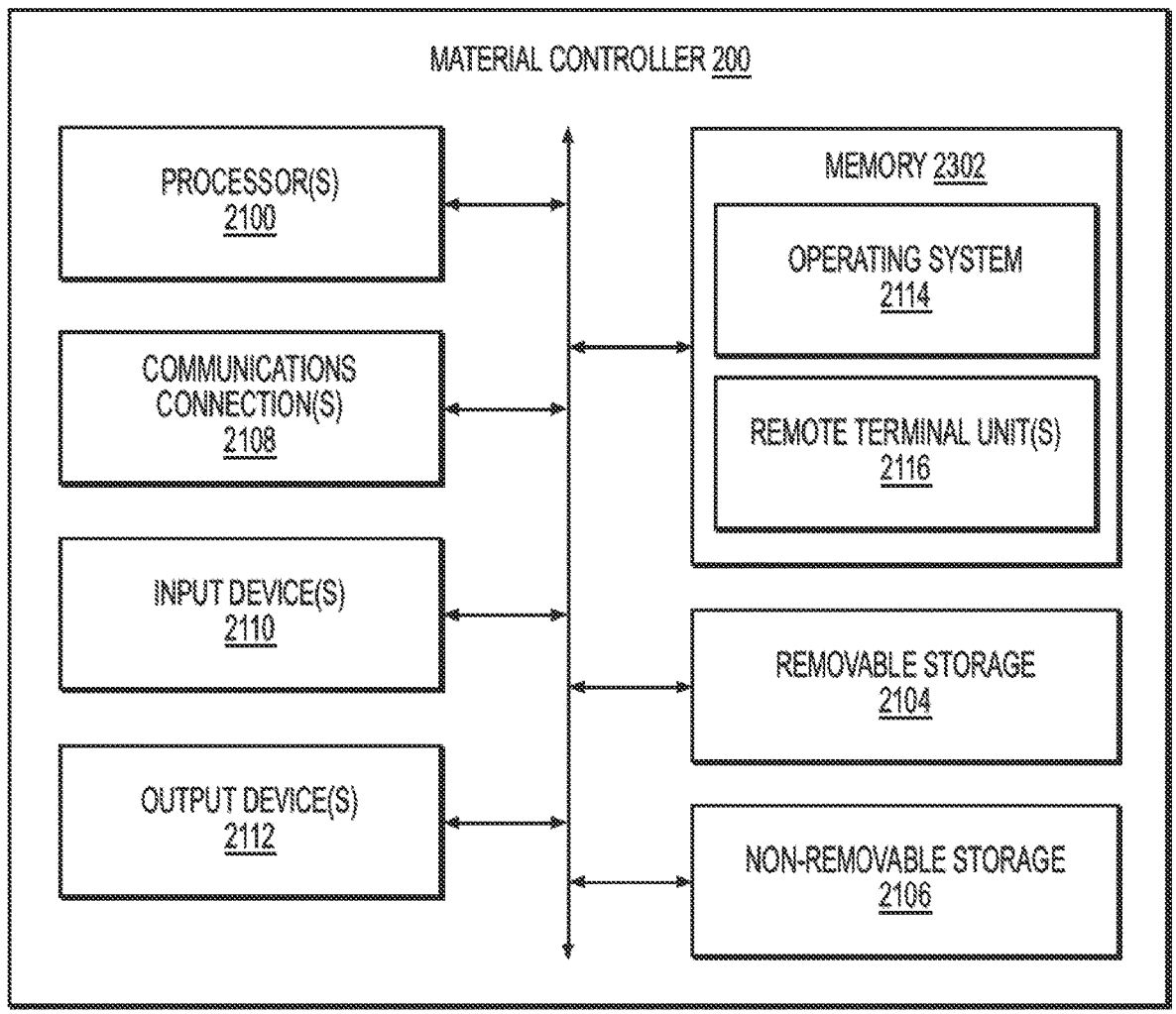
FIG. 18 is a schematic diagram of an example material extraction controller configured to at least partially control a material extraction assembly or material conveyance assembly, according to embodiments of the disclosure.

As desired, embodiments of the disclosure may include a material controller 200 with more or fewer components than are illustrated in FIG. 18. Additionally, certain components of the example material controller 200 shown in FIG. 18 may be combined in various embodiments of the disclosure. The material controller 200 of FIG. 18 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that may direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. non-provisional patent application claims priority to and the benefit of U.S. Provisional Application No. 63/367,570, filed Jul. 1, 2022, titled "HIGH VOLUME INDUSTRIAL VACUUM ASSEMBLIES AND METHODS," U.S. Provisional Application No. 63/367,219, filed Jun. 29, 2022, titled "RECEIVER, ASSEMBLIES, AND METHODS FOR LOADING AND EXTRACTING PRODUCT IN ELEVATED TOWER," U.S. Provisional Application No. 63/367,218, filed Jun. 29, 2022, titled "ASSEMBLIES AND METHODS FOR MATERIAL EXTRACTION FROM RETENTION COLLECTIONS," U.S. Provisional Application No. 63/364,630, filed May 13, 2022, titled "ASSEMBLIES, APPARATUSES, SYSTEMS, AND METHODS FOR MATERIAL EXTRACTION AND CONVEYANCE," U.S. Provisional Application No. 63/264,101, filed Nov. 16, 2021, titled "ASSEMBLIES AND METHODS FOR MATERIAL EXTRACTION," U.S. Provisional Application No. 63/264,015, filed Nov. 12, 2021, titled "ASSEMBLIES AND METHODS FOR MATERIAL EXTRACTION," U.S. Provisional Application No. 63/203,147, filed Jul. 9, 2021, titled "SYSTEMS, METHODS, AND DEVICES FOR INDUSTRIAL TOWER WASTE EXTRACTION," and U.S. Provisional Application No. 63/203,108, filed Jul. 8, 2021, titled "SYSTEMS, METHODS, AND DEVICES FOR INDUSTRIAL TOWER WASTE EXTRACTION," the disclosures of all of which are incorporated herein by reference in their entireties.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method for extraction of material from a retention collection, the method comprising:
supplying a pressurized fluid to one or more vacuum generators;
generating, via the one or more vacuum generators, a vacuum flow, the generating the vacuum flow including: (a) directing the vacuum flow through at least one material collector configured to receive and contain the material therein, (b) receiving the pressurized fluid at the one or more vacuum generators, (c) supplying the pressurized fluid to a manifold, (d) distributing the pressurized fluid from the manifold to a plurality of venturi mechanisms, and (e) using a venturi effect to generate the vacuum flow;
extracting the material in an at least semi-solid state from the retention collection via the vacuum flow through a conduit to the at least one material collector as the vacuum flow passes therethrough; and
depositing at least a portion of the material extracted within the at least one material collector.

2. A method for extraction of material from a retention collection, the method comprising:
supplying a pressurized fluid to one or more vacuum generators;
generating, via the one or more vacuum generators, a vacuum flow, the generating the vacuum flow including directing the vacuum flow through at least one material collector configured to receive and contain the material therein;
extracting the material in an at least semi-solid state from the retention collection via the vacuum flow through a conduit to the at least one material collector as the vacuum flow passes therethrough;
depositing at least a portion of the material extracted within the at least one material collector;
passing an exhaust portion of the vacuum flow into a filter and sound attenuation chamber; and
filtering the exhaust portion of the vacuum flow.

3. The method of claim 1, further comprising sufficiently controlling the generating the vacuum flow, thereby to to maintain a vacuum pressure of approximately 29 in.-Hg.

4. The method of claim 2, wherein supplying pressurized fluid to the one or more vacuum generators comprises controlling pressured fluid flow to the plurality of venturi mechanisms of the one or more vacuum generator via control of the pressured fluid flow through one or more of fluid supply ports and a manifold located between the one or more fluid supply ports and the venturi mechanisms.

5. The method of claim 4, wherein sufficiently controlling generating the vacuum flow, thereby to maintain a vacuum pressure of approximately 29 in.-Hg.

6. The method of claim 1, further comprising controlling via, a vacuum source controller, one or more of:

one or more fluid supply control valves to control intake of the pressurized fluid into each of the one or more vacuum generators;

a vacuum control valve configured to control the vacuum flow directed through the at least one material collector; or an exhaust control valve configured to control a vacuum pressure generated by the one or more of vacuum generators.

7. The method of claim 6, wherein controlling the one or more of the one of more fluid supply control valves, the vacuum control valve, or the exhaust control valve is at least partially responsive to one or more of:

an operator setting, or a sensor signal indicative of one or more of:
the vacuum pressure, or
a vacuum flow rate.

8. The method of claim 1, further comprising removing water from the material extracted.

9. A method for extraction of material from a retention collection, the method comprising:

supplying a pressurized fluid to one or more vacuum generators;

generating, via the one or more vacuum generators, a vacuum flow, the generating the vacuum flow including directing the vacuum flow through at least one material collector configured to receive and contain the material therein, the at least one material collector comprising a vacuum box having a chamber with first and second portions and a screen located between the first and second portions;

extracting the material in an at least semi-solid state from the retention collection via the vacuum flow through a conduit to the at least one material collector as the vacuum flow passes therethrough;

removing water from the material extracted, at least a portion of the water within the material is filtered through the screen and is passed from the first portion to the second portion to separate the water from substantially solid matter of the material extracted;

depositing at least a portion of the material extracted within the at least one material collector.

10. The method of claim 9, wherein the at least one material collector comprises a vacuum box having a chamber with a screw mechanism therealong, and wherein the screw mechanism urges the material toward an end of the chamber so as to cause a release of water from the material for collection.

11. A method for extraction of material from a retention collection, the method comprising:

supplying a pressurized fluid to one or more vacuum generators;

generating, via the one or more vacuum generators, a vacuum flow, the generating the vacuum flow including (a) directing the vacuum flow through at least one material collector configured to receive and contain the material therein, and (b) operating multiple vacuum generators in parallel to enhance vacuum pressure of the vacuum flow;

extracting the material in an at least semi-solid state from the retention collection via the vacuum flow through a conduit to the at least one material collector as the vacuum flow passes therethrough;

depositing at least a portion of the material extracted within the at least one material collector.

12. The method of claim 1, wherein the one or more vacuum generators include a filter and sound attenuation chamber comprising one or more chamber sensors configured to generate signals indicative of a filtration capacity of filter media at least partially enclosed therein, a flow rate of the material into the material collector or a combination thereof and further comprising:

receiving, via a chamber controller, one or more sensor signals from the one or more chamber sensors; and controlling, via the chamber controller based at least in part on the one or more sensor signals, operation of one or more of a discharge port control valve actuator or one or more jet generators configured to generate jets of fluid flow directed toward the filter media to at least partially maintain filtration capacity of the filter media, or to one or more of facilitate flow of fluid through the filter media.

13. The method of claim 1, further comprising supplying electric power to the one or more vacuum generators via one or more of a battery, a solar panel, a wind turbine, or other renewable source of electrical power.

* * * * *